(12) United States Patent
Eveleigh et al.

(10) Patent No.: US 11,298,292 B2
(45) Date of Patent: *Apr. 12, 2022

(54) EMERGENCY WASH SYSTEM

(71) Applicant: Magarl, LLC, Naples, FL (US)

(72) Inventors: Robert B. Eveleigh, Naples, FL (US); Thomas R. Baker, Morgantown, IN (US); Cameron West, Greenfield, IN (US); Lori Bolin, Greenwood, IN (US)

(73) Assignee: Magarl, LLC, Naples, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/001,787

(22) Filed: Aug. 25, 2020

(65) Prior Publication Data

US 2021/0177696 A1   Jun. 17, 2021

Related U.S. Application Data

(63) Continuation of application No. 13/841,056, filed on Mar. 15, 2013, now Pat. No. 10,973,737.
(Continued)

(51) Int. Cl.
   *A61H 35/02* (2006.01)
   *F16K 31/00* (2006.01)

(52) U.S. Cl.
   CPC ............ *A61H 35/02* (2013.01); *F16K 31/002* (2013.01); *A61H 2201/0157* (2013.01);
   (Continued)

(58) Field of Classification Search
   CPC ........ E03C 1/0403; E03C 1/041; E03C 1/042; E03C 1/048; E03C 1/14–16; E03C 1/32–328; E03C 1/33; E03C 2001/026; E03C 2001/028; F16K 19/006; E03B 9/20; A47K 3/286; A61H 35/002; A61H 35/008; A61H 35/02; A61H 35/04; A61H 33/6005

See application file for complete search history.

(56) References Cited

U.S. PATENT DOCUMENTS

| 1,394,302 A | 10/1921 | Hinsdale et al. |
| 2,527,836 A | 10/1950 | Miller |

(Continued)

FOREIGN PATENT DOCUMENTS

| AU | 2004100671 | 9/2004 |
| AU | 2009249423 | 11/2009 |

(Continued)

OTHER PUBLICATIONS

U.S. Appl. No. 14/528,404, NOA, 7 pgs Jul. 26, 2017.
(Continued)

*Primary Examiner* — David P Angwin
*Assistant Examiner* — Nicholas A Ros
(74) *Attorney, Agent, or Firm* — John V. Daniluck; Dentons Bingham Greenebaum LLP

(57) ABSTRACT

Apparatus and method for providing tempered water to an emergency wash system. Various embodiments include simple, reliable, low-cost flow regulators to reliably provide adequate emergency wash flows. Yet other embodiments include one or more features that consider the special needs of a person temporarily blinded, and include those persons having disabilities.

22 Claims, 38 Drawing Sheets

Related U.S. Application Data

(60) Provisional application No. 61/611,517, filed on Mar. 15, 2012, provisional application No. 61/670,157, filed on Jul. 11, 2012, provisional application No. 61/767,045, filed on Feb. 20, 2013.

(52) U.S. Cl.
CPC .............. *A61H 2201/0207* (2013.01); *A61H 2201/0228* (2013.01); *Y10T 137/7737* (2015.04)

(56) References Cited

U.S. PATENT DOCUMENTS

| | | | |
|---|---|---|---|
| 2,999,248 A | 9/1961 | Logan | |
| D218,237 S | 8/1970 | Cline | |
| 3,602,436 A * | 8/1971 | Wright | A61H 35/02 239/553.3 |
| D222,586 S | 11/1971 | Hives | |
| 3,629,876 A * | 12/1971 | Wright | E03C 1/18 4/620 |
| 3,925,829 A | 12/1975 | Bost | |
| 3,962,733 A | 6/1976 | Parry | |
| 4,012,798 A | 3/1977 | Liautaud | |
| 4,084,270 A | 4/1978 | Kersten, Jr. | |
| 4,259,953 A | 4/1981 | Shaw | |
| 4,585,175 A | 4/1986 | Formentos | |
| 4,675,924 A | 6/1987 | Allison et al. | |
| 5,157,798 A | 10/1992 | Van Kammen | |
| 5,251,345 A | 10/1993 | Pechner | |
| 5,265,288 A | 11/1993 | Allison | |
| 5,331,694 A | 7/1994 | Mackenzie et al. | |
| 5,343,574 A | 9/1994 | Butte | |
| 5,350,112 A | 9/1994 | Stein | |
| 5,381,567 A | 1/1995 | Tanner et al. | |
| 5,530,972 A | 7/1996 | Tanner | |
| 5,623,990 A | 4/1997 | Pirkle | |
| 5,647,531 A | 7/1997 | Kline et al. | |
| D388,507 S | 12/1997 | Gurries, II | |
| D389,901 S | 1/1998 | Kohler et al. | |
| 5,740,569 A | 4/1998 | Gurries, II et al. | |
| 5,754,990 A * | 5/1998 | Gurries, II | A61H 35/02 239/590 |
| 5,918,323 A | 7/1999 | Smith | |
| 5,924,148 A | 7/1999 | Flowers | |
| D414,548 S | 9/1999 | Westcott et al. | |
| 6,070,279 A | 6/2000 | Lundstedt | |
| 6,119,947 A | 9/2000 | Couture et al. | |
| D435,892 S | 1/2001 | Henry et al. | |
| 6,173,458 B1 | 1/2001 | Maddux | |
| D438,983 S | 3/2001 | Stein | |
| 6,205,599 B1 | 3/2001 | Anders | |
| D442,679 S | 5/2001 | Roberts | |
| 6,261,275 B1 | 7/2001 | Hayes | |
| 6,279,179 B1 | 8/2001 | Register | |
| 6,296,626 B1 | 10/2001 | Stein | |
| 6,385,794 B1 | 5/2002 | Miedzius et al. | |
| D466,589 S | 12/2002 | Miedzius | |
| 6,520,431 B2 | 2/2003 | Donovan | |
| 6,553,947 B2 | 4/2003 | Bradenbaugh et al. | |
| 6,611,972 B2 | 9/2003 | Underbrink et al. | |
| 6,711,758 B1 | 3/2004 | Terek et al. | |
| 6,729,344 B1 | 5/2004 | Hung | |
| 6,782,568 B2 | 8/2004 | Novak et al. | |
| 6,976,279 B1 | 12/2005 | Berke et al. | |
| D514,197 S | 1/2006 | Gilbert | |
| 7,007,316 B2 | 3/2006 | Lutz | |
| 7,011,652 B1 | 3/2006 | Berke et al. | |
| 7,159,252 B2 | 1/2007 | Underbrink et al. | |
| 7,188,846 B2 | 3/2007 | Deavila | |
| 7,201,732 B2 | 4/2007 | Anderson et al. | |
| 7,240,852 B2 | 7/2007 | Taylor | |
| 7,240,853 B2 | 7/2007 | Taylor | |
| 7,243,381 B2 | 7/2007 | Lutz, II | |
| 7,244,246 B2 | 7/2007 | Madritsch et al. | |
| 7,305,722 B2 | 12/2007 | Sha et al. | |
| D559,365 S | 1/2008 | Plikuhn | |
| D585,117 S | 1/2009 | Slothower | |
| D588,240 S | 3/2009 | Hanna | |
| 7,799,003 B2 | 9/2010 | Johnson et al. | |
| 7,806,348 B2 | 10/2010 | Kline et al. | |
| 7,857,795 B2 | 12/2010 | Perrin et al. | |
| 7,971,601 B2 | 7/2011 | Lum et al. | |
| 8,034,036 B2 | 10/2011 | Osborne | |
| 8,060,957 B2 | 11/2011 | Johnson | |
| 8,064,758 B2 | 11/2011 | Fabrizio | |
| D662,219 S | 6/2012 | Perrin et al. | |
| D662,605 S | 6/2012 | Perrin et al. | |
| 8,205,279 B2 | 6/2012 | Devinat et al. | |
| D671,228 S | 11/2012 | Perrin et al. | |
| 8,313,472 B2 | 11/2012 | Devinat et al. | |
| 8,316,477 B2 | 11/2012 | Smith et al. | |
| 8,316,478 B2 | 11/2012 | Strandberg et al. | |
| D673,298 S | 12/2012 | Perrin | |
| 8,371,825 B2 | 2/2013 | Devinat et al. | |
| 8,435,220 B2 | 5/2013 | Smith et al. | |
| D685,920 S | 7/2013 | Perrin | |
| 8,490,895 B2 | 7/2013 | Jaworski et al. | |
| 8,566,974 B2 | 10/2013 | Strandberg et al. | |
| 8,591,479 B2 | 11/2013 | Boissonneault et al. | |
| 8,747,374 B2 | 6/2014 | Strandberg | |
| 8,839,468 B2 | 9/2014 | Strandberg et al. | |
| 10,973,737 B2 * | 4/2021 | Eveleigh | F16K 31/002 |
| 2003/0218074 A1 | 11/2003 | Beck et al. | |
| 2005/0054992 A1 | 3/2005 | Madritsch et al. | |
| 2005/0120475 A1 | 6/2005 | Englefield | |
| 2006/0096026 A1 | 5/2006 | Lutz, II | |
| 2007/0089232 A1 | 4/2007 | Smith et al. | |
| 2007/0089233 A1 | 4/2007 | Smith et al. | |
| 2007/0089234 A1 | 4/2007 | Copeland et al. | |
| 2007/0089235 A1 | 4/2007 | Devinat et al. | |
| 2007/0092388 A1 | 4/2007 | Devinat et al. | |
| 2007/0186341 A1 | 8/2007 | Uffner et al. | |
| 2007/0204398 A1 | 9/2007 | Dubois | |
| 2007/0278757 A1 | 12/2007 | Deavila | |
| 2008/0039808 A1 | 2/2008 | Val Madritsch et al. | |
| 2008/0281280 A1 | 11/2008 | Jaworski et al. | |
| 2009/0308494 A1 | 12/2009 | Linn | |
| 2010/0107327 A1 * | 5/2010 | Eveleigh | A61H 33/0095 4/620 |
| 2011/0046582 A1 | 2/2011 | Devinat et al. | |
| 2011/0056015 A1 | 3/2011 | Perrin | |
| 2011/0225725 A1 | 9/2011 | Kersten | |
| 2012/0057857 A1 | 3/2012 | Kenney et al. | |
| 2012/0096639 A1 | 4/2012 | Stanley et al. | |
| 2012/0240328 A1 | 9/2012 | Dudley | |
| 2012/0324653 A1 | 12/2012 | Ferry | |
| 2013/0042403 A1 | 2/2013 | Strandberg et al. | |
| 2013/0283522 A1 | 10/2013 | Novak | |
| 2013/0340160 A1 | 12/2013 | Eveleigh et al. | |
| 2015/0113725 A1 | 4/2015 | Eveleigh | |
| 2016/0095794 A1 | 4/2016 | Eveleigh | |

FOREIGN PATENT DOCUMENTS

| | | |
|---|---|---|
| CA | 2570161 | 12/2005 |
| EP | 0723769 | 7/1996 |
| GB | 2485724 | 5/2012 |
| WO | 2007050616 | 5/2007 |
| WO | 2009051999 | 4/2009 |
| WO | 2011031674 | 3/2011 |

OTHER PUBLICATIONS

U.S. Appl. No. 14/753,963, NOA mailed, 8 pages Aug. 4, 2017.
CA Appln. 2809713, Response filed, 60 pgs May 30, 2019.
CA Appln 2809713, Response filed, 4 pgs Mar. 3, 2020.
U.S. Appl. No. 14/528,404, Applicant Response, 21 pgs May 8, 2017.
U.S. Appl. No. 13/841,056, Response to Jul. 28, 2016 NFOA, 38 pgs Jan. 30, 2017.
U.S. Appl. No. 13/841,056, Response to Feb. 20, 2018 NFOA, 21 pgs Aug. 20, 2018.

(56) References Cited

OTHER PUBLICATIONS

U.S. Appl. No. 13/841,056, Ex Parte Quayle Action, 6 pgs. Sep. 23, 2020.
U.S. Appl. No. 13/841,056, Response to Ex Parte Quayle Action, 11 pgs. Nov. 23, 2020.
Product information for Speakman Heat Traced Combination Shower with Eye/Face Wash System SE-7000, 2 pgs. Jan. 1, 2015.
Product information for Speakman Optimus Wall Mounted Eye and Face Wash Bowl SE-1000, 2 pgs. Oct. 1, 2014.
Product information for Speakman Optimus Wall Mounted Eye and Face Wash Bowl SE-1050, 2 pgs. Oct. 1, 2014.
Product information for Speakman Optimus Wall Mounted Eye and Face Wash Bowl SE-1055, 2 pgs. Oct. 1, 2014.
Haws Catalog of Decontamination Products: Axion MSR, Eye/Face Wash Units, Showers/ Combination Units, 8 pgs. Jan. 1, 2014.
Product Information for Speakman Heat Traced Combination Shower with Eye/Face Wash System SE-7001 Jan. 1, 2015.
Product Information for Guardian G1950P Safety Station with Eye/Face Wash, Plastic Bowl, 2 pgs. Jan. 1, 2014.
Product Information for Bradley Combination Drench Shower and Halo Eyewash or Eye/Face Wash S19314 Series, 5 pgs. May 19, 2014.
Haws Catalog of Axion Thermostatic Mixing Valves, 6 pgs. Jan. 1, 2014.
Product Information for Encon Galvanized Pipe, www.enconsafety.com, 3 pgs. Jul. 13, 2015.
Baker, U.S. Appl. No. 14/528,404, NOA, 7 pgs. Jul. 26, 2017.
U.S. Appl. No. 14/753,963, Applicant Response filed, 20 pages Jun. 9, 2017.
Baker, U.S. Appl. No. 14/753,963, NOA mailed, 8 pages dated Aug. 4, 2017.
CA Appln. 2809713, First Office Action, 6 pgs. dated Nov. 30, 2018.
CA Appln. 2809713, Response filed, 60 pgs dated May 30, 2019.
CA Appln 2809713, 2nd Office Action, 3 pgs dated Nov. 6, 2019.
CA Appln 2809713, Response filed, 4 pgs dated Mar. 3, 2020.
U.S. Appl. No. 14/528,404, NF Office Action, 9 pgs dated Dec. 7, 2016.
U.S. Appl. No. 14/528,404, Applicant Response, 21 pgs dated May 8, 2017.
U.S. Appl. No. 14/753,963, NF Office Action, 7 pgs dated Feb. 9, 2017.
CA Appln 2809713, Notice of Allowance from CIPO, 1 pg. dated Oct. 23, 2020.
U.S. Appl. No. 13/841,056, NF Office Action, 14 pgs dated Jul. 28, 2016.
U.S. Appl. No. 13/841,056, Response to Jul. 28, 2016 NFOA, 38 pgs dated Jan. 30, 2017.
U.S. Appl. No. 13/841,056, Final Rejection, 17 pgs. dated May 18, 2017.
U.S. Appl. No. 13/841,056, Response to May 18, 2017 Final Rejection, 25 pgs. dated Nov. 20, 2017.
U.S. Appl. No. 13/841,056, NF Office Action after 1st RCE, 19 pgs dated Feb. 20, 2018.
U.S. Appl. No. 13/841,056, Response to Feb. 20, 2018 NFOA, 21 pgs dated Aug. 20, 2018.
U.S. Appl. No. 13/841,056, 2nd Final Rejection, 14 pgs. dated Jan. 11, 2019.
U.S. Appl. No. 13/841,056, Response to Jan. 11, 2019 Final Rejection, 20 pgs. dated Apr. 16, 2019.
U.S. Appl. No. 13/841,056, NF Office Action after 2nd RCE, 22 pgs. dated Jun. 13, 2019.
U.S. Appl. No. 13/841,056 Response to Jun. 13, 2019 NFOA, 29 pgs. Dec. 13, 2019.
U.S. Appl. No. 13/841,056 3rd Final Rejection, 21 pgs. dated Feb. 27, 2020.
U.S. Appl. No. 13/841,056, Ex Parte Quayle Action, 6 pgs. dated Sep. 23, 2020.
U.S. Appl. No. 13/841,056, Response to Ex Parte Quayle Action, 11 pgs. dated Nov. 23, 2020.
U.S. Appl. No. 13/841,056, Notice of Allowance, 9 pgs dated Dec. 9, 2020.
CA Appln. 2809713, CIPO Examiner's Report, 6 pgs dated Nov. 30, 2018.
CA Appln. 2809713, Response to Nov. 30, 2018 Examiner's Report, 60 pgs. dated May 30, 2019.
CA Appln. 2809713, CIPO 2nd Office Action, 3 pgs. dated Nov. 6, 2019.
CA Appln. 2809713, Response to Nov. 6, 2019 Office Action, 5 pgs. dated Mar. 3, 2020.
CA Appln. 2809713, CIPO, Notice of Allowance dated Feb. 23, 2021.

* cited by examiner

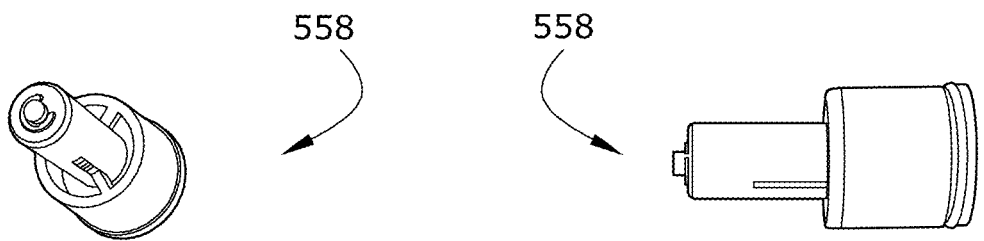
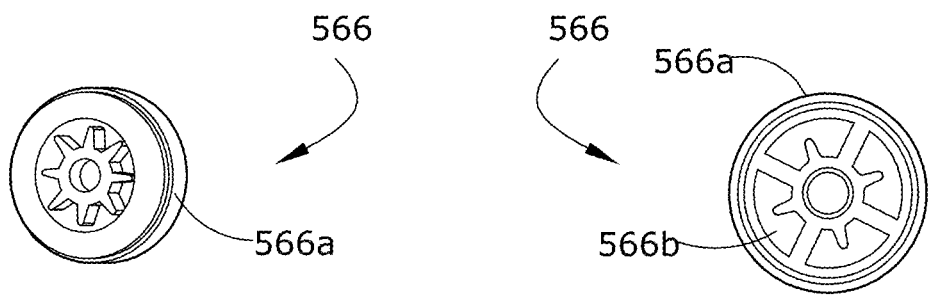
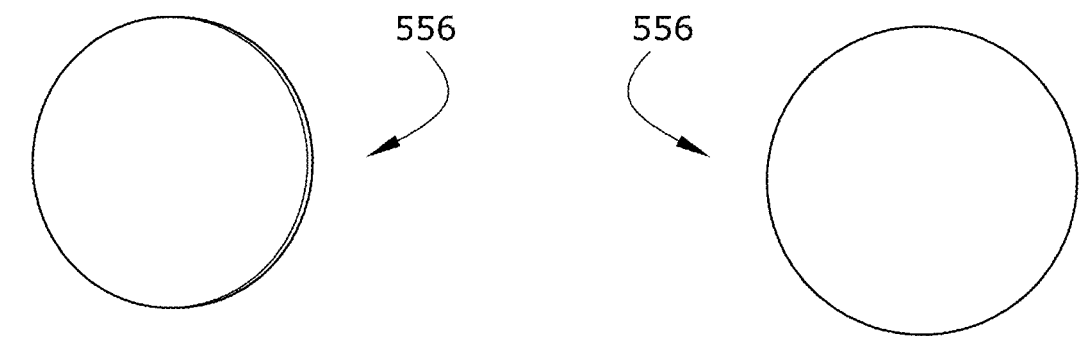
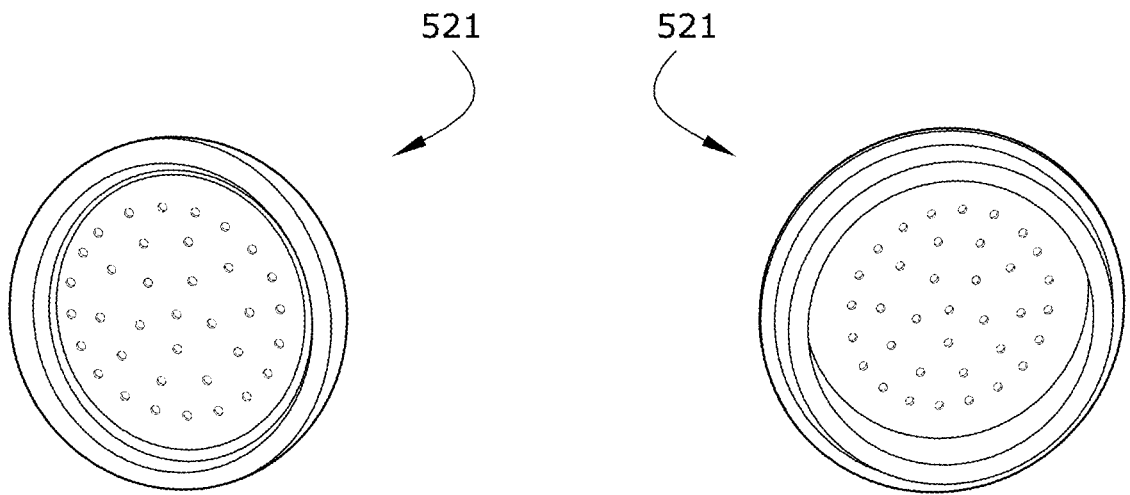
FIG. 5-5              FIG. 5-6

EMERGENCY WASH SYSTEM

CROSS REFERENCE TO RELATED APPLICATIONS

This application is a continuation application of U.S. patent application Ser. No. 13/841,056, filed Mar. 15, 2013, now issued as U.S. Pat. No. 10,973,737, which claims the benefit of priority to U.S. Provisional Patent Application Ser. No. 61/611,517, filed Mar. 15, 2012; U.S. Provisional Patent Application Ser. No. 61/670,157, filed Jul. 11, 2012; and 61/767,045, filed Feb. 20, 2013, all of which are incorporated herein by reference.

FIELD OF THE INVENTION

Various embodiments of the present invention pertain to methods and apparatus for emergency washing, and in particular to eyewash and bodywash apparatus that are adjustable, modular, wheelchair accessible, or transportable.

BACKGROUND OF THE INVENTION

Emergency eyewashes and showers provide a rapid washing to a person contaminated with a dangerous chemical whether the exposure is in a research laboratory, a farm, or in the exhaust of a nitromethane burning AA fuel funny car. However, the systems provide no benefit, and further are a detriment for creating false hope if the equipment does not work.

Various existing emergency eyewash basins and showers utilize complex flow systems that require professional installation and adjustment. Therefore, if an emergency wash site does not work, the employer is required to "lock out" and "tag out" that site until it is repaired. Often, it takes days to schedule the professional to service the site, and further time delays are encountered to simply order the parts, which by their complexity are too expensive to be maintained in inventory at the worksite.

Yet other problems arise when it is difficult to check and adjust the operation of the emergency wash site. If it is not easy to determine that the equipment is working properly, then the employers may not apply appropriate resources to routinely check the equipment. Under such circumstances, the wash site may not provide sufficient flow, or may provide flow that is too hot, and any user of the wash site may suffer as a result.

Yet other eyewash basins are generally round in shape, or otherwise lacking in any geometric feature that can be felt by the hands of a user during an emergency. In such emergency conditions, the user may be temporarily blinded, and thus have difficulty aligning him/herself with the eyewash nozzles. Since time is important in washing contaminants from the eye, the additional seconds required for the person to align his/her eyes with the nozzle spray pattern could result in increased injury. Many such basins are generally featureless in terms of letting the user tacitly (by hand) locate themselves with their eyes shut.

Still further, many transportable emergency wash systems suffer from inadequate protection from damage to the wash site as it is being transported. The act of transport can include multiple types of single occurrence shocks to the equipment, such as during loading and unloading. Further, wash sites can be located near sources of vibration, such as a Hemi® running open headers. This can be a problem if parts of the wash system include electronic apparatus.

Further, it is becoming increasingly important for water to be conserved, and this is even more important in those situations in which the water at the wash site comes from a limited reservoir, or is otherwise limited by a failure in a thermostatically-controlled valve. During such valve failures, the amount of flow available is often less than about two gallons per minute. Some existing wash sites are not capable of providing an adequate wash to a contaminated user with such low flows.

Various embodiments of the present invention address some or all of these aspects, and still other aspects, in novel and unobvious ways.

SUMMARY OF THE INVENTION

One aspect of the present invention pertains to an emergency eyewash system adapted and configured to be transportable.

Another aspect of some embodiments pertains to a basin for an emergency eyewash that is adapted and configured to provide a tactile indication to a user as to how the user should position him/herself when using the emergency eyewash recognizing that the user may be temporarily blinded. In some embodiments this tactile features are the corners of a diamond-shaped basin. In yet other embodiments the tactile features are handles placed on opposing sides, and in still other embodiments the tactile features are recesses molded into the basin to receive the fingertips of the person.

Yet other aspects of some embodiments include the placement of a shut-off lever above the nozzles, and further in some embodiments located centrally relative of the nozzles, and in still further embodiments located immediately behind the nozzles. This location further recognizes the person using the eyewash may have difficulty seeing, and thereby places the eyewash actuation lever at a location where it is most easily seen.

Still further embodiments pertain to an emergency eyewash having an eyewash nozzle assembly that can be quickly and easily connected or disconnected from the eyewash system. By the use of quick-connect features, a person that is not a plumber can readily remove a suspect valve and replace it with a known good valve. By allowing such easy maintenance, it is not necessary to "lock out" and "tag out" the eyewash system for long periods of time, or for that matter in some circumstances for any time at all. Since an unskilled person can quickly provide replacement of a faulty valve, there may be no reason to lock out and tag out the system while waiting on a plumber.

Yet other embodiments pertain to an emergency eyewash system that is adapted and configured for a person in a wheelchair. The basin of the eyewash extends outwardly from a vertical support a sufficient distance to be accessed by the person in a wheelchair. Further, the system incorporates a tactile locating feature on each side of the basin, and a centrally located eyewash actuation lever to make the system easy to use for the disabled person.

Yet another aspect of some embodiments is an eyewash nozzle assembly that is replaceable as a unit. The assembly is provided with a flow regulator that provides a substantially constant flow of water as inlet conditions change, a filter, and in some embodiments a chemical agent for lessening the effects of chemicals in the water, or bacteria (which agent in some embodiments includes activated charcoal). Preferably, the replaceable unit is contained within a single housing.

Yet another aspect of the present invention pertains to an emergency eyewash system including an electric water heater. The system further includes a shutoff valve that can be used to purge air from the heater prior to usage, and which can thereafter be placed in a position to shutoff the purged channel such that the electric water heater remains primed with water and little or no air. In this way, the electric water heater does not include any trapped pockets of air which could lead to an overheating condition.

One aspect of the present embodiment pertains to an emergency eyewash system including a thermostatically controlled valve. Other embodiments include a flow regulator having a variable orifice characteristic, the variable orifice becoming more restrictive to flow as the pressure of water at the regulator inlet increases and becoming less restrictive to flow as the pressure of water at the regulator inlet decreases. Preferably, the regulator outlet providing an outlet flow within a predetermined range of flows. Yet other embodiments include an eyewash nozzle for directing the regulated flow generally upwards.

Another aspect of the present invention pertains to an emergency eyewash system including a first quick connect fitting and an eyewash nozzle assembly having an inlet and a second quick connect fitting mateable to the first quick connect fitting at the inlet. In some embodiment, the quick connect fitting as one example include the Sharkbite® fitting by Cash-Acme, part no. 22182. In yet other embodiments the quick connect apparatus is a Sharkbite® fitting of the type U140.

Yet other embodiments include an eyewash nozzle assembly having a first indexing feature. Still other embodiments include a basin for collecting water expelled from the nozzle, the basin having a drain that collects water expelled from the nozzle, the basin including a second indexing feature, the second indexing feature establishes the location of the first indexing feature when the nozzle assembly is connected to the water outlet.

Yet another aspect of the present invention pertains to an emergency eyewash system including an eyewash nozzle assembly, and a basin attached to the stand and extending horizontally forward from the stand and below the nozzle assembly. The basin is substantially symmetric laterally, the lateral sides of the basin including mirror images of a feature that tactilely identifies the location of the nozzle assembly to the user.

Yet other embodiments include a water shutoff valve for manual control of flow of water to the nozzle, the valve including a lever, the level being located above the nozzle assembly, and generally centered relative to the nozzle assembly.

Still another aspect of the present invention pertains to an emergency eyewash system that is vertically supported relative to the floor. It further includes an eyewash nozzle assembly adapted and configured for the upward flow of water generally symmetric about a vertical plane, and a basin extending horizontally forward from any obstruction by a distance suitable for use by a person in a wheelchair. The basin has opposing sides that each include a feature that tactilely identifies and orients the person relative to the nozzle assembly.

Yet another aspect of the present invention pertains to an apparatus for an emergency eyewash. Some embodiments include an eyewash nozzle assembly having a quick connect fitting at the inlet, a nozzle outlet for providing a flow of water for the eyewash, and a flow regulator providing fluid communication between the inlet and nozzle outlet. The flow regulator is adapted and configured to provide a predetermined flow of water from inlet to nozzle outlet as inlet pressure varies. Still other embodiments include a filter adapted and configured to provide filtered water to the nozzle outlet, and a housing internally supporting the filter and the regulator.

Still further aspects of the present invention pertain to a transportable emergency eyewash system including a cart with wheels and an electrical water heater mounted to the cart. Yet other embodiments include a shutoff valve having an inlet for receiving water from the heater, the valve having an outlet, and a movable valve member actuatable over a range of positions for directing water from the inlet to the outlet, the member having a first position to permit flow from the inlet to the outlet and to a drain, and a second position to prevent flow from the outlet. The eyewash system can be actuated to provide flow from the eyewash outlets when the shut off valve is in the second position.

Yet other embodiments of the present invention include a basin for collecting water expelled from the nozzle and providing the collected water to a drain, and from the drain to a collection reservoir on the cart. The collection reservoir is useful in those situations where the user is washing off a contaminant that is dangerous even when diluted. The reservoir captures the washed off contaminant for later disposal.

Still further embodiments of the present invention pertain to a thermostatically controlled valve in which the check valves are adapted and configured to be identical in operation, have identical top and bottom interfaces, and further in which the housing of the valve has identical interfaces.

It will be appreciated that the various apparatus and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

DESCRIPTION OF THE DRAWINGS

Some of the figures shown herein may include dimensions. Further, some of the figures shown herein may have been created from scaled drawings or from photographs that are scalable. It is understood that such dimensions, or the relative scaling within a figure, are by way of example, and not to be construed as limiting.

FIG. 1-2 is a front elevational view of the apparatus of FIG. 1-1.

FIG. 1-3 is a side elevational view of the apparatus of FIG. 1-1.

FIG. 1-4 is a top plan view of the apparatus of FIG. 1-1.

FIG. 1-5 is a right side perspective view of a portion of the apparatus of FIG. 1-1. FIG. 1-6 is a right side cross-sectional view of the apparatus of FIG. 1-5, shown in solid.

FIG. 1-7 is a right side cross sectional view of the apparatus of FIG. 1-5, shown in cross sectional view.

FIG. 1-8 is a right, top, perspective cutaway of the apparatus of FIG. 1-7.

FIG. 1-9 is a top, perspective view of an eyepiece according to one embodiment of the present invention.

FIG. 2-1A shows a top external view of a thermostatic control valve according to one embodiment of the present invention.

FIG. 2-1B shows a side elevational view of the valve of FIG. 2-1A.

FIG. 2-1C shows a front plan view of the valve of FIG. 2-1A.

FIG. 2-1D shows a side elevational view of the valve of FIG. 2-1A.

FIG. 2-1E shows a bottom plan view of the valve of FIG. 2-1A.

FIG. 2-2A shows a cutaway view of a valve having a bottom outlet.

FIG. 2-2B shows a cutaway view of a valve having a top outlet.

FIG. 2-2C shows a cutaway view of a valve having a top and bottom outlets.

FIG. 2-3 is a cutaway view of a thermostatically controlled valve according to another embodiment of the present invention, with the left side of the valve showing a top-facing inlet, in the right side of the valve showing a bottom-facing inlet.

FIG. 2-4 is an enlargement of a portion of FIG. 2-4.

FIG. 3-1A is a front, top, perspective photographic representation of an apparatus according to one embodiment of the present invention.

FIG. 3-1B is a symbolic schematic representation of the flow system of the apparatus of FIG. 3-1A.

FIG. 3-1C is a cutaway side view of a accumulator (diffuser) according to one embodiment of the present invention.

FIG. 3-2 is a top and side perspective photographic representation of the apparatus of FIG. 3-1A.

FIG. 3-3 is a left side, top perspective photographic representation of the apparatus of FIG. 3-1A.

FIG. 3-4 is a photographic representation of a thermostatic control valve from the apparatus of FIG. 3-1A.

FIG. 3-5 is a photograph of the front and back halves of the eye/face wash block (outlet valve) of FIG. 3-1A.

FIG. 3-6A is a backside photographic representation of a showerhead assembly according to one embodiment of the present invention.

FIG. 3-6B is a front side photographic representation of the showerhead of FIG. 3-6A.

FIG. 3-7 is an exploded, side by side photographic representation of the apparatus of FIG. 3-6B.

FIG. 3-8 is a close up photographic representation of the dispersing member of FIG. 3-7.

FIG. 4-9 is a photographic representation of a transportable eyewash according to one embodiment of the present invention.

FIG. 4-10 is a schematic flowchart of the eyewash system of FIG. 4-9.

FIG. 4-11A shows the valve body of the system of FIG. 4-9, with the inner valve removed and positioned to be fully opened.

FIG. 4-11B shows the block (valve body) of the system of FIG. 4-9, with the inner diverter pin (valve) removed and positioned to be closed, and emphasizing a nonclosable flow area.

FIG. 5-1 is a top photographic representation of an eyewash valve assembly according to one embodiment of the present invention.

FIG. 5-2 is a bottom photographic representation of the apparatus of FIG. 5-1.

FIG. 5-3 is a perspective photographic representation of the apparatus of FIG. 5-1.

FIG. 5-4 is a perspective photographic representation of the apparatus of FIG. 5-1.

FIG. 5-5 is a photographic top side view of various components of the apparatus of FIG. 5-1.

FIG. 5-6 is a photographic bottom side view of various components of the apparatus of FIG. 5-1, with the exception that the apparatus at the top is a side photographic representation.

FIG. 5-7 is a top photographic representation of a basin according to one embodiment of the present invention.

FIG. 5-8 is a photographic representation of the bottom of the apparatus of FIG. 5-7.

FIG. 5-9 is a close-up photograph of a portion of the apparatus of FIG. 5-7.

FIG. 5-10 is a photographic representation of a portion of the apparatus of FIG. 5-8.

FIG. 5-11 is a side photographic representation of a portion of an eyewash assembly according to one embodiment of the present invention.

FIG. 5-12 is a schematic cutaway representation of an expulsion valve according to one embodiment of the present invention.

FIG. 5-13 is a hydraulic schematic representation of a system according to one embodiment of the present invention.

FIG. 5-14 is a hydraulic schematic representation of a system according to one embodiment of the present invention.

FIG. 6-1 is a perspective photographic representation of a transportable eyewash system according to another embodiment of the present invention.

FIG. 6-2 is a front photographic representation of the apparatus of FIG. 6-1.

FIG. 6-3 is a side and frontal perspective photographic representation of the bottom of the apparatus of FIG. 6-1.

FIG. 6-4 is a hydraulic schematic representation of a transportable system according to one embodiment of the present invention.

FIG. 6-5 is a hydraulic schematic representation of a transportable system according to one embodiment of the present invention.

Figure 1:
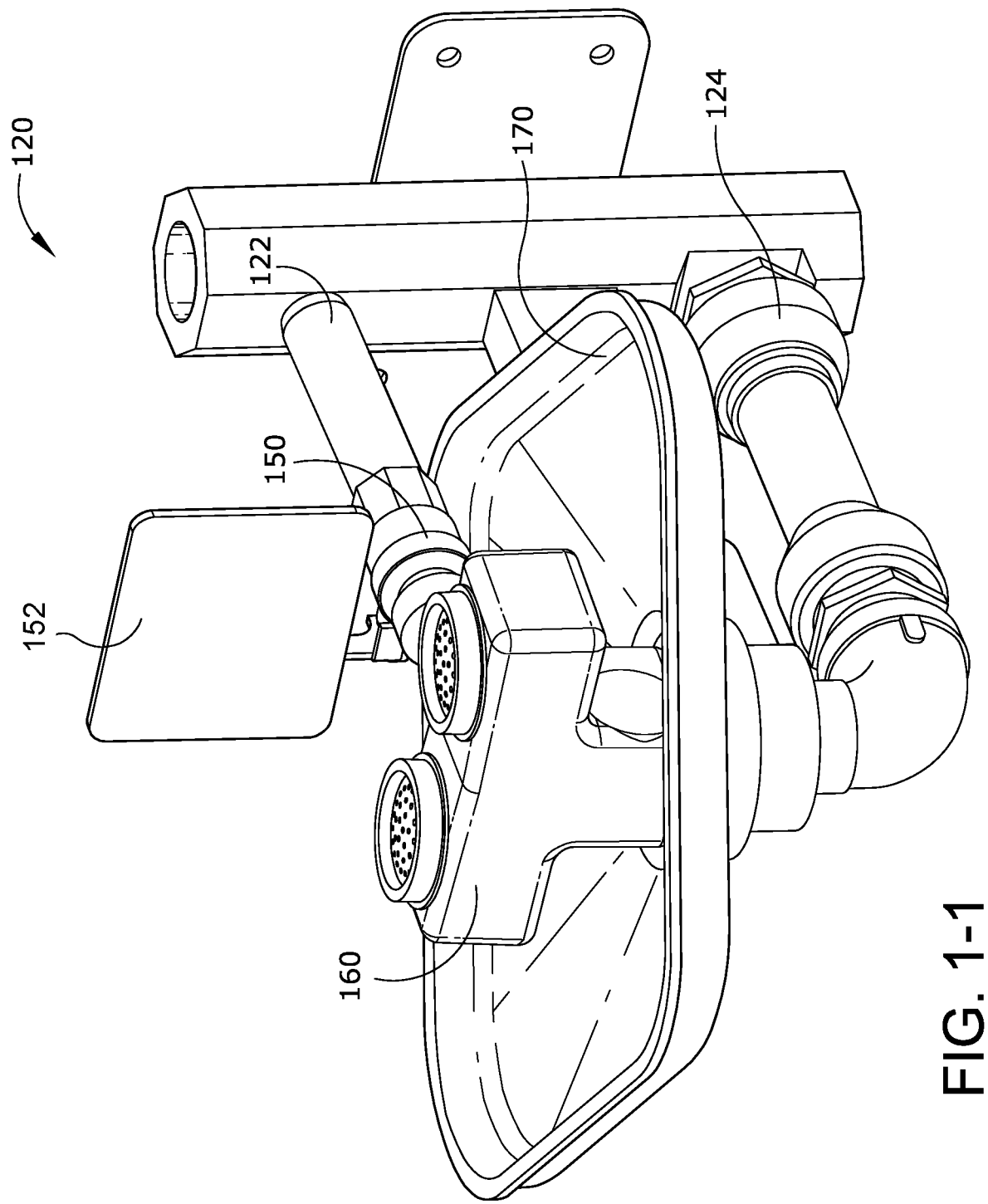
FIG. 1-1 is a right side, top perspective view of an emergency eye wash according to 1 embodiment of the present invention.

| Element Numbers | |
| --- | --- |
| 10 | System |
| 11 | cart |
| 12 | deck |
| 13 | legs |
| 14 | wheels |
| 15 | lid |
| 20 | eye wash system |
| 21 | dispensing caps |
| a | apertures |
| 22 | water tank |
| 23 | quick connect fitting |
| 24 | hot source |
| 25 | support arm |
| 26 | stand |
| 28 | drain |
| 29 | catch basin |
| 30 | thermostatically controlled valve |
| 31 | cold inlet |
| 32 | tempered fluid outlet |
| 33 | hot inlet |
| 34 | body |
| 36 | cartridge |
| 37 | mixing outlets |
| 38 | metering section/ flow restrictor |
| 40 | diffusing heat exchanger |
| 41 | inlet |

-continued

| Element Numbers | |
|---|---|
| 42 | outlet |
| 43 | serpentine passage |
| 44 | apertures |
| 50 | shut-off valve |
| 51 | quick connect |
| 52 | paddle shut-off |
| 53 | purge line |
| 56 | filter |
| a | groove |
| 58 | expulsion valve |
| a | inlet |
| b | outlet |
| c | flapper |
| 60 | outlet valve |
| 61 | body |
| a | indexing |
| 62 | internal chamber |
| 63 | water inlet |
| a | secondary outlet |
| 64 | eyewash outlets |
| 65 | internal connection |
| 66 | variable orifice valve |
| a | fixed member |
| b | flexible member |
| 67 | interface |
| 68 | outlet |
| 70 | return wash basin |
| 71 | indexing feature |
| 72 | Drain, variable |
| | drain, fixed |
| 73 | attachment feature |
| 74 | tactile features |
| 75 | lip |
| 80 | shower head assembly |
| 81 | inlet |
| 82 | bowl |
| 83 | depressions |
| 84 | dispersing member |
| 85 | stand offs |
| 86 | central deflector |
| 87 | apertures |
| 88 | ridges |
| 90 | heater |
| 91 | source of electricity |
| 92 | shock mounts |
| 94 | heat exchanger |
| 96 | thermal switch |
| V20 | thermostatically controlled valve |
| V22 | tower casing |
| V24 | thermostat assembly |
| V30 | base casing |
| V32 | metering section |
| V34 | check valve housings |
| V36 | threaded interface |
| V40 | check valve assembly |
| V42 | bonnet |
| V43 | spring support |
| V44 | outlet seal |
| V45 | chamber |
| V46 | spring |
| V47a | disk |
| V47b | gasket |
| V48 | screw |

-continued

| Element Numbers | |
|---|---|
| V49 | acorn nut |
| V50 | outlet |

DESCRIPTION OF THE PREFERRED EMBODIMENT

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates. At least one embodiment of the present invention will be described and shown, and this application may show and/or describe other embodiments of the present invention. It is understood that any reference to "the invention" is a reference to an embodiment of a family of inventions, with no single embodiment including an apparatus, process, or composition that should be included in all embodiments, unless otherwise stated. Further, although there may be discussion with regards to "advantages" provided by some embodiments of the present invention, it is understood that yet other embodiments may not include those same advantages, or may include yet different advantages. Any advantages described herein are not to be construed as limiting to any of the claims. The usage of words indicating preference, such as "preferably," refers to features and aspects that are present in at least one embodiment, but which are optional for some embodiments.

The use of an N-series prefix for an element number (NXX.XX) refers to an element that is the same as the non-prefixed element (XX.XX) except as shown and described. As an example, an element 1020.1 would be the same as element 20.1, except for those different features of element 1020.1 shown and described. Further, common elements and common features of related elements may be drawn in the same manner in different figures, and/or use the same symbology in different figures. As such, it is not necessary to describe the features of 1020.1 and 20.1 that are the same, since these common features are apparent to a person of ordinary skill in the related field of technology. Further, it is understood that the features 1020.1 and 20.1 may be backward compatible, such that a feature (NXX.XX) may include features compatible with other various embodiments (MXX.XX), as would be understood by those of ordinary skill in the art. This description convention also applies to the use of prime ('), double prime ("), and triple prime ("') suffixed element numbers. Therefore, it is not necessary to describe the features of 20.1, 20.1', 20.1", and 20.1'" that are the same, since these common features are apparent to persons of ordinary skill in the related field of technology.

Although various specific quantities (spatial dimensions, temperatures, pressures, times, force, resistance, current, voltage, concentrations, wavelengths, frequencies, heat transfer coefficients, dimensionless parameters, etc.) may be stated herein, such specific quantities are presented as examples only, and further, unless otherwise explicitly noted, are approximate values, and should be considered as if the word "about" prefaced each quantity. Further, with discussion pertaining to a specific composition of matter, that description is by example only, and does not limit the applicability of other species of that composition, nor does it limit the applicability of other compositions unrelated to the cited composition.

Various references may be made to one or more processes, algorithms, operational methods, or logic, accompanied by a diagram showing such organized in a particular sequence. It is understood that the order of such a sequence is by example only, and is not intended to be limiting on any embodiment of the invention.

Reference will be made to an eyewash system and various components of the system. It is understood that the system and various components are further compatible with face wash and body wash systems and components.

The figures herein prefaced with the number "1" pertain to an emergency eye wash 120 according to one embodiment of the present invention. Further, all element numbers in the 100 series pertain to various components and features of eyewash 120. The figures herein prefaced with the number "2" pertain to a eyewash system 220 according to one embodiment of the present invention.

Eyewash 120 includes a valve block 160 provided with water from an inlet 122, and providing a spray of water through a pair of eyepieces 121 to a person needing an emergency eyewash. Apparatus 120 can be attached to a wall by a support bracket 126, which can be coupled to a attachment plate 124 attached to the wall. Water flowing out of block 160 is captured in a bowl 170 that provides the water to and outlet drain 124.

Figures 1, 2:
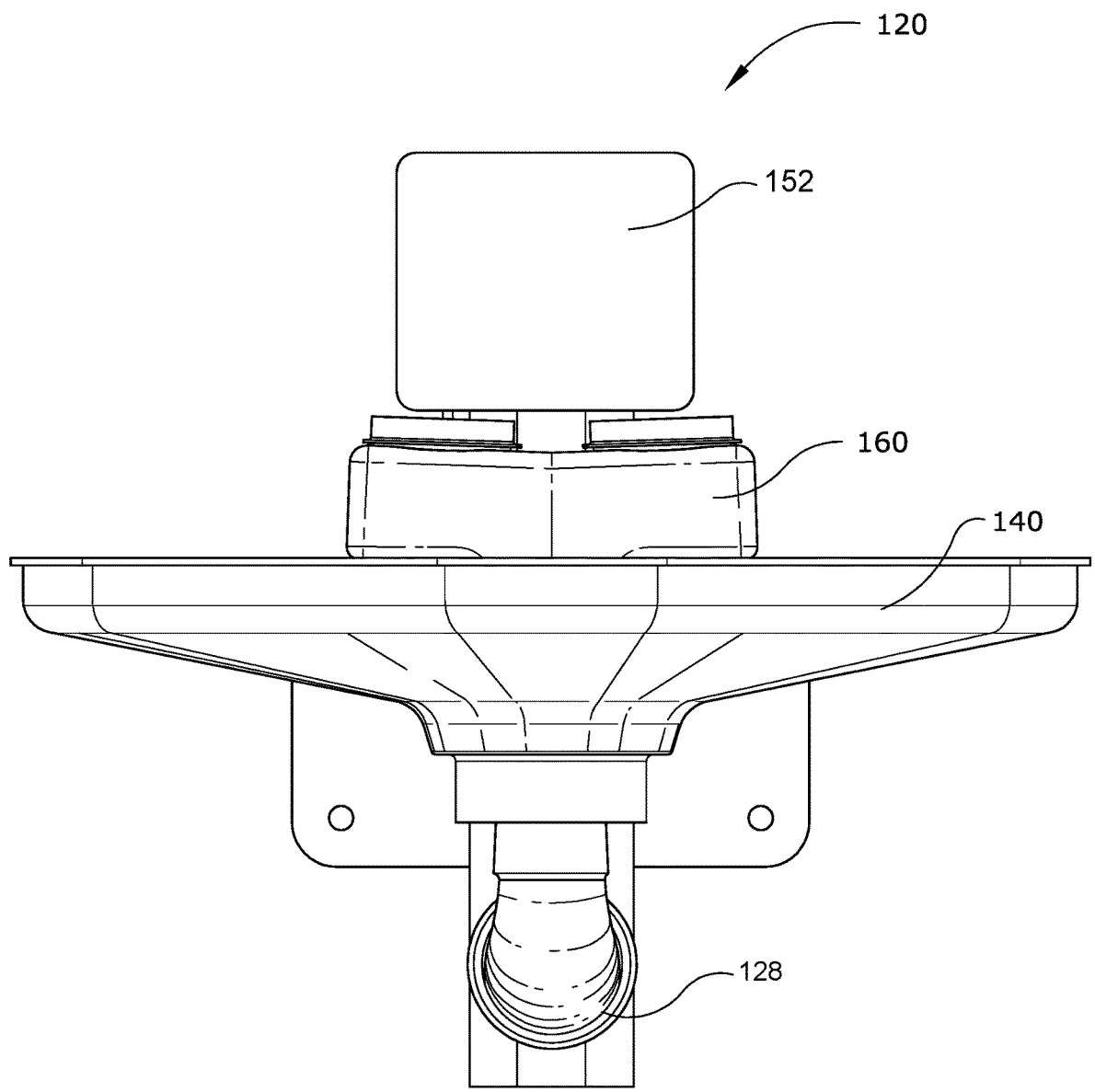
Figures 1, 2, 3:
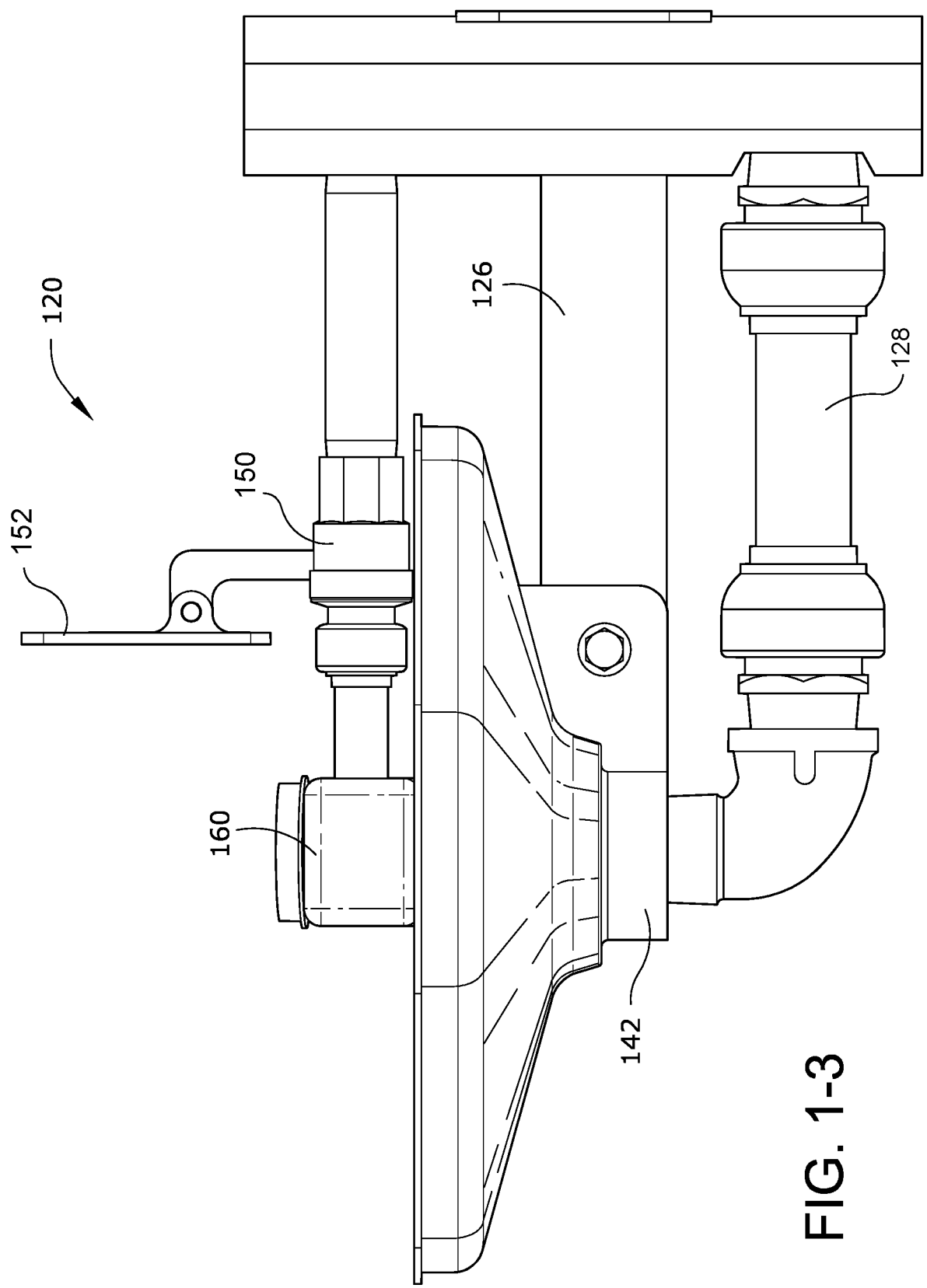

Eyewash 120 includes a shutoff valve 160 that must be actuated by the user before water will exit from eyepieces 121. As best seen in FIGS. 1-1, 1-2, and 1-3, shutoff valve 150 is placed in the central inlet line 122, and in some embodiments is a ball-type valve. The ball can be rotated so as to begin the flow of water by the user pushing forward on centrally located paddle 152. Paddle 152 is connected by an arm 152.1 to the axis of ball valve 150. Preferably, paddle 152 is centrally located relative to eyepieces 121, so that persons that are left-handed can use eyewash 120 as easily as persons that are right-handed.

It has been found that other emergency eyewash is typically have a mechanism on the right side of the eyewash that must be operated in order to achieve the washing flow. With such eyewash is, a person that is left-handed is largely put at a disadvantage, and may waste time trying to locate the right-handed mechanism. Further, panel 152 is up right and prominent, making it easy to see. In some embodiments, panel 152 includes a large, substantially flat surface upon which warning labels and instructional labels can be applied.

Referring to FIG. 1-4, head block 160 connects to shutoff valve 150 by way of a 2 and quick-release seal 169. In some embodiments, seal 169 includes a plurality of "shark teeth" that can provide a quickly-made seal between the inlet pipe of head block 160 and the outlet of shutoff valve 150.

In some embodiments head block 160 includes right and left hinged panels by which the user can quickly disconnect head block 160 from eyewash 120. The person can place their fingers on the panels, and rotate the paddles such that the distal ends of the paddles press against the face of seal 160. In so doing, the user can easily remove head block 160 by simply pulling it toward them while the seals are compressed. Preferably, head block 160 is not mechanically linked to the drain of bowl 170, such that the connection between the inlet pipe of the head block and the outlet of the shutoff valve is the only connection that needs to be made.

FIGS. 1-5, 1-6, 1-7 and 1-8 show various details of head block 160 and shutoff valve 150. It can be seen that head block 160 includes an inlet passage 162 that provides water from shutoff valve 150 to a central manifold 164. Manifold 164 extends both right and left toward eyepieces 121, and further extends downward toward a cavity 168.

In some embodiments, cavity 168 includes material for conditioning the water that is sprayed out of eyepieces 121. This material can be a filter material, activated charcoal, and astringent, or other apparatus useful to protect and wash eyes that have been exposed to a damaging chemical. Further, this protective material can be easily removed from head block 160, which is useful for those protective materials that lose their beneficial qualities after a period of time.

FIG. 1-9 shows a close-up of an eyepiece 121. Eyepiece 150 includes a plurality of spray holes, some of which are located in and outermost ring 152, others of which are located in a metal ring 154, and yet others that are centrally located. Eyepiece 150 further includes a sealing lip 156 that provides for easy installation and removal of eyepiece 150. Preferably, eyepiece 150 is fabricated from a flexible material that a person can easily manipulate to break off scale deposits.

FIGS. 2-1 to 2-4 show various embodiments of a thermostatically controlled valve V20 according to one embodiment of the present invention. It is understood that the prefix "V" to an element number refers only to the examples of FIGS. 2-1 through 2-4, although it is understood that such a thermostatically controlled as valve V20 can be used with any of the emergency wash systems shown herein.

FIG. 2-1 shows external orthogonal views of a valve V20 according to one embodiment of the present invention. Valve V20 is a thermostatically controlled valve, having a tower casing V22 coupled to a valve casing or housing V30. Housing V30 includes right and left ports for the inlet of water, and further includes a housing extension having an outlet V50 to provide a flow of tempered water.

FIG. 2-2 shows various cross sectional views of V20 as taken along section B-B of the central drawings within FIG. 2-1. It can be seen that valve V20 includes a thermostat assembly V24 housed within an internal cavity V45 of casing V22. Thermostat assembly V24 operates a metering section V32 housed within casing V30. As is well known, thermostat V24 and metering section V32 coact to mix hot and cold water and produce a flow of water at a predetermined temperature.

FIG. 2-3 is a cross sectional view of the apparatus of FIG. 2-1 as taken through section A-A of the top image of FIG. 2-1. Casing V30 includes right and left supports V34 that are adapted and configured to provide fluid communication between their corresponding water flows and the centrally located metering assembly V32.

Figures 1, 2, 3, 4:
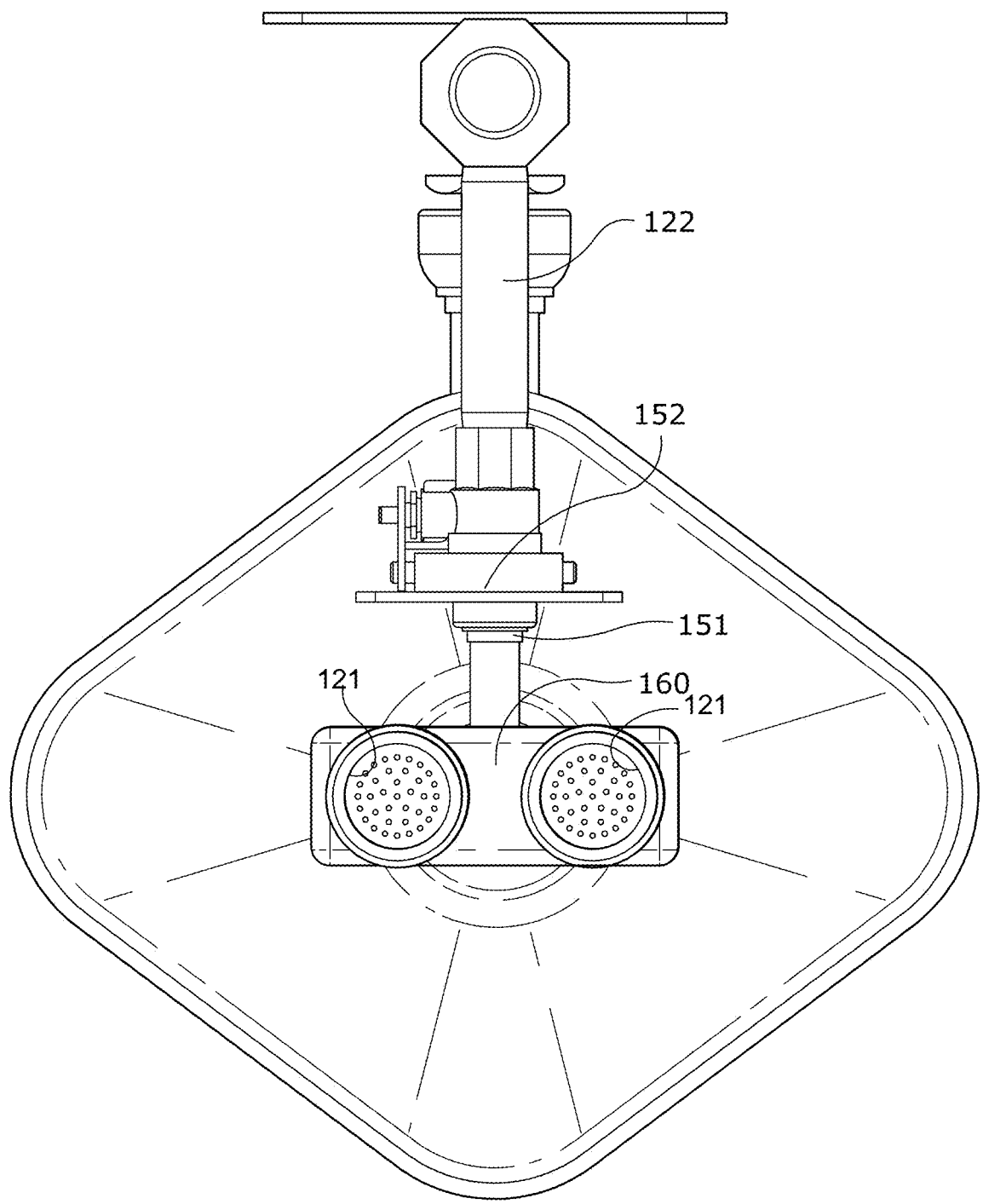

FIG. 2-4 is a close-up of the base housing V30. It can be seen that each casing inlet V34 includes within it identical check valve assemblies V40. Each valve V40 includes a bonnet or cap that closes one end of an inlet V34. Bonnet V42 is threadably received within a threaded interface V36 of inlet V34. An inlet seat V44 has an identical set of threads, and is threadably received within an identical threaded interface V36 at the other end of the inlet V34. The check valve assembly V40 on the left side of FIG. 2-4 is shown oriented with inlet seat V44 at the top, and therefore able to accept water from the top. The right side inlet V34 shows a check valve V40 in the opposite orientation, with bonnet V42 located at the top, and the inlet seat V44 screwed into the bottom female threaded interface V36.

Each check valve includes a spring V48 that is captured between a spring support V44 of bonnet V42 and a disk V47a. Disk V47a is captured by a screw to an acorn nut V49, with a gasket V47b sandwiched inbetween. The right side check valve V40 of FIG. 2-4 is shown in the closed position, with adjusting screw V41 tightened down so as to force a shutoff between gasket V47b and a sealing lip of seat V44. It is appreciated that adjustment screw V41 can be placed in an operational condition, such as that shown on the left side check valve V40, where screw V41 has been adjusted to a position providing nominal spring force to compress left side gasket V47b against the sealing lip of left side seat V44.

Referring to the topmost figure of FIG. 2-2, there is shown a cross sectional view through section B-B of the central image of FIG. 2-1. It can be seen that valve V20 preferably includes an outlet extension V50 that includes top and bottom apertures for the outward flow of tempered water. It is understood that housing extension V50 is preferably machined with pipe threads on both top and bottom of the common bore, and therefore able to accept an outlet connection on either the top or bottom. A pipe cap is threaded into the unused aperture.

Figures 1A, 3:
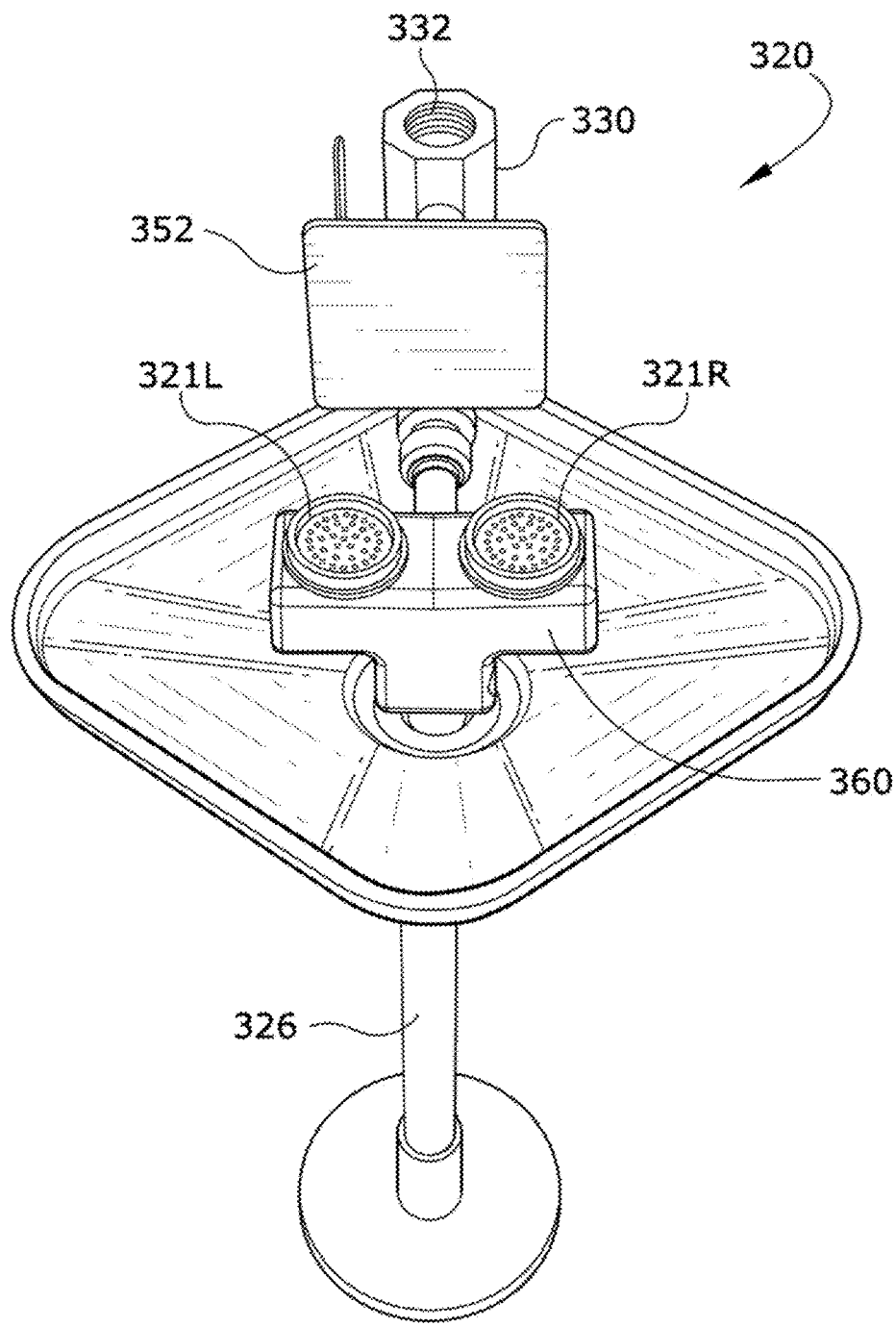
Figures 1B, 3:
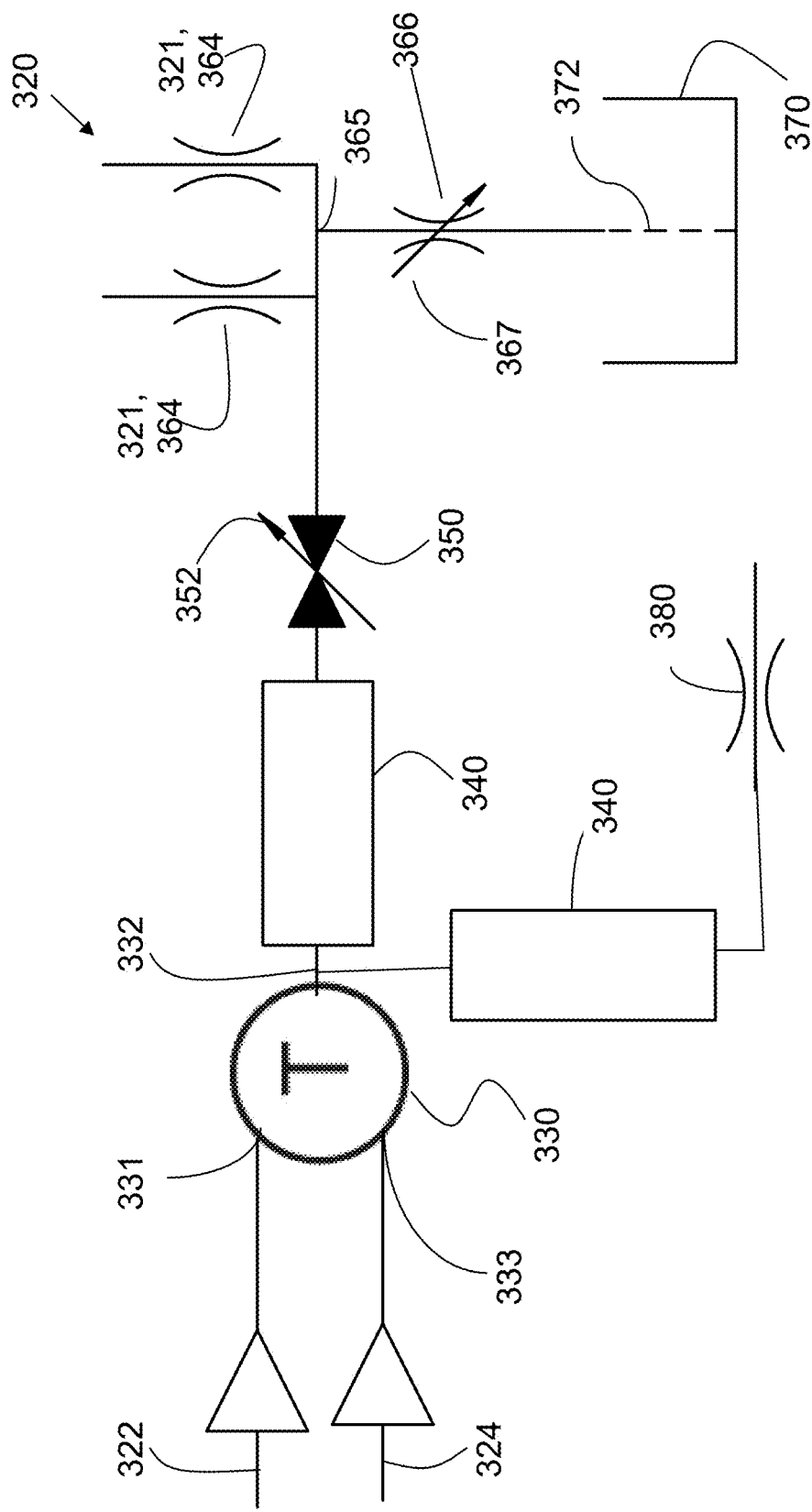
Figures 1C, 3:
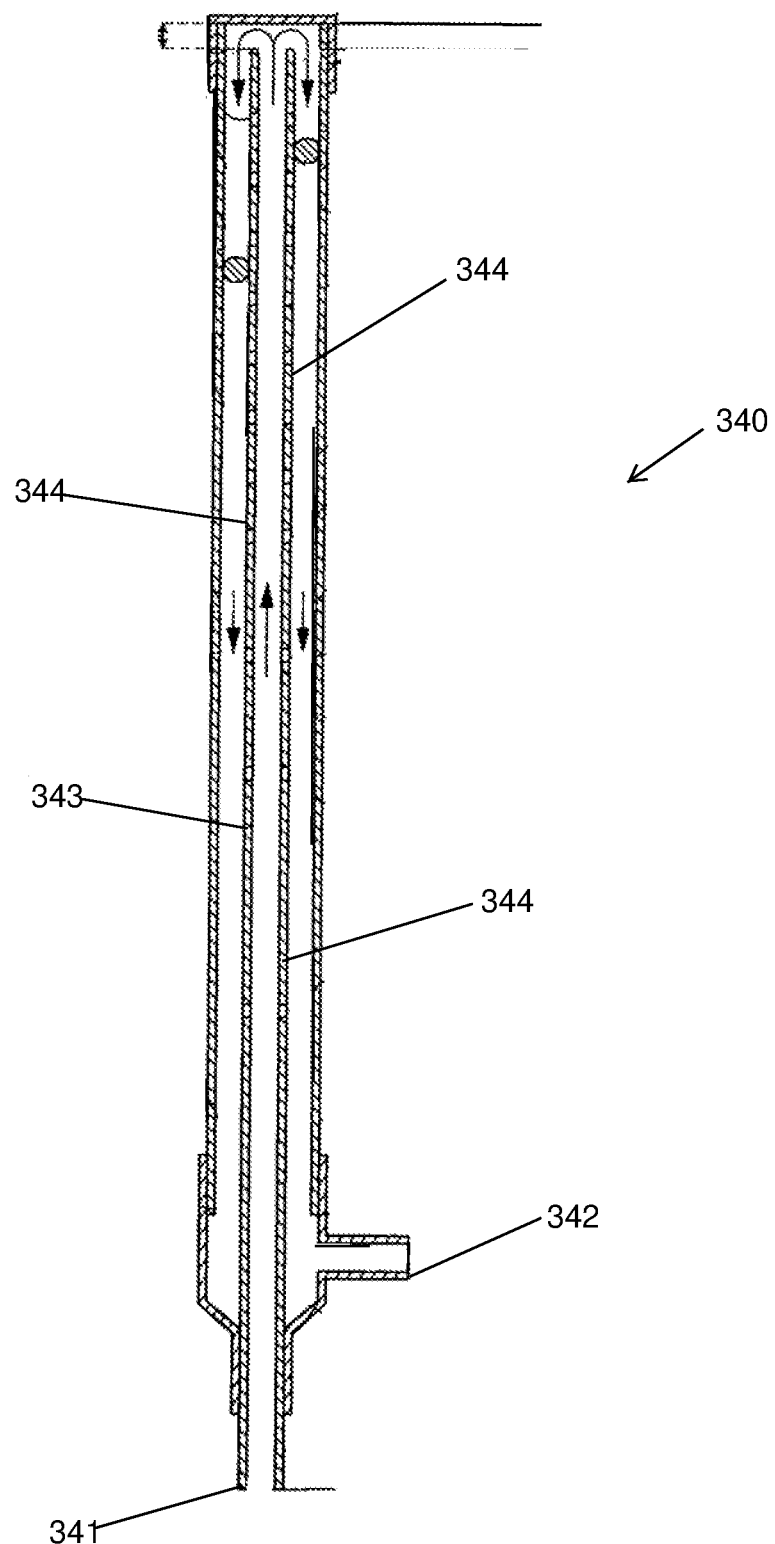
Figures 2, 3:
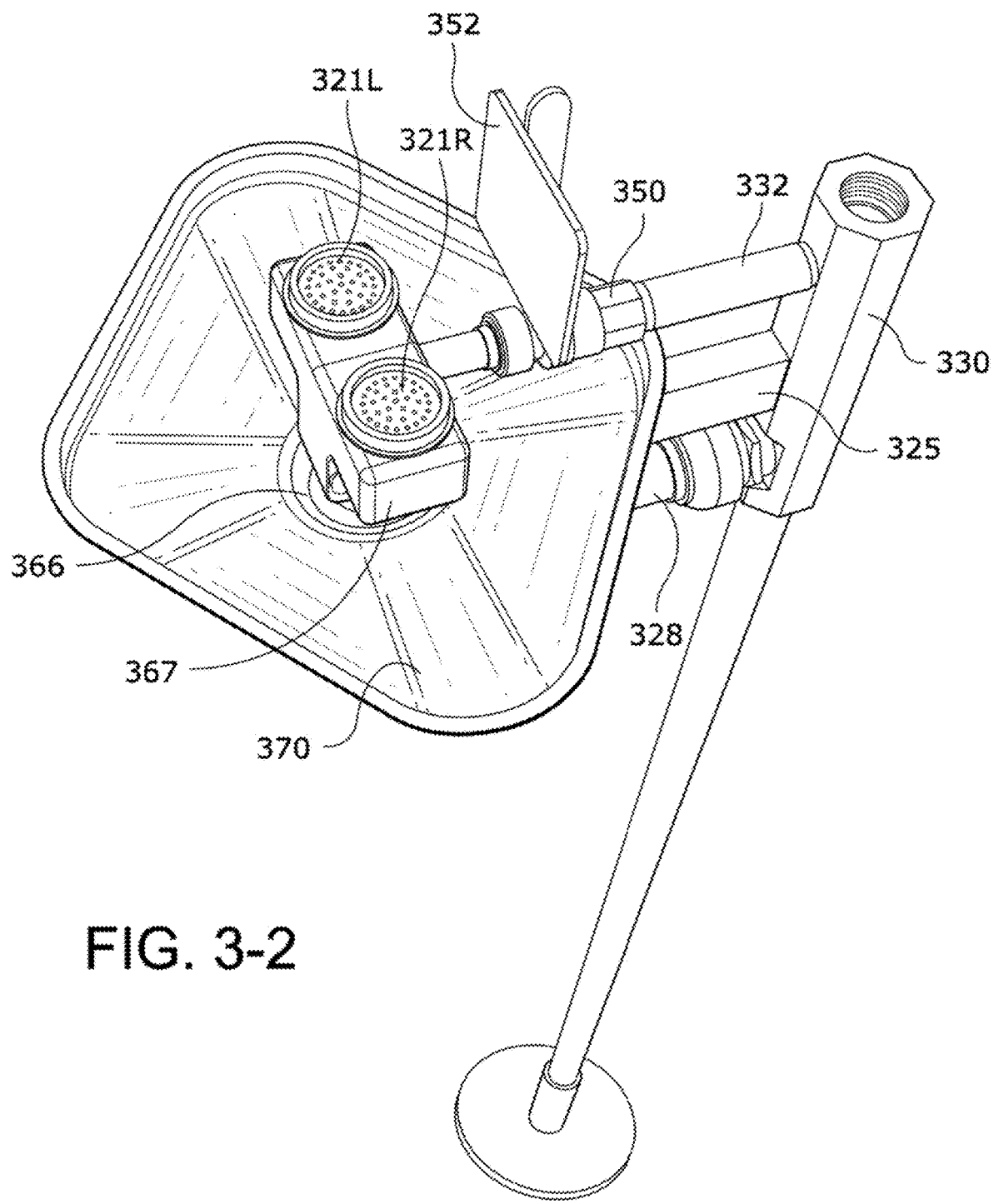
Figure 3:
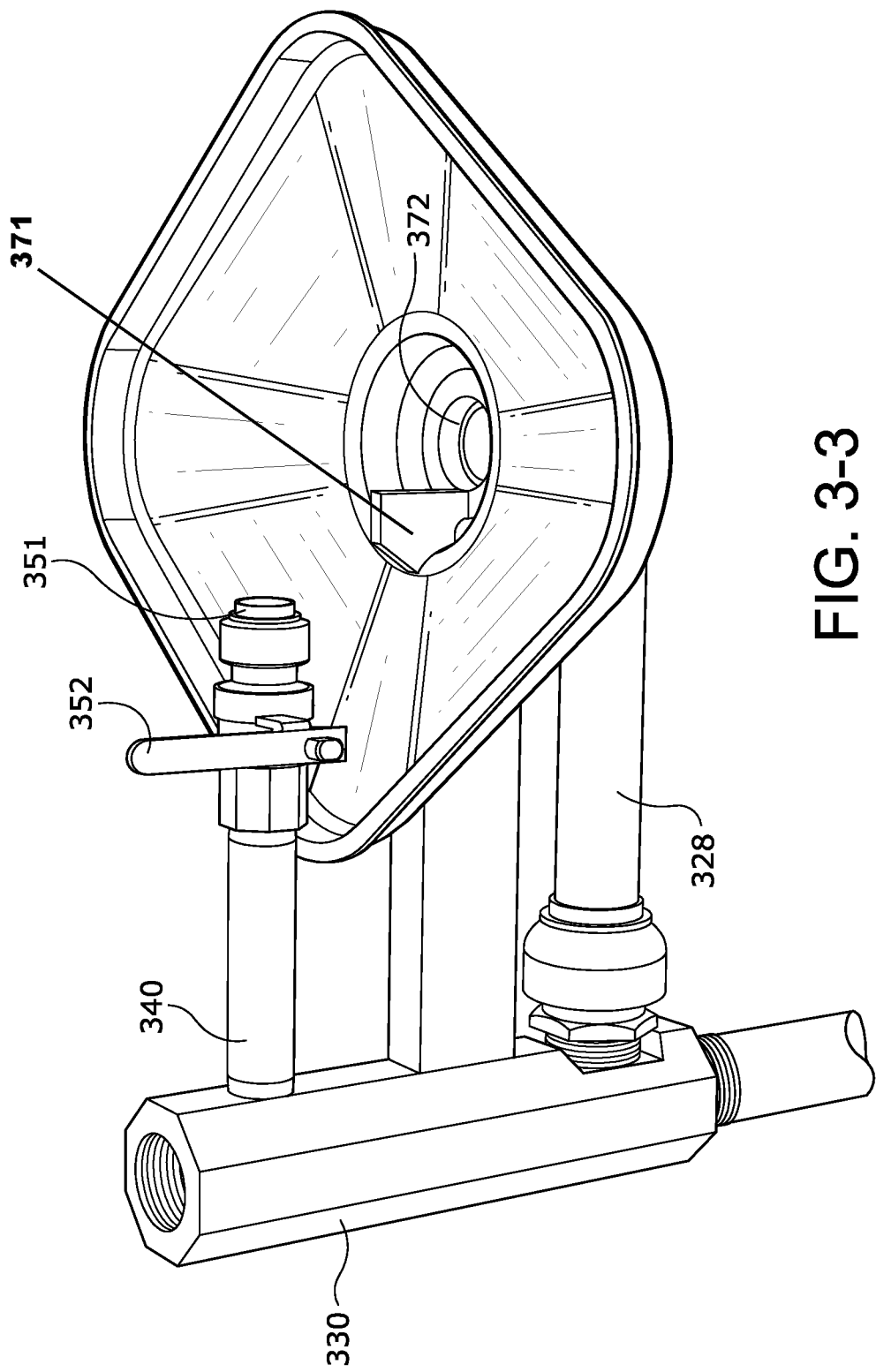
Figures 3, 4:
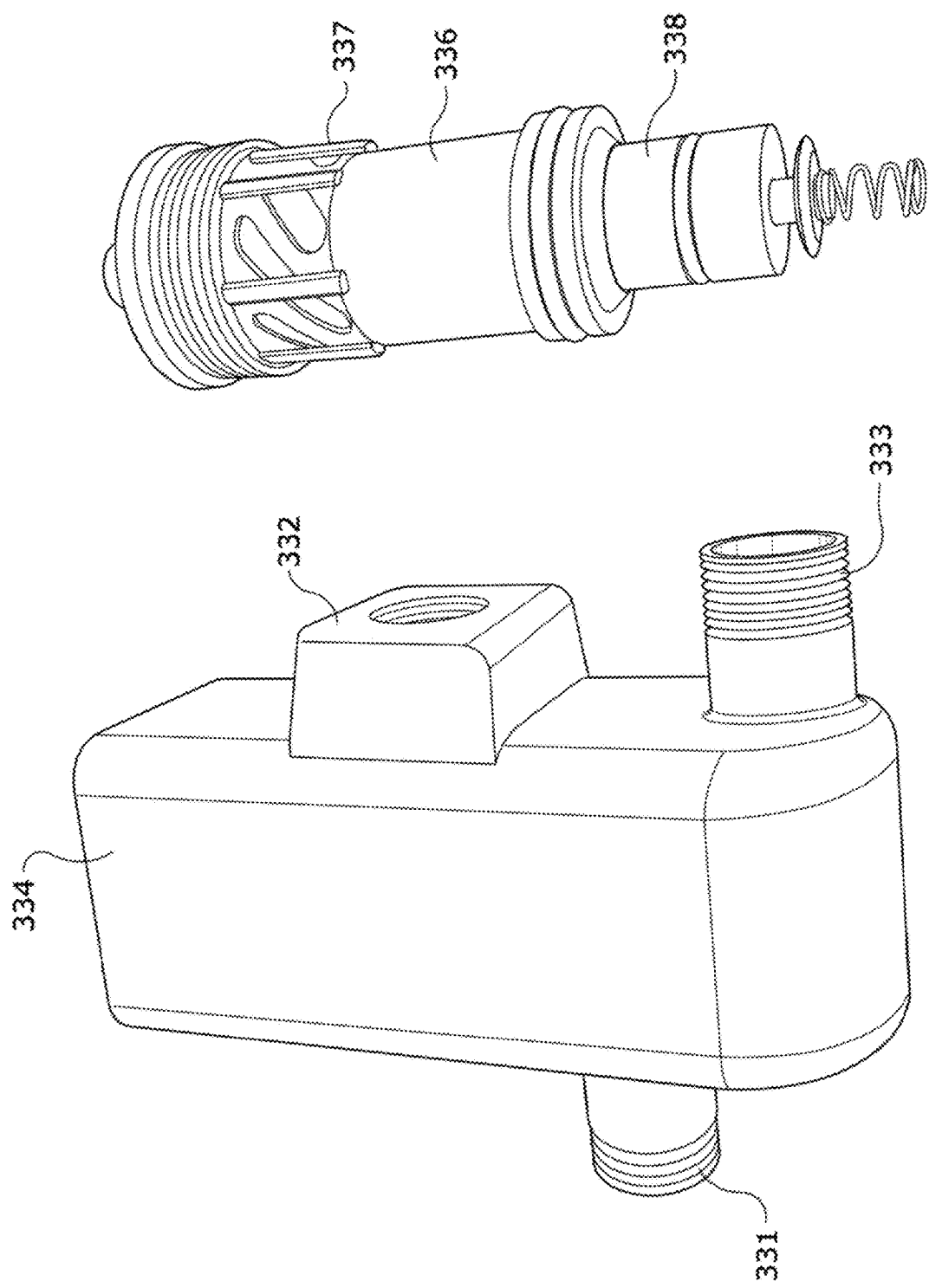
Figures 3, 4, 5:
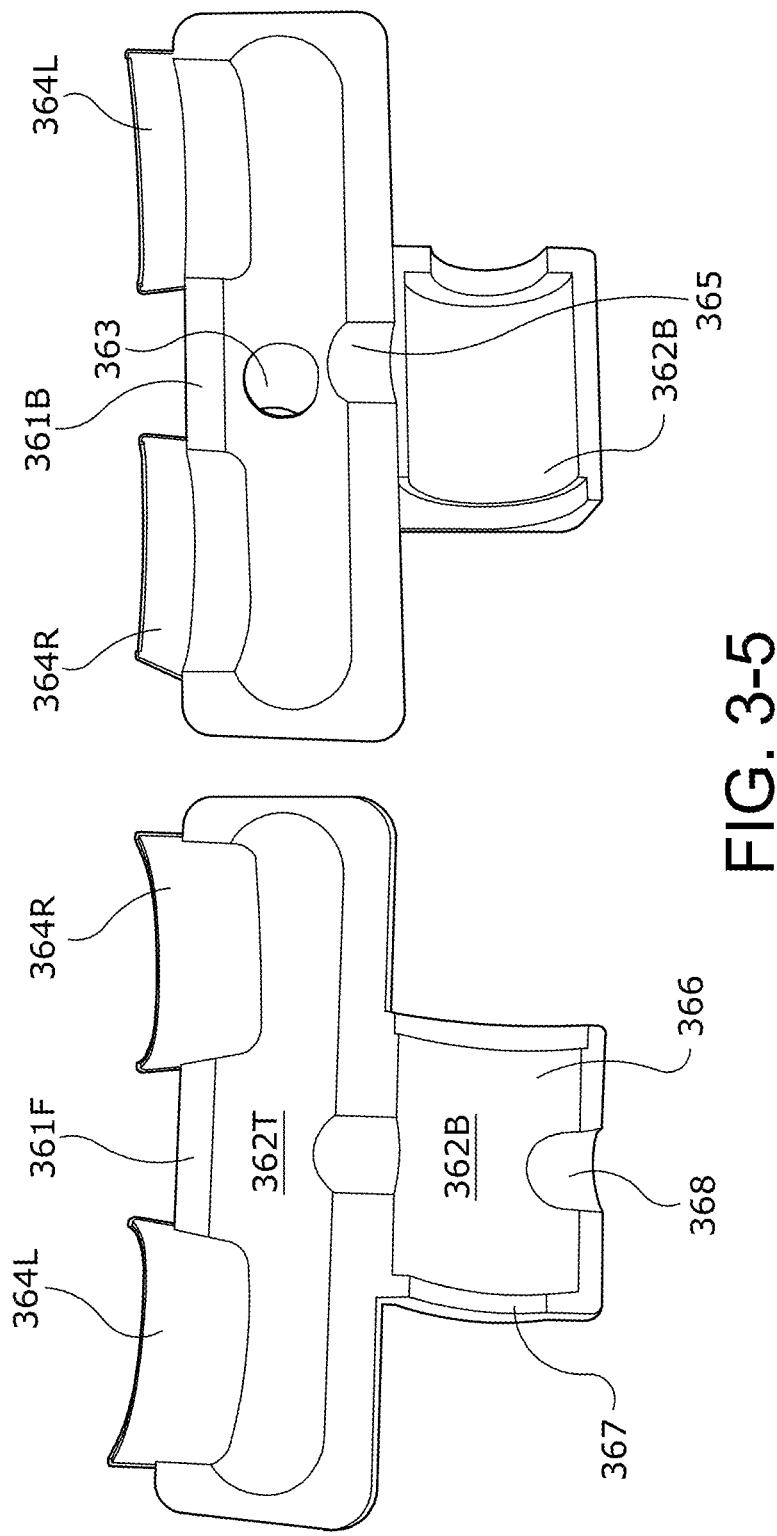
Figures 3, 4, 5, 6, 6A:
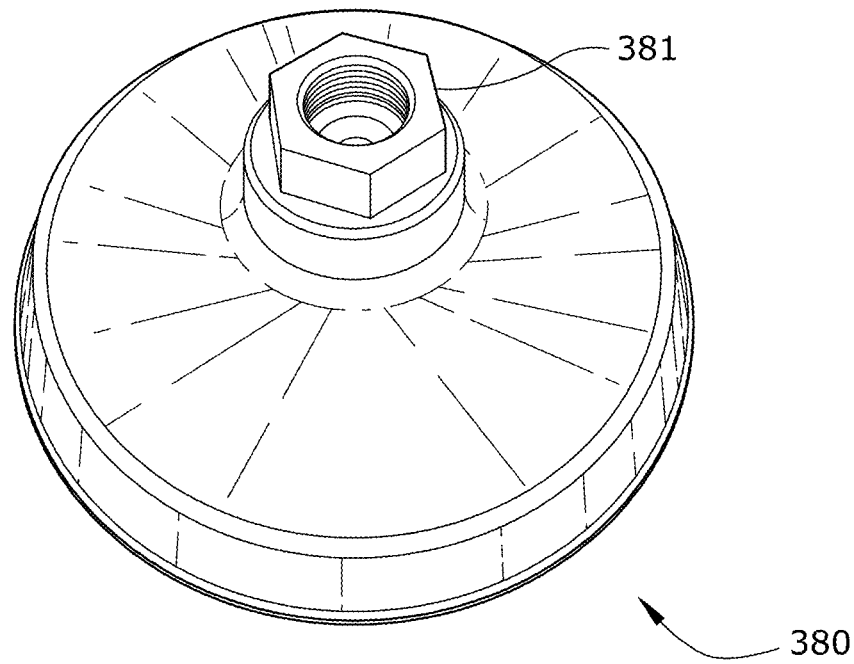
Figures 3, 4, 5, 6, 6B:
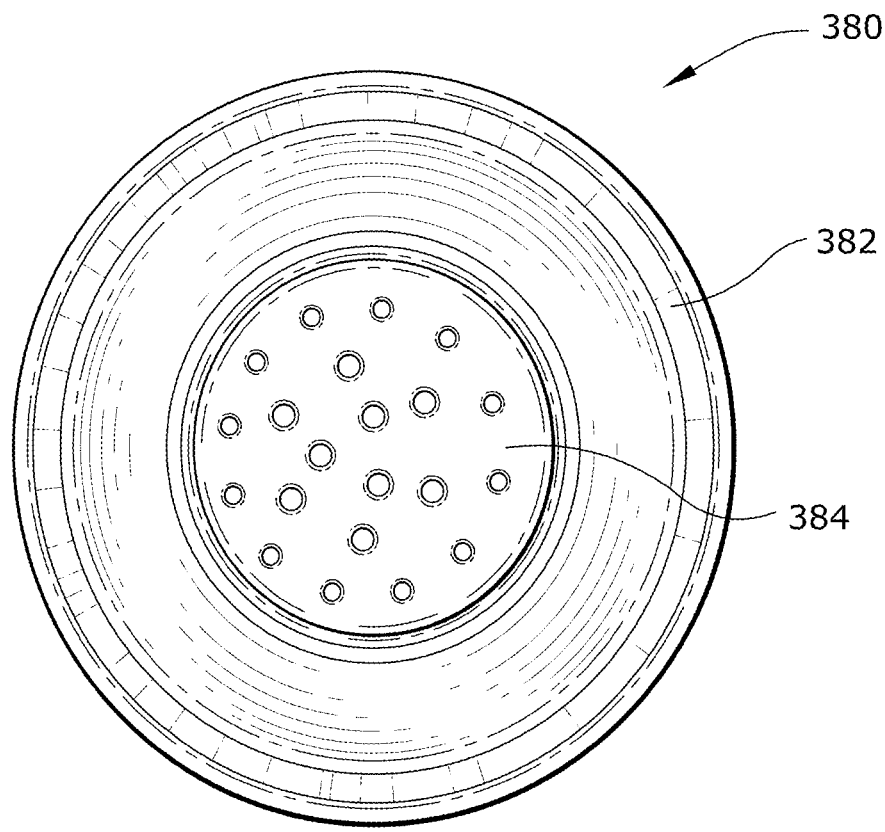
Figures 3, 4, 5, 6, 7:
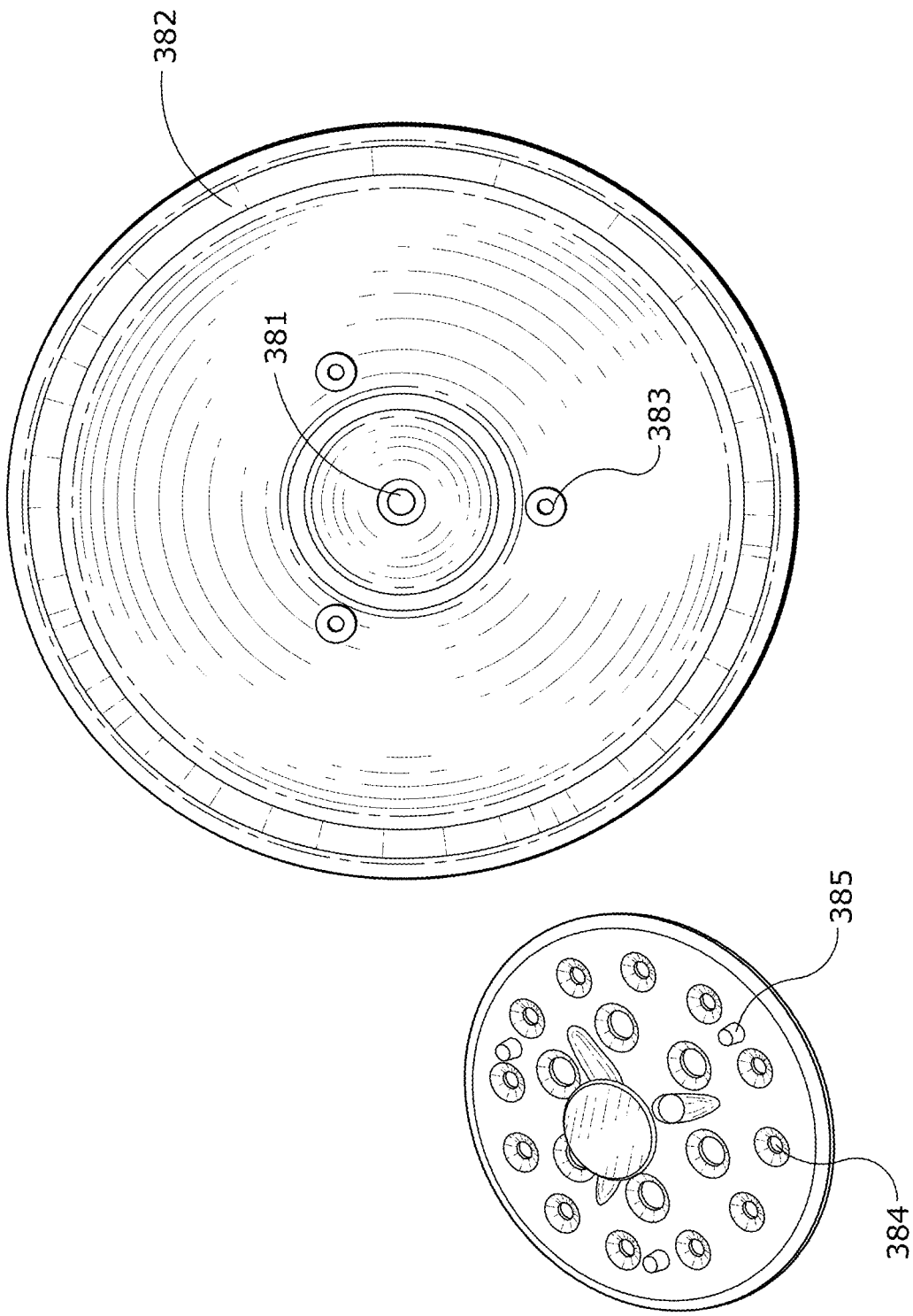
Figures 3, 4, 5, 6, 7, 8:
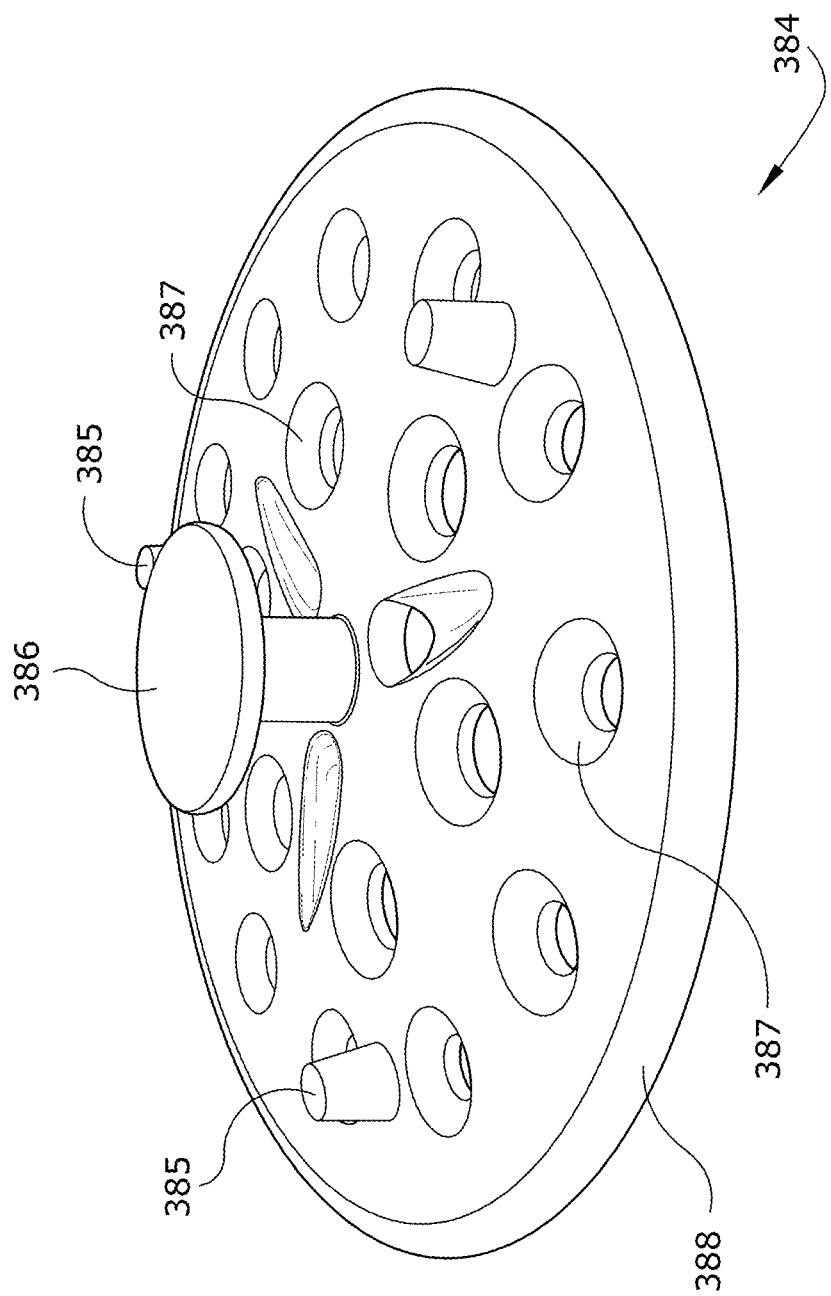
Figures 4, 5, 6, 7, 8, 9:
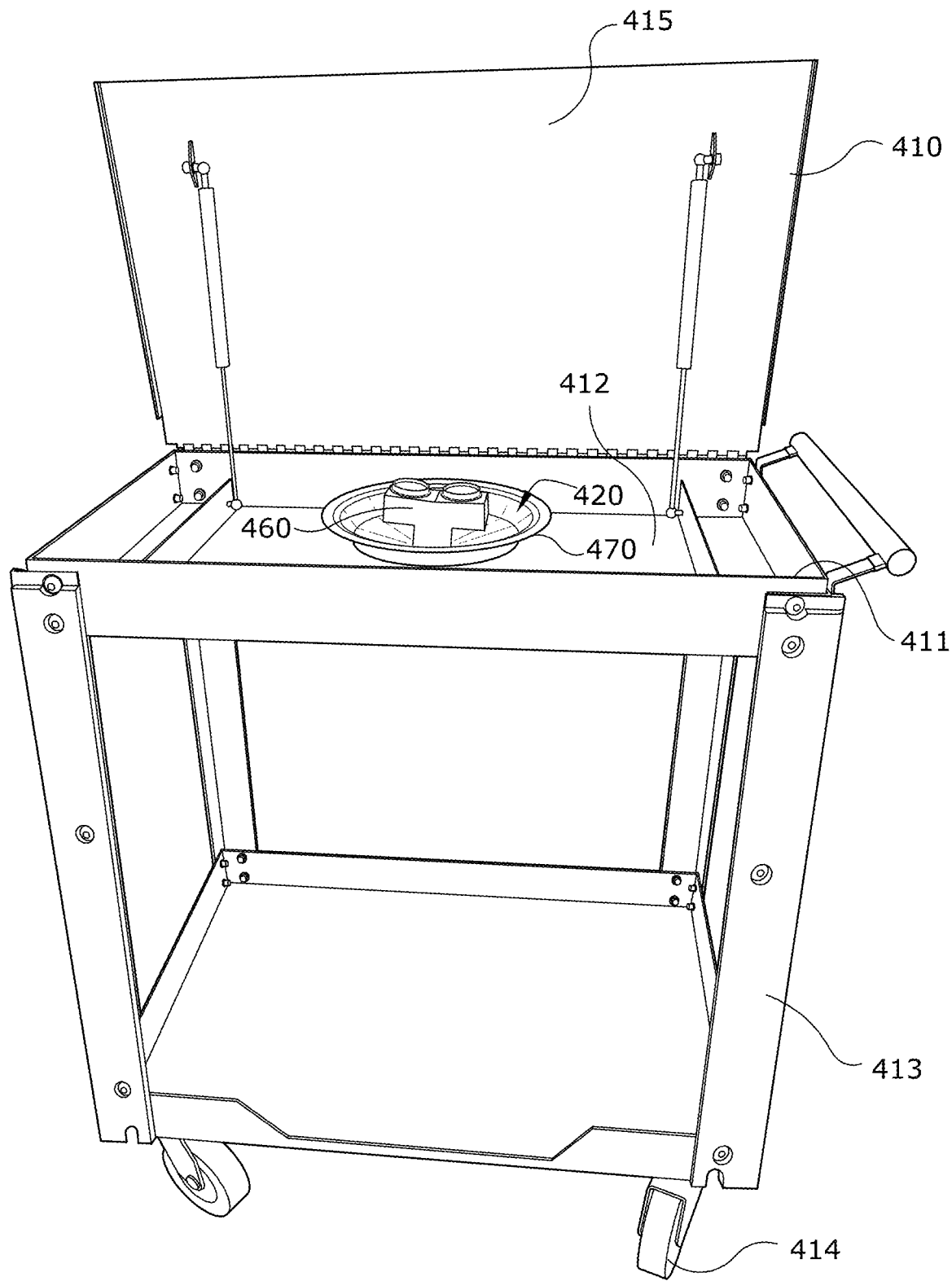
Figures 4, 5, 6, 7, 8, 9, 10:
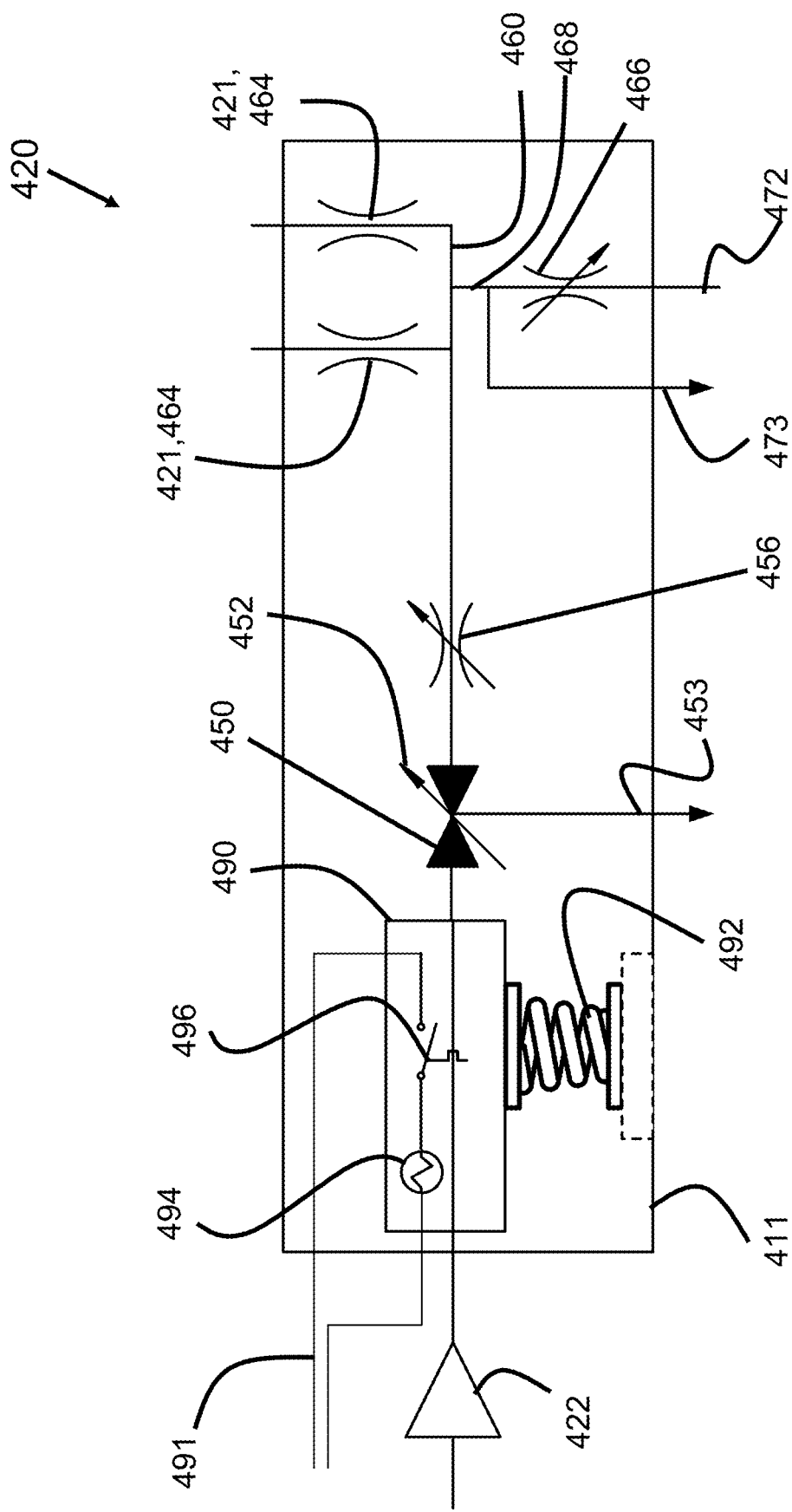
Figures 4, 5, 6, 7, 8, 9, 10, 11, 11B:
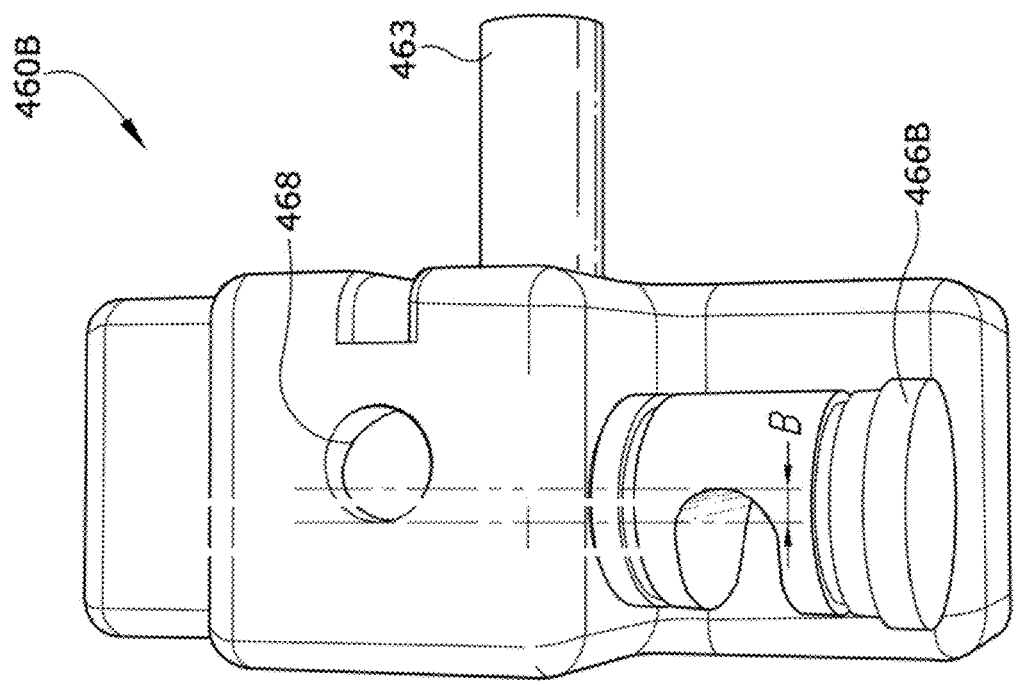
Figures 4, 5, 6, 7, 8, 9, 10, 11, 11A:
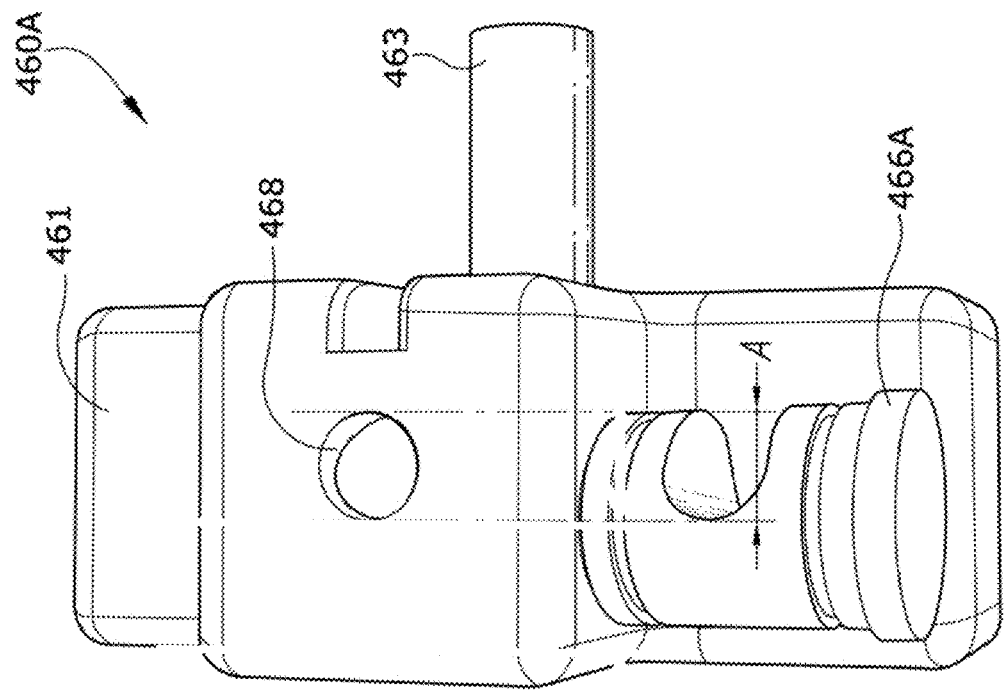
Figures 1, 5:
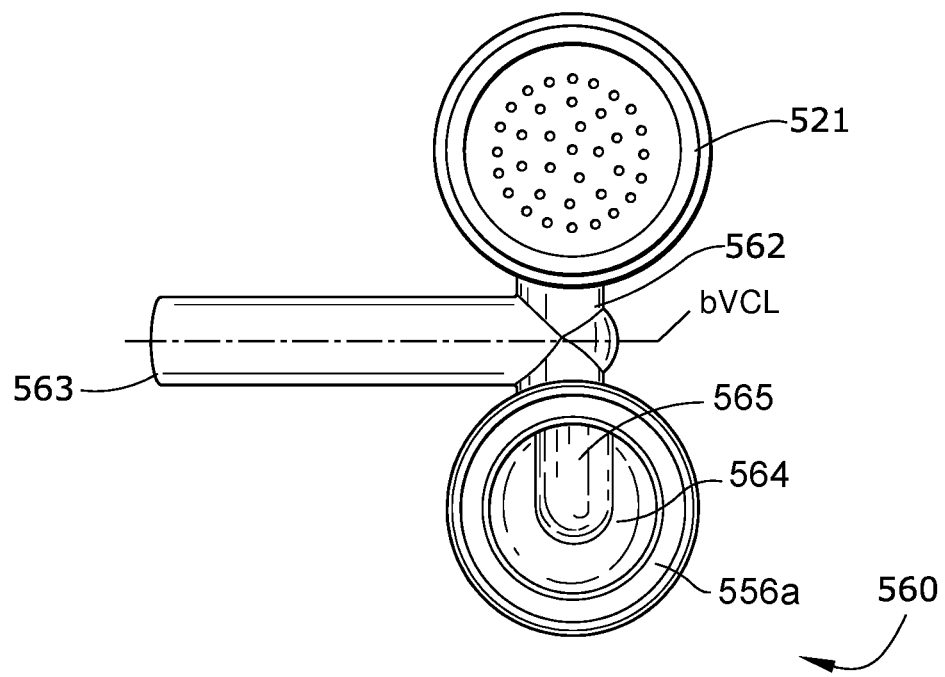
Figures 2, 5:
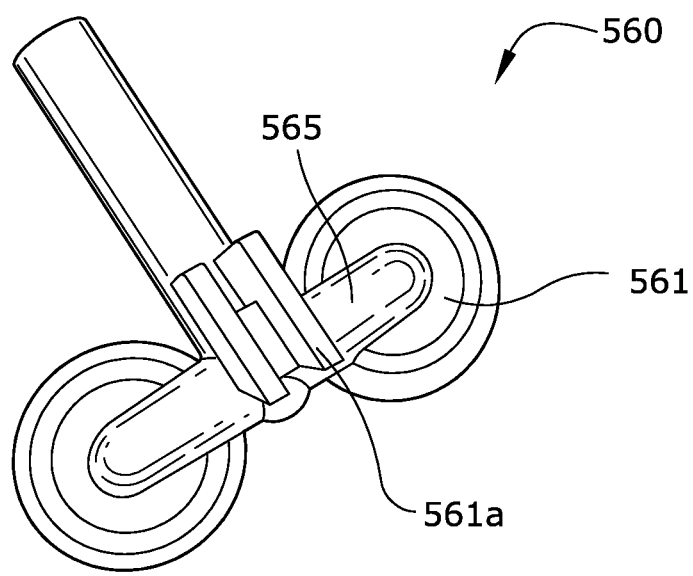
Figures 3, 5:
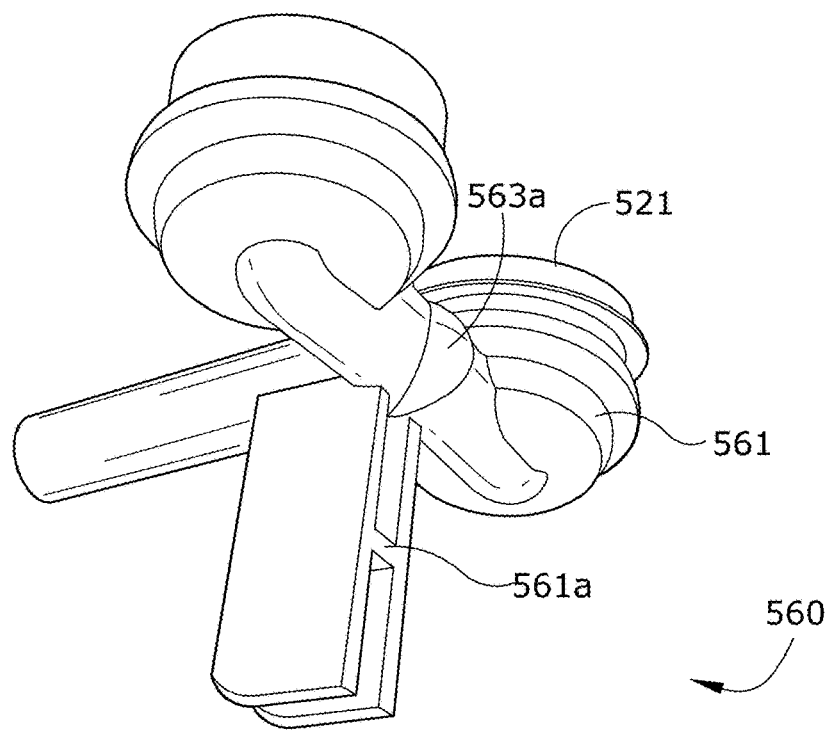
Figures 4, 5:
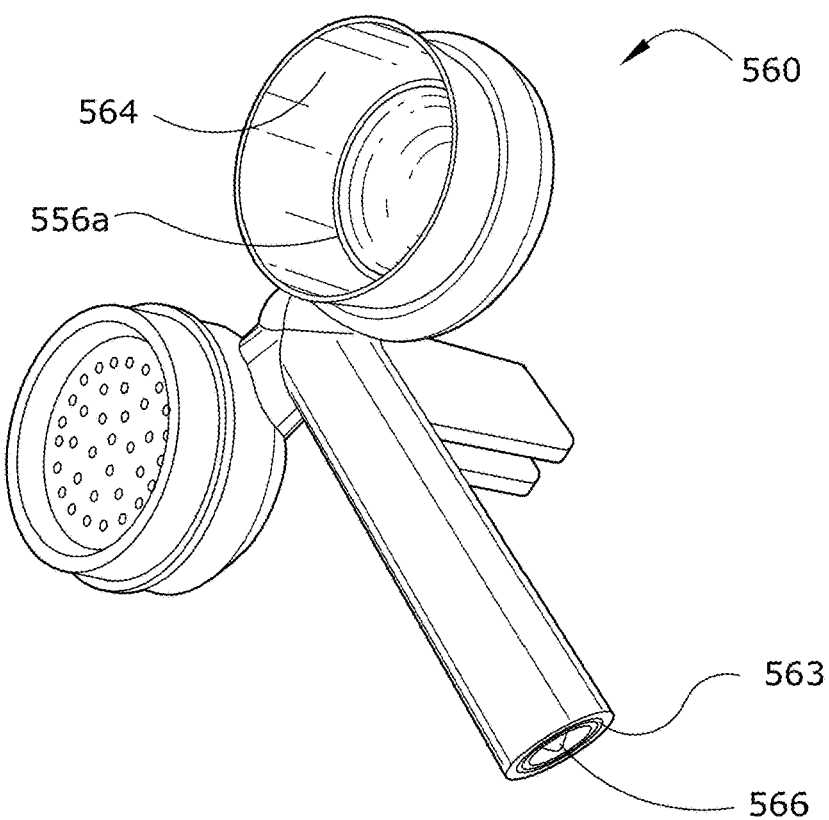
Figures 5, 6, 7:
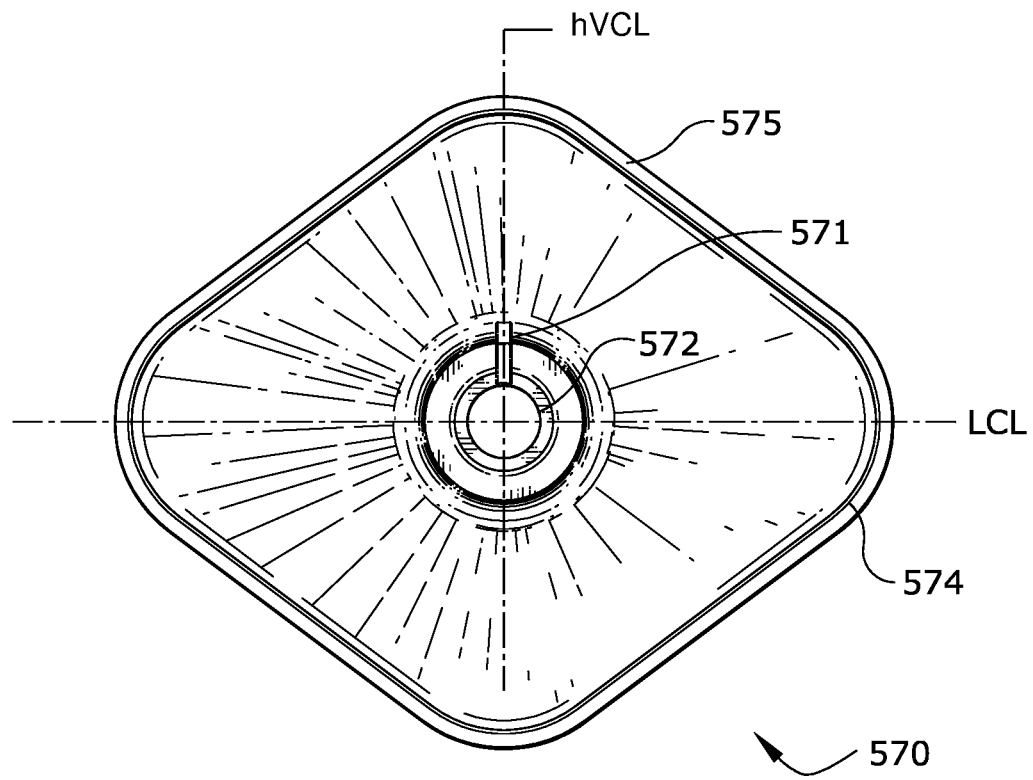
Figures 5, 6, 7, 8:
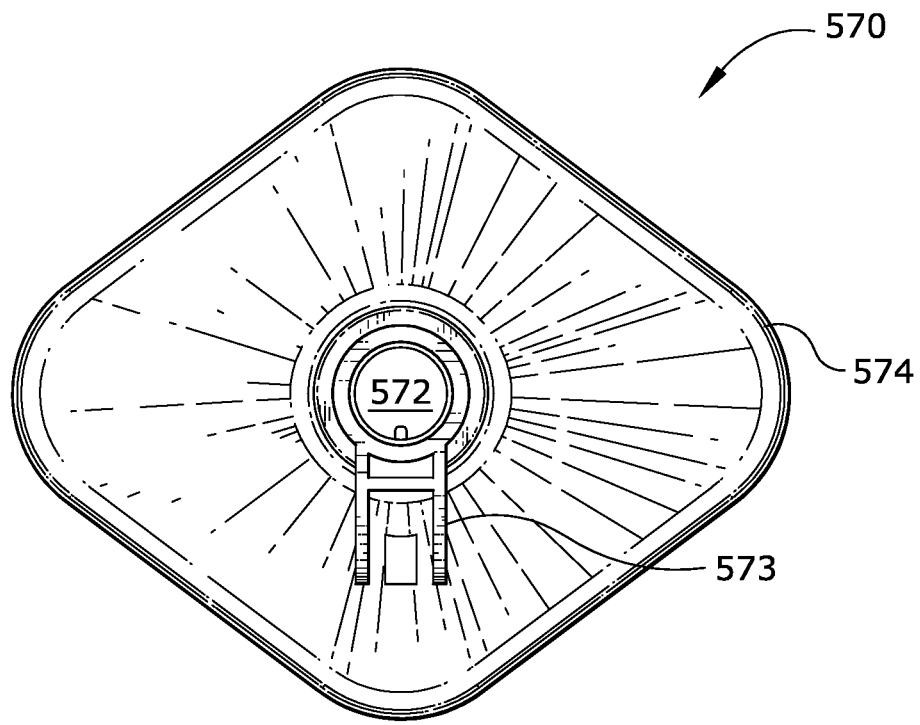
Figures 5, 6, 7, 8, 9:
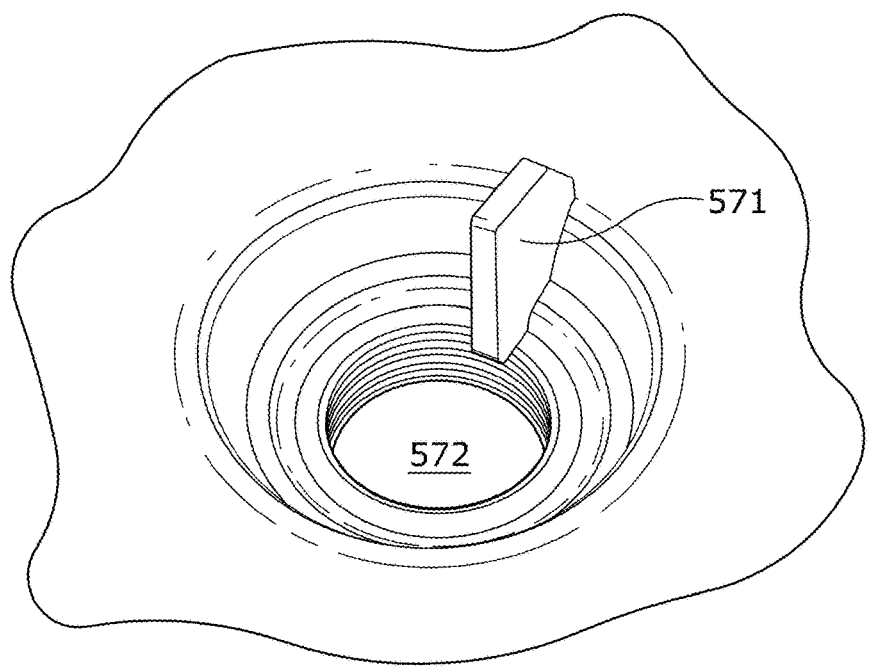
Figures 5, 6, 7, 8, 9, 10:
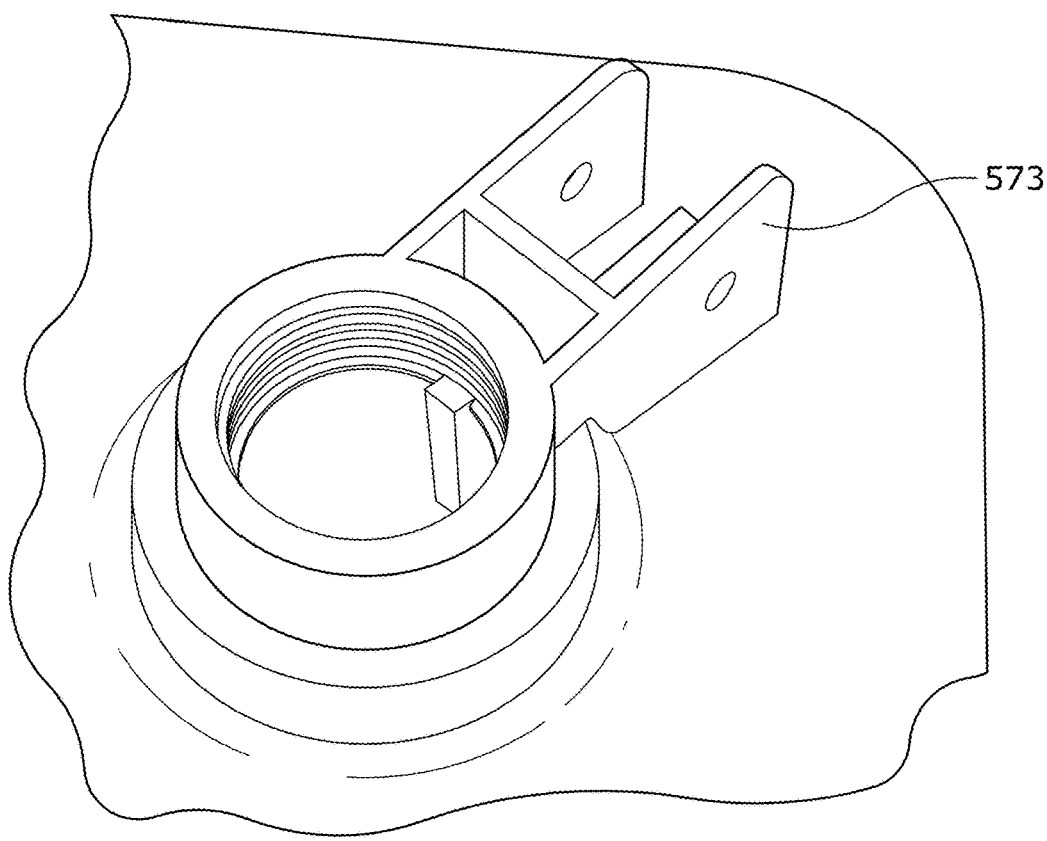
Figures 5, 6, 7, 8, 9, 10, 11:
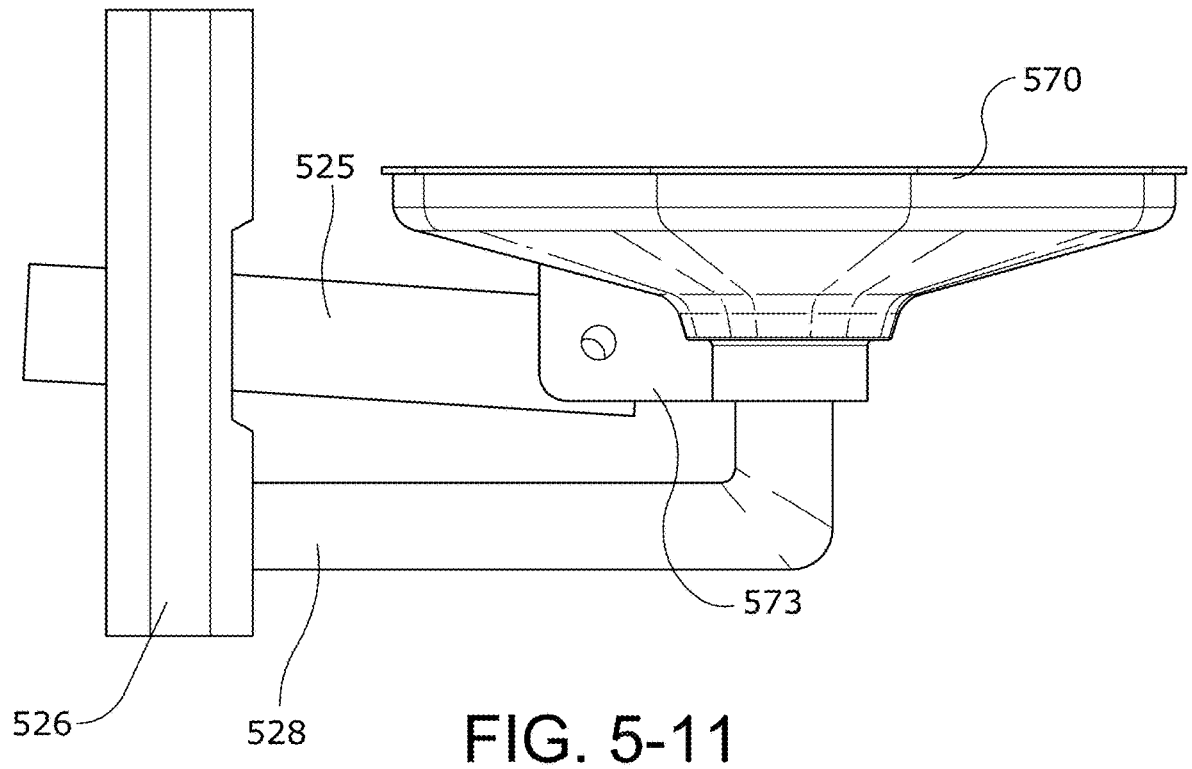
Figures 5, 6, 7, 8, 9, 10, 11, 12:
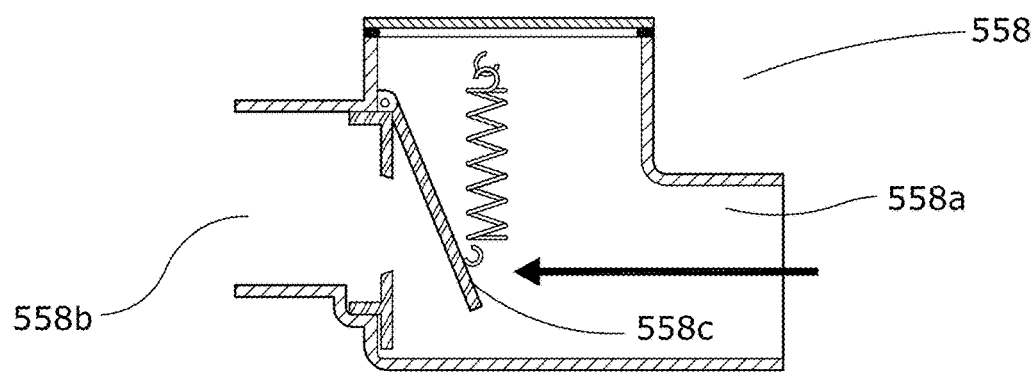
Figures 5, 6, 7, 8, 9, 10, 11, 12, 13:
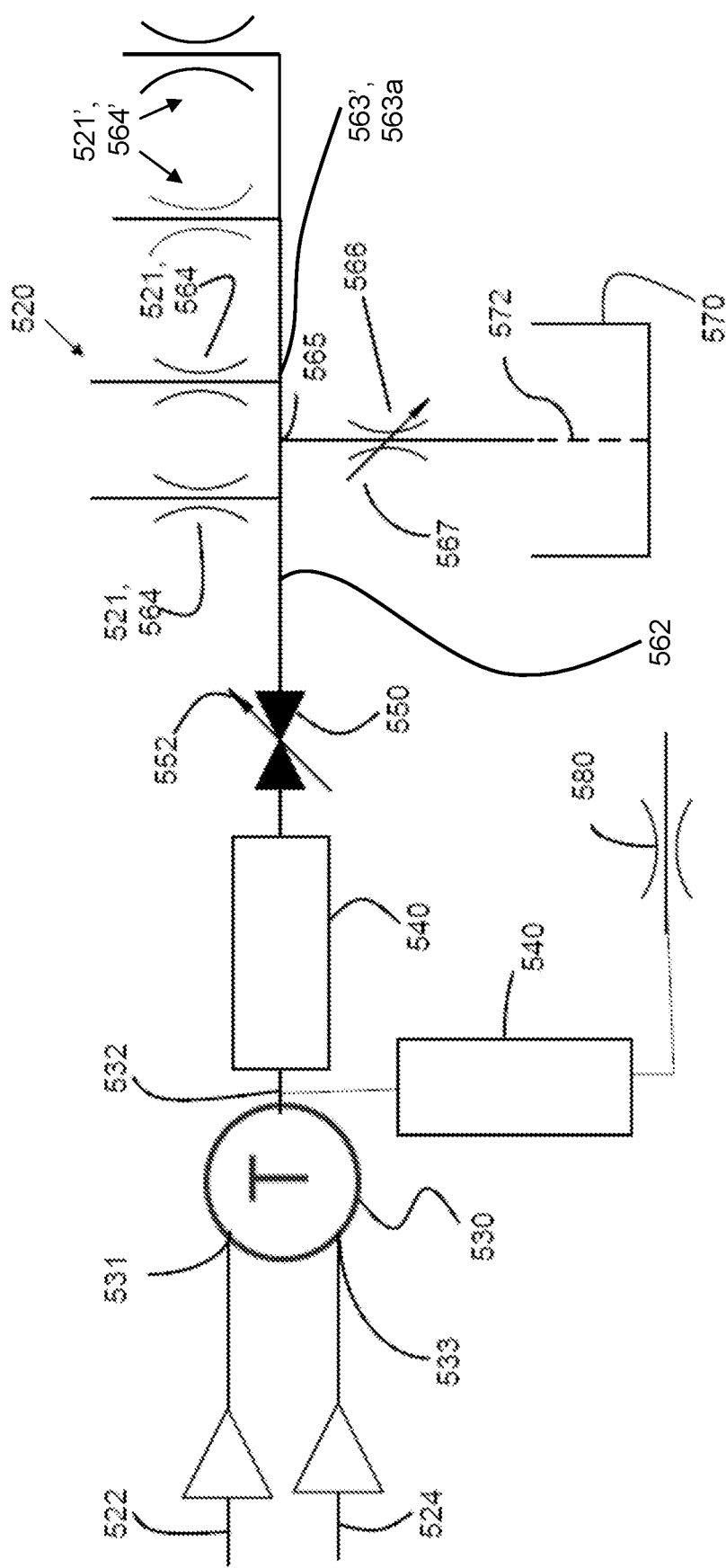
Figures 5, 6, 7, 8, 9, 10, 11, 12, 13, 14:
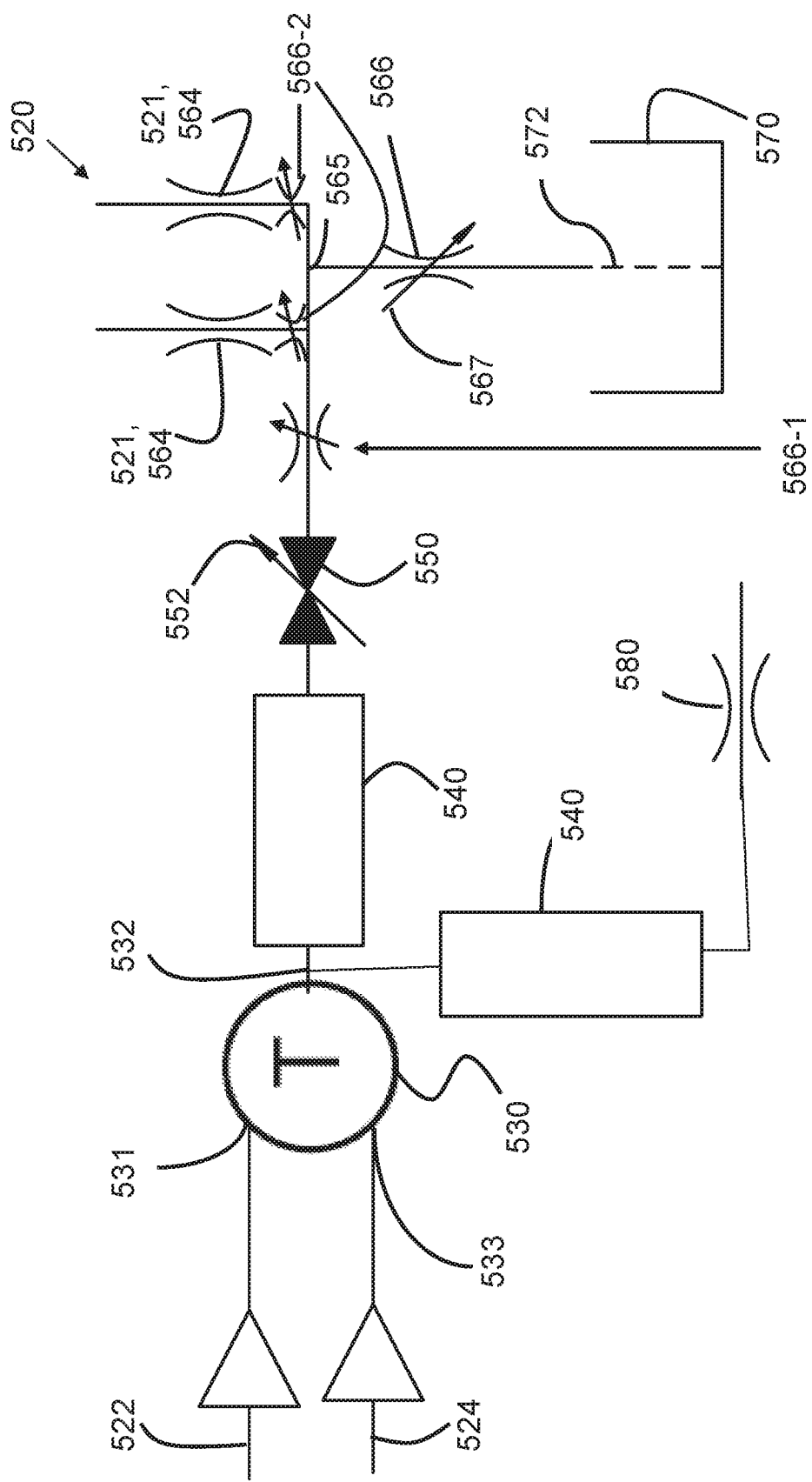
Figures 1, 6:
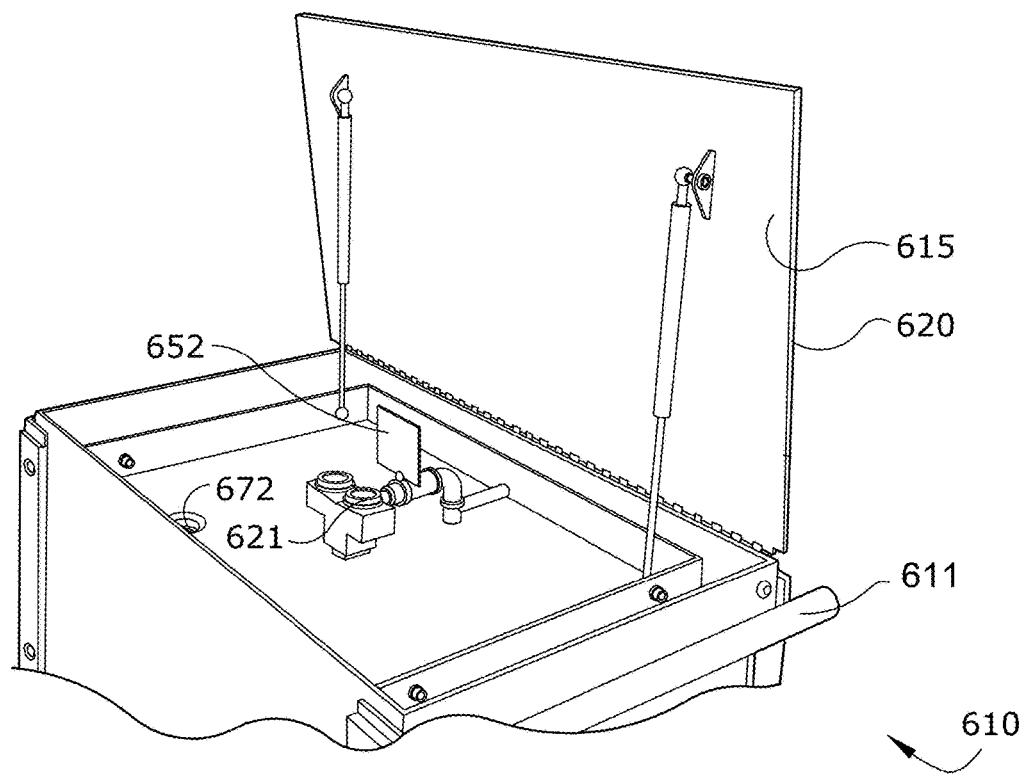
Figures 2, 6:
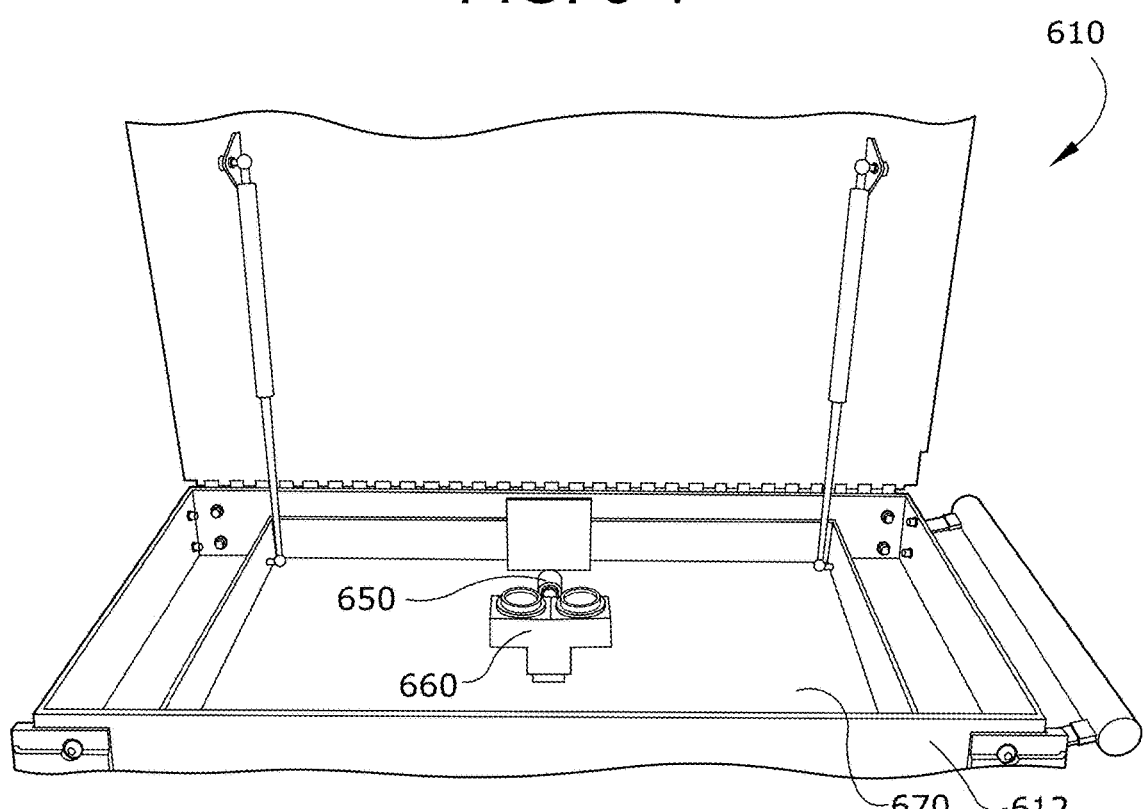
Figures 3, 6:
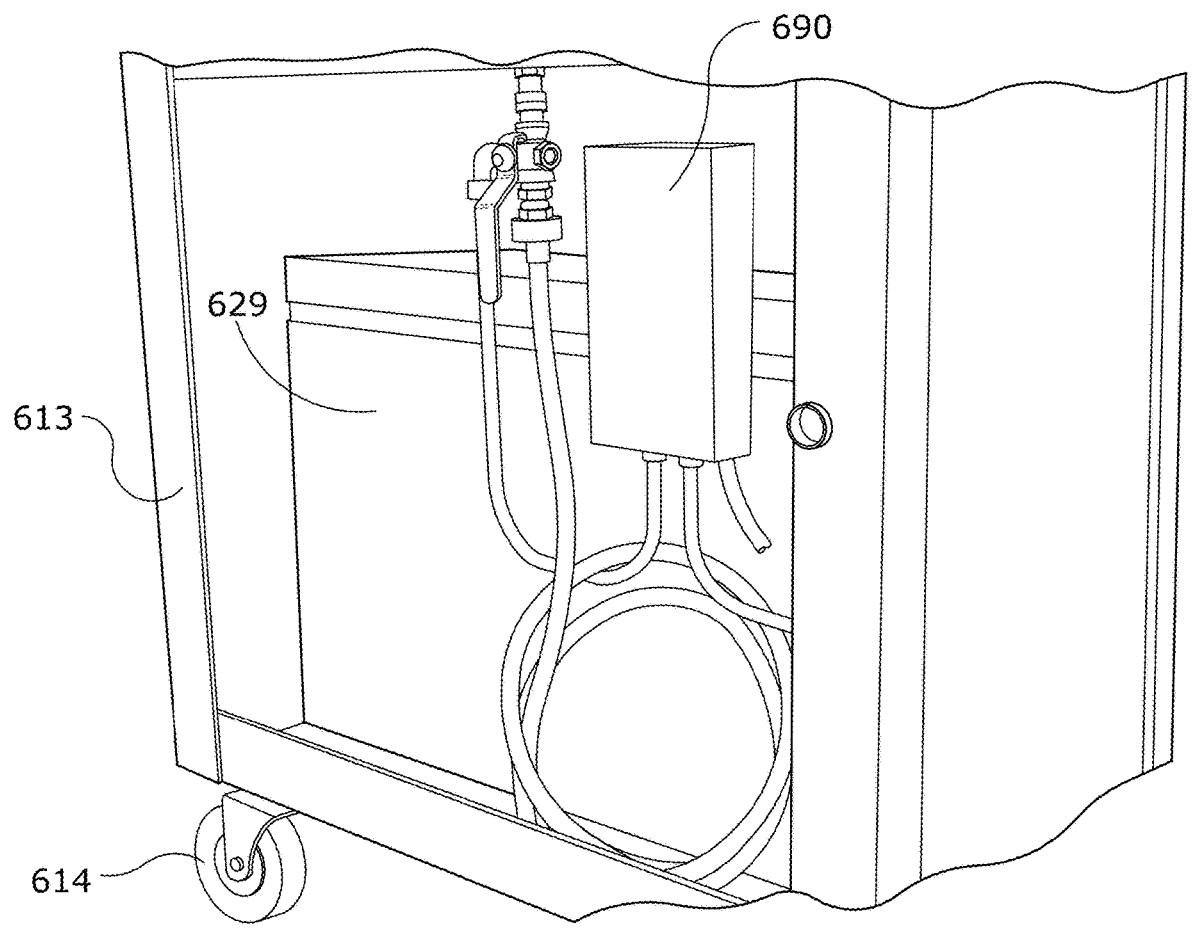
Figures 4, 6:
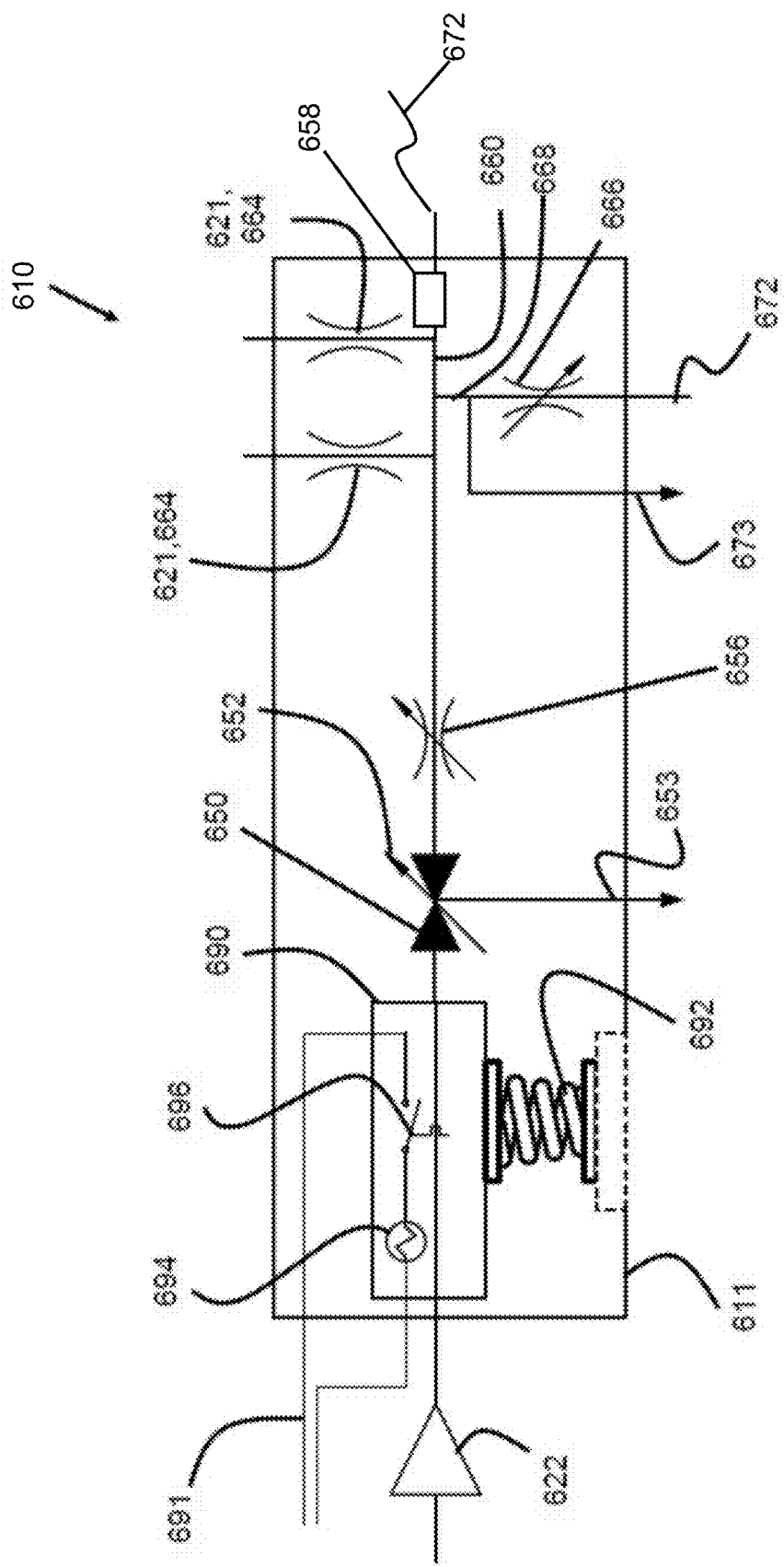
Figures 5, 6:
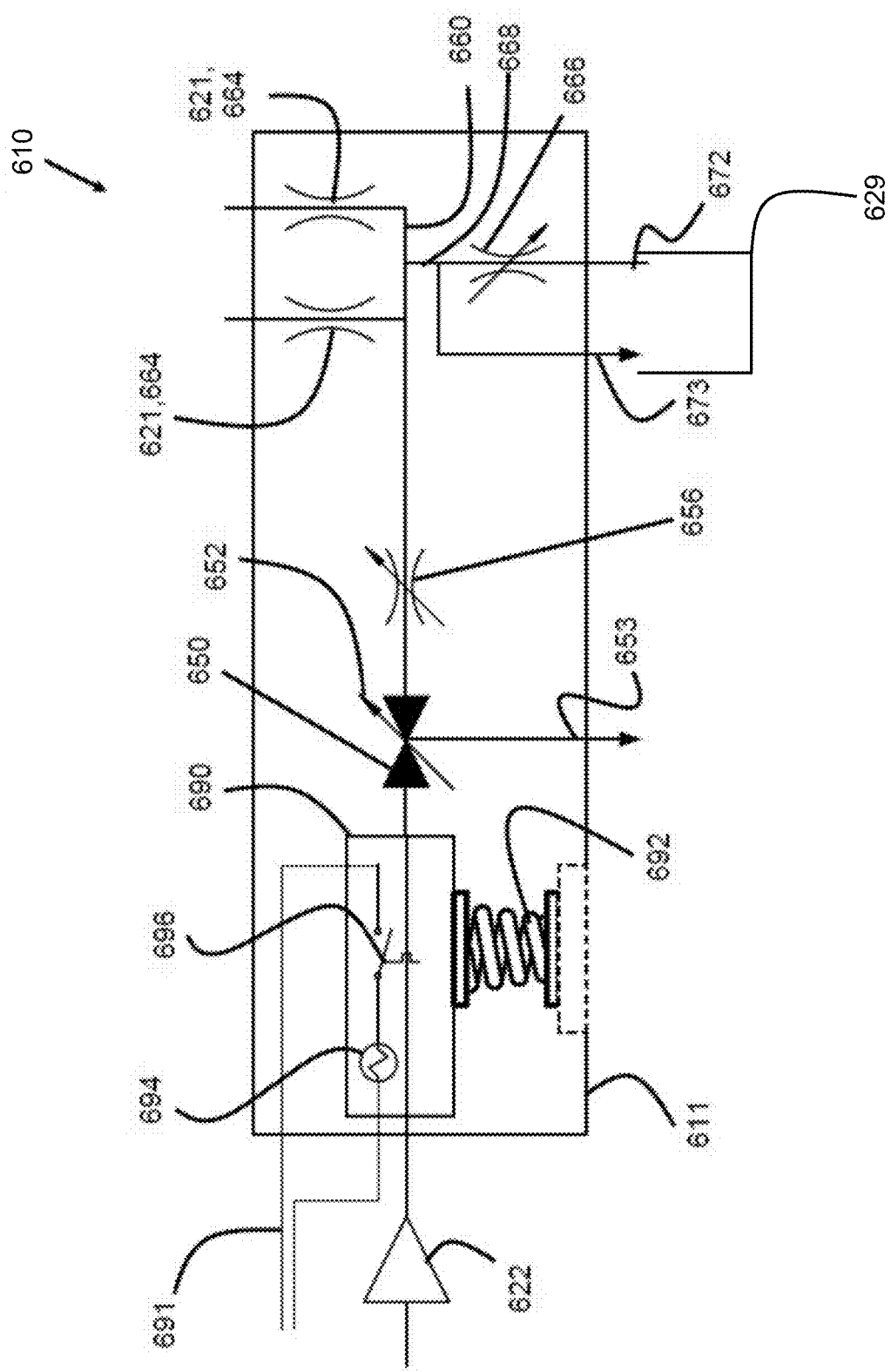

FIG. 2-1B shows that the valve has the ability to tap V50 at the top or bottom for flexible outlet configurations. The valve in FIG. 2-1C shows a reversible stop and check design which allows for either top inlets or bottom inlets, providing for a more flexible installation. The valve of FIG. 2-1E shows stop and check bushings which allow for reverse stop and check installation as well as alternate inlet sizes. The valve of FIGS. 2-2A, B, and C include a baffle tube used to provide a superior mix. FIG. 2-2A is a view as taken along section B-B of FIG. 2-1C, and shows a bottom outlet. FIG. 2-2B shows a cross sectional view as taken along line B-B of FIG. 2-1C showing a top outlet. FIG. 2-2C shows a sectional view as taken along line B-B of FIG. 2-1C showing top and bottom outlets. The valve of FIGS. 2-3 and 2-4 are cutaway views and show checkvalve components in both positions, piped up to the left, and piped down to the right.

FIGS. 3-1A and 3-2 show various views of an emergency wash 320 according to one embodiment of the present invention. Emergency wash system 320 includes a thermostatically controlled valve 330 that provides tempered water to a pair of eyewash dispensing caps 321, and in some embodiments, further provides tempered water through a top outlet 332 to a showerhead assembly 380.

Control valve 330 (and other portions of wash assembly 320) are supported from the floor by a stand 326. Preferably stand 326 and system 320 are adapted and configured such that dispensing caps 321 are located at a height that is wheelchair accessible. Further, as best seen in FIGS. 3-2 and 3-3, the return line 328 from basin 370 extends rearward so as to provide a clear volume underneath return line 328 to accommodate the front of the wheelchair.

Water is provided to control valve 330 from a source 322 of cold fluid and a source 324 of hot fluid. In some embodiments, hot source 324 receives water from the outlet of a water heater (not shown). In some embodiments, water from one or both of the sources 322 and 324 flows through a flow restrictor that provides generally constant flow, such as the variable restrictors sold by Neoperl.

FIG. 3-1B shows a simplified schematic representation of symbols representing the flow path of a system 320 according to one embodiment of the present invention. Cold water source 322 and hot water source 324 provide water to hot and cold inlets 331 and 333, respectively, of thermostatically controlled valve 330. Referring briefly to FIG. 3-4, valve 330 includes a cartridge valve 336 received within a body 334. Cartridge 336 includes a metering section 338 that controls the flow of hot water to a thermostat (not shown) within cartridge 336. The mixture of hot and cold water exiting metering section 338 is turbulently mixed by one or more mixing outlets 337, and then provided to an outlet 332 as tempered water. Mixing outlets 337 are adapted and configured to provide turbulent mixing of hot and cold flows within valves 330. Further examples of such means for creating turbulence or mixing can be found in U.S. patent application Ser. No. 13/657,218, filed 22 Oct. 2012, and titled METHODS AND APPARATUS FOR CREATING TURBULENCE IN A THERMOSTATIC MIXING VALVE, incorporated herein by reference.

As shown in FIG. 3-4, body 334 includes a single tempered outlet 332 that provides tempered water to the eyewash dispensing caps 321. However, yet other embodiments include an additional tempered fluid outlet 332 that provides tempered water to the showerhead assembly 380, such as by the top mounted outlet 332 best seen in FIG. 3-1A.

Referring again to FIG. 3-1B, the tempered fluid exiting valve 330 from outlet 332 passes through a accumulator (diffuser) 340 in some embodiments. A cross-sectional view of accumulator (diffuser) 340 in one embodiment is shown in FIG. 3-1C. Diffuser 340 includes an inlet 341 and outlet 342 that are in fluid communication by way of a serpentine passage 343. Passage 343 includes a plurality of apertures in the sidewalls of the passageway that encourage fluid mixing along the length of the passageway. Further discussion of diffuser 340 can be found in U.S. patent application Ser. No. 13/213,811, filed Aug. 19, 2011, SYSTEM AND METHOD FOR PROVIDING TEMPERED FLUID, incorporated herein by reference, such discussion of the diffuser being incorporated herein by reference. Diffuser 340 reduces any sharp temperature rise that would otherwise be seen when tempered water first flows out of the outlet 332 valve 330. It is further understood that a second diffuser 340 can further be installed in the fluid pathway from the outlet of control valve 332 showerhead assembly 380.

Tempered fluid exiting accumulator (diffuser) 340 flows to a manually operated, normally closed shutoff valve 350. In one embodiment, valve 350 is a ball valve. A paddle and handle 352 control the state of shutoff valve 350. Referring to FIGS. 3-1A and 3-2, it can be seen that handle 352 is located generally in the center of return basin 370, and behind the eyewash dispensing caps 321. With this central design, paddle 352 is readily accessed by either left-handed or right-handed persons needing an eyewash. To open valve 350, paddle 352 (and its handle) are pushed backwards, away from dispensing caps 321. Preferably, the outlet of valve 350 includes a quick disconnect type of fitting, so as to facilitate removal of outlet valve 360.

Water exiting shell 350 is provided to dispensing valve 360. Valve 360 includes three separate flow channels: two eyewash outlets 364 that provide tempered water to dispensing caps 321, and a variable orifice 366 that provides fluid to drain 372. In some embodiments valve 360 includes an internal chamber for receiving a filter, such as a charcoal filter. Preferably, valve 360 is coupled to valve 350 by a quick connect coupling that permits easy removal and replacement (or refurbishment) of valve 360. Preferably valve 360 is adapted and configured such that there are no internal volumes in which water is permitted to sit when system 320 is not in use. Instead, after a user has opened shutoff valve 350 for emergency wash, any water within valve 360 flows out of outlet 368 and into drain 372.

Figures 1, 2, 3, 4, 5:
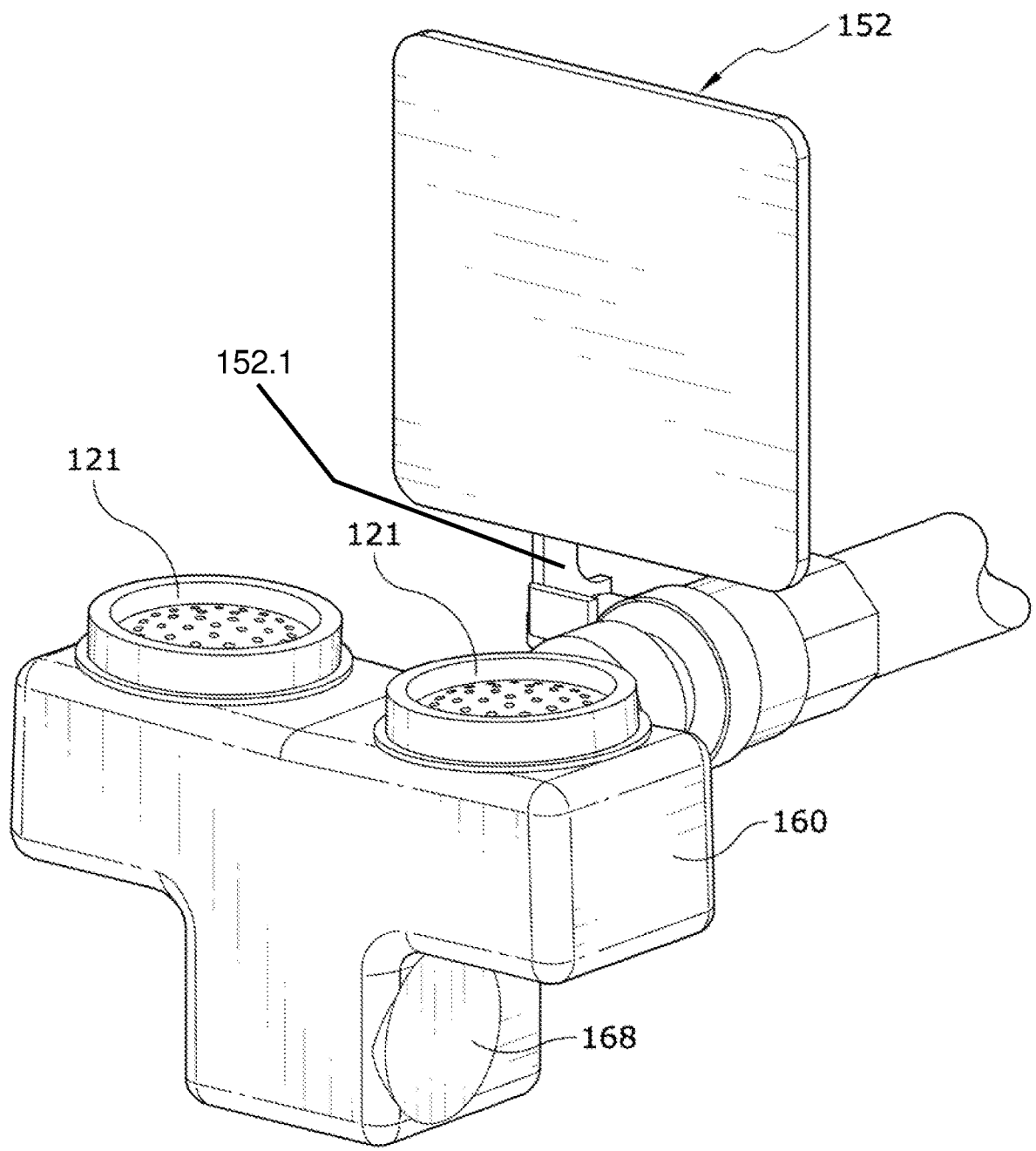

Variable orifice 366 includes an internal valve the position of which can be manually adjusted by the user at an interface 367 on one side of valve 360. FIG. 3-5 shows front and back halves 361F and 361B, respectively, which comprise the body of outlet valve 360. Tempered water flows into the inlet 363 of valve 360 and flows into internal chambers 362T and 362B. The amount of water that flows from the right and left outlets 364R and 364L, respectively, can be adjusted by varying the flow resistance of valve 366. In some embodiments, there is an internal stop that prevents full closure of valve 366, so that water within valve 360 can always drain out.

By way of interface 367, valve 366 can be rotated to a substantially closed position, in which most of the fluid received through inlet 363 flows out of outlets 364R and 364R. If the user rotates valve 366 to the fully open position, then some of the water entering through inlet 361B flows out of outlet 368 into drain 372. Dispensing valve 360 therefore permits accurate adjustment of the amount of water dispensed through outlets 364R and 364L by adjustment of variable orifice valve 366.

Water exiting through dispensing caps 321 or valve outlet 368 flow into a return basin 370. As best seen in FIG. 3-3, outlet valve 360 is generally suspended above the drain surface of the basin 370 by shutoff valve 350. Therefore, wash system 320 is substantially self-draining for all water that exits shutoff valve 350.

FIGS. 3-6 thru 3-8 present various views of a showerhead apparatus 380 according to one embodiment of the present invention. Showerhead assembly 380 includes a bowl 382 that includes on its rear side an inlet 381 through which tempered water is received. Water flowing through inlet 381 strikes a dispensing member 384 that disperses the flow of water into a plurality of separate streams.

FIG. 3-7 shows dispensing member 384 removed from its attachment to bowl 382 by a plurality of standoffs 385 each received within a corresponding depression 383 of bowl 382. In some embodiments, these standoffs are adhered to bowl 382 within the corresponding depressions, although the connection of dispensing member 384 to bowl 382 can be by any method.

Referring to FIG. 3-8, water received from inlet 381 impinges directly upon central deflector 386, and is thereby directed radially outwardly. The volume trapped between the inner surface of dispensing member 84 and the inner surface of bowl 382 is sized so that water fills this volume under pressure. Water thereafter flows through any of a plurality of apertures 387 located in member 384. It can be seen that in one embodiment there is a first set of apertures located closest to central deflector 386. In some embodiments, each of these holes includes a semi-conical, smooth flow channel directed radially inward. Dispensing member 84 in some embodiments further includes an outermost ring of apertures 387 located near the edge of member 384. In yet other embodiments, there is also an intermediate range of apertures 387 located between the outermost ring and the apertures closest to central deflector 386. Preferably, these outermost and intermediate rings have apertures with a conical inlet. It can also be seen in FIG. 3-8 that the outer circumference of deflecting member 384 tapers to a reduced width for the radially outward dispensing of water between member 384 and the inner surface of bowl 382. In some embodiments this outer circumference includes a plurality of ridges 388 for channeling this circumferential flow of water.

FIGS. 4-9, 4-10, and 4-11 depict a transportable eyewash system 410 according to another embodiment of the present invention. System 410 includes an eyewash system 420 located on an easily transportable cart 411. In one embodiment, cart 411 includes a deck 412 supported by a plurality of legs 413, and movable over a floor by way of wheels 414. In some embodiments, cart 410 further includes a lid 415 that can be used to enclose eyewash system 420 when not in use. It is understood that FIG. 4-9 is a photographic representation of portions of the eyewash system 410, and not the entire system, which will be now be described.

FIG. 4-10 is a schematic representation of the various elements of eyewash system 420. In one embodiment, eyewash system 420 receives water from an external tank 412. As one example, water tank 422 is kept locally to eyewash system 420, and is substantially at ambient temperature. As another example, tank 422 is a water tank that is attached to a trailer, such as a transporter for automobiles, or in another embodiment a truck that carries emergency equipment, such as fire truck.

Tank 422 is coupled to system 420 preferably by quick connect fittings (not shown). Water from tank 422 is provided to the inlet of a water heater 490. Water heater 490 preferably heats fluid by way of a heat exchanger 494, such as an electrical resistance heater. FIG. 4-10 shows heater exchanger 494 receiving electrical power from a source 491 of electricity. In some embodiments, heat exchanger 494 is provided with electricity by way of a thermal switch 496. Switch 496 permits the flow of current through heat exchanger 494 when water temperature is below a predetermined limit. However, if water temperature exceeds the predetermined limit thermal switch 496 opens the circuit and prevents further heating by heater 490.

In some embodiments, heater 490 is mounted to cart 411 by way of one or more vibration isolators or shock mounts 492. These mounts provide isolation of heater 490 from shock or vibratory inputs that are higher in frequency. Preferably, shock mounts 492 are selected to provide isolation from the types of handling acceleration inputs that are typically encountered when moving system 410 on or off a vehicle, or during collisions with system 410 and other objects, or related dynamic inputs. In some embodiments, the water and electrical hook-ups to heater 490 are selected to be relatively flexible, so that shock or displacement inputs from electrical cabling or water plumbing are attenuated before being received by heater 490.

Water exiting heater 490 is elevated in temperature relative to the temperature of water entering heater 490. This hotter water is provided to a shutoff valve 450. Valve 450 is preferably a three-way valve, including one inlet and two outlets. Water flows out of valve 450 toward either flow regulator 456 or out of drain 453 based on the position of a handle 452. Over one range of positions, handle 452 permits the flow of water from heater 490 toward flow regulator 456. However, in a different range of positions, handle 452 also allows water from heater 490 to exit from purging drain 453. When purge drain 453 is open, any air that is trapped within heater 490 can be purged out, to help ensure that heat exchanger 494 contains only water and no trapped gas. Handle 452 can be positioned such that both outlets are closed, thereby maintaining the purged conditions of heater 490. Handle 452 can also be opened to allow flow toward flow regulator 456, but still maintain drain 450 in a closed position. It is further noted that in some embodiments heater 490 is oriented on cart 411 such that water from tank 422 is provided at a location horizontally below the outlet of heater, so that trapped air tends to rise upward within heater 490 from the heater inlet to the heater outlet, thus encouraging a gas-purged state.

Water exiting shutoff valve 450 is received by a pressure compensated flow regulator 456, such as those made by Neoperl. Compensator 456 acts to maintain relatively constant flow conditions over a range of input pressures. As water pressure received at the inlet of compensator 456 increases, a resilient member within compensator 456 (such as O-ring) changes shape or configuration to increase the overall flow resistance (such as by decreasing the valve's flow number and/or decreasing the cross sectional flow area) of regulator 456, and thereby reduce the amount of flow that would have occurred as a result of the higher pressure, had there been no flow compensation.

Flow exiting regulator 456 is received at an outlet valve 460 located on a wash basin 470. In a manner similar to that described earlier, flow received at the inlet of valve 460 is provided to a pair of eyewash outlets 464, each of which is preferably covered by a dispensing cap 421. Outlets 164 and caps 421 are adapted and configured to provide an eyewash to a person bending over and facing toward valve 460.

Further, as previously discussed, valve 460 includes a manual flow adjuster 466 that can be used to set up a desired spray pattern from outlets 464. Preferably, valve 160 further includes a non-closable drain 473 that operates in parallel around drain 472. Referring to FIGS. 4-11A and 4-11B, the adjustable valve 466 is shown removed from the body 461 of valve 460. In FIG. 4-11A, valve 466 is shown in the fully opened position, and it can be seen that the flow area of outlet 468 can be maintained substantially opened and unrestricted by valve 466 when valve 466 is in the A, or fully opened position. FIG. 4-11B depicts the position of valve 466 when fully closed, showing that even under full closure there is a flow area B of valve 466 that still aligns with a portion of the outlet area of outlet 468. Therefore, even when fully closed, water can still flow out of outlet 468. In those embodiments in which valve 460 is not fully closable, the draining of any remaining water within portions of eyewash system 420 is encouraged, thus preventing the accumulation of stagnant water. It is further envisioned some embodiments that outlet 468 will be located lower than the outlet of shutoff valve 450.

FIGS. 5-1 through 5-14 depict and explain various features pertaining to an eyewash system 520 according to one embodiment of the present invention.

FIGS. 5-1 through 5-4 depict various external views of an eyewash nozzle assembly or outlet valve 560 according to one embodiment of the present invention. It will be appreciated that valve 560 is related and similar to the previously defined outlet valves 160, 360, and 460, even though there are external differences in shape. It is further understood that the various functions that will now be described for valve 560 apply equally to these other outlet valves disclosed herein.

Valve assembly 560 includes an inlet 563 for water and a pair of outlets 568 which can be capped with dispensing caps 521. Preferably, the housing of outlet valve 560 includes a groove 556a that is adapted and configured to hold within it a filter disk 556. In some embodiments, these features are arranged symmetrically about a housing vertical centerline (hVCL) that extends forward toward the user when valve 560 is installed in an eyewash system.

The inlet 563 includes within it a flow regulator or variable orifice valve 566, such as those made by Neoperl. These flow regulators provide a substantially constant flow of water therethrough, especially after a threshold pressure has been obtained. As one example, with a flow regulator from Neoperl of the type MR03 US Type, flows can be selected to flow from about one gallon per minute to about two and two-tenths gallons per minute within a tolerance band. Preferably, the flow regulators are press fit into the housing at the inlet 563.

Valve assembly 560 includes a central passage 562 that interconnects inlet 563 to an internal connection 565 and outlets 564. By transitioning from central passage 562 with a relatively small cross section to the larger eyewash outlets 564 (which are capped with dispensing caps 521), the velocity of water within valve 560 is reduced greatly and thereby emerges from the apertures 521a of cap 521 more gently, yet extends upwardly the required distance of eight inches as noted in ANSI standard Z358-1-2009. Further, it has been found that the velocity of water is not so great as to extend greatly beyond this eight inch limit, thus making the eyewash system more user-friendly, and therefore more likely to be used. In some embodiments, the area ratio (the combined cross sectional area of outlets 564 to the cross sectional area of central passage 562) is from about 8 to about 11, with a preferred range being greater than about 9. With this sizing, it has been determined that a wash flow less than about two gallons per minute can be provided. In this manner, the flow valve 560 is less wasteful of water during usage.

In some embodiments, central passage 562 terminates at a distal-most end 563a, as best seen in FIG. 5-3. Some versions of valve assembly 560 include an aperture at the termination 563a of internal chamber 562. This aperture can be provided with a male or female feature that can be coupled to the inlet 563 of a second valve assembly 560. This coupling of two valve assemblies provides four eyewash nozzles, and this modular construction thus makes valve 560 suitable for emergency eyewash applications and emergency face wash applications. A corresponding flow schematic can be seen in FIG. 5-13, where the additional valve 560 is represented by outlets 564' and dispensing caps 261'. Further, the modified, inlet is identified as element 563', and the secondary outlet of the first valve is identified as 563a.

Referring to FIGS. 5-1 and 5-2, valve 560 further includes an indexing feature 561a located centrally on the bottom of the housing 561 and along housing vertical centerline hVCL. As best seen in FIGS. 5-2 and 5-3, indexing feature 561a includes a pair of downwardly extending arms that define a gap therebetween. Referring briefly to FIGS. 5-7 and 5-9, it can be seen that this gap is sized to accept therebetween the indexing feature 571 of wash basin 570. This indexing feature combined with the quick connect fittings on outlet of the shut-off valve 550 and the inlet to the outlet valve 560 combine to make valve 560 modular and easily replaceable by an unskilled person. The quick connect fittings of the shut-off valve and the outlet valve combine to align valve 560 along the length of the housing vertical centerline hVCL. The indexing features 561a and 571 do not interfere with this fore and aft alignment, since indexing feature 571 can fit easily between the parallel arms of indexing feature 561a. However, the indexing features 561a and 571 combine to laterally locate valve 560 in a lateral direction (i.e., as along the lateral centerline LCL, best seen in FIG. 5-7). Valve 560 is preferably not attached to basin 570. Therefore, the person replacing valve 560 has only a single quick connection to achieve, and does not have to further connect body 561 to basin 570. It can be further seen that the shape of feature 561a is generally complementary in shape to indexing feature 571.

Figures 1, 2, 3, 4, 5, 6:
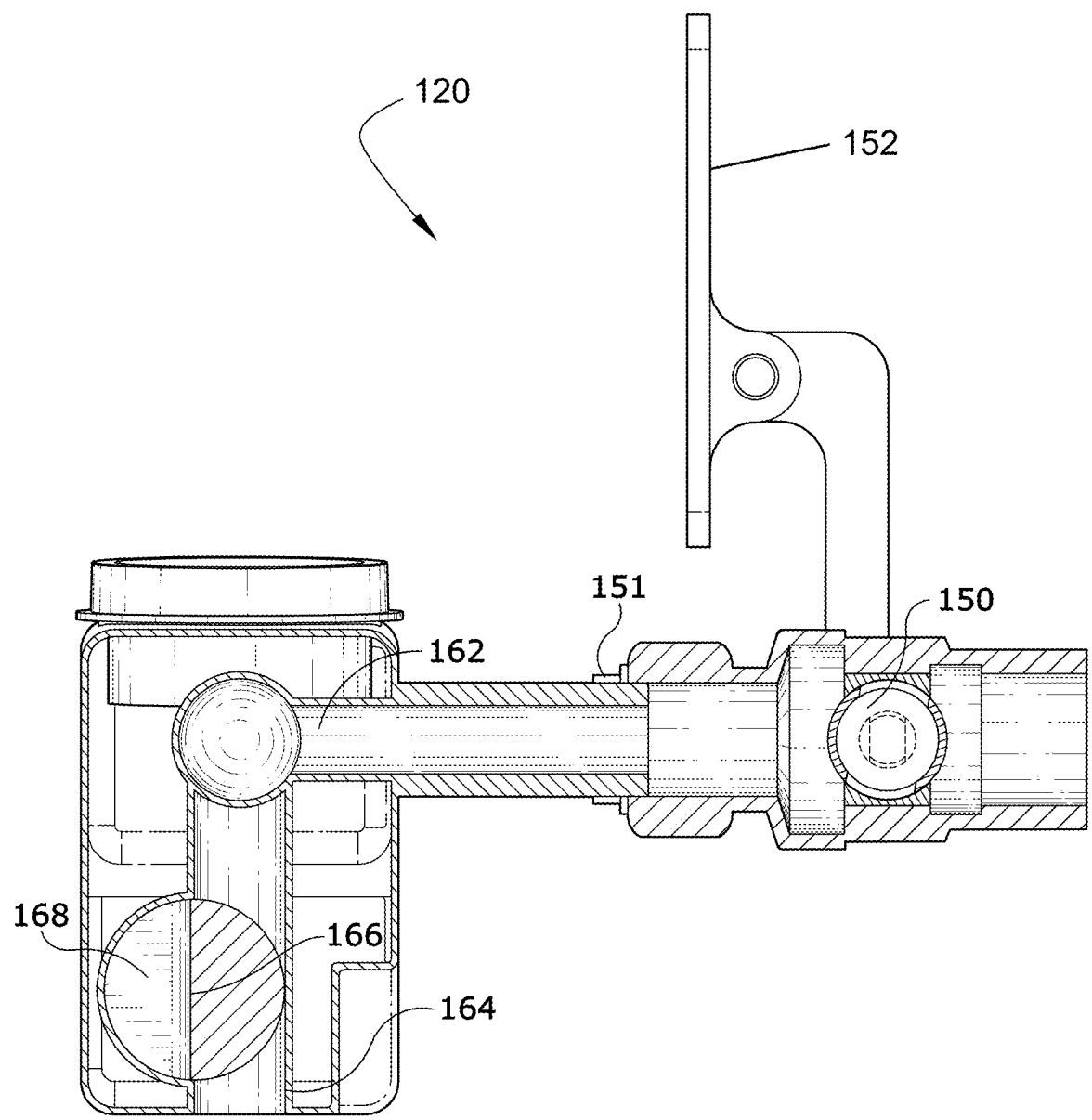

FIGS. 5-5 and 5-6 show various components located internally in some embodiments of valve 560. Filters 556 in one embodiment are preferably porous, sintered metal wafers. In one example, housing 561 is a two-piece, molded plastic housing having a groove within wash outlet 564. During manufacturing, a filter 556 is inserted in the groove of one-half of the housing 561, and the other half is then mated with the first half, trapping filter 556 in place. A Neoperl regulator 566 is shown in FIGS. 5-5 (from one side) and FIG. 5-6 (from the other side). Each regulator includes a static, generally rigid structure 556*b* that cooperates with the rigid members 556*a* that cooperates with a resilient member 566*b*, such as an O-ring to produce a variable orifice effect.

FIGS. 5-5 and 5-6 show end and side views, respectively, of an expulsion valve 558. In some embodiments, valve 558 is press fit into an orifice created at secondary outlet 563*a* of body 561.

FIG. 5-12 schematically describes operation of expulsion valve 558. Flow is received within the valve from inlet 563 as shown in the direction of the arrow. After this flow has reached a sufficient value, its impingement on flapper 558*c* causes the flapper to shut drainage outlet 558*b*. The flow is thereby directed upward (with reference to FIG. 5-12) and onto the eyewash chambers 564. When the inlet flow stops, flapper 558*c* is biased to the open position (as shown schematically by the spring), and thereby releases any trapped water within valve assembly 560 by way of the open flowpath to drainage outlet 558*b* (which releases the water into basin 570). It is appreciated that flapper 558*c* can be biased open by spring, by weight, or by any other means.

FIGS. 5-7 through 5-10 depict various features of basin 570. In one embodiment, basin 570 is of a rounded diamond shape, and symmetrical about a basin vertical centerline bVCL that is located spaced downward and apart from the hVCL, and further symmetrical about a lateral centerline LCL. A drainage aperture 562 is located at a low point within basin 570 so as to achieve a gravity drain. A lip 575 extends upwardly from the bottom of the basin, and around the edges of the basin. Basin 570 includes an indexing feature such as the rib 571 extending upward from the bottom of the basin, and located proximate to the drainage aperture 572. As previously discussed, this indexing feature 571 cooperates with an indexing feature of the valve body assembly so as to assist a user in replacing the valve assembly 560. Preferably, the indexing features provide an indexing and location function in a single direction, and do not limit indexing or location in directions orthogonal to that direction. As seen herein, indexing features 571 and 561*a* provide a locating function along the length of centerline LCL but do not provide any location along the length of vertical centerlines bVCL or hVCL, and further does not provide any limitation on the upwards location of the valve assembly.

Basin 570 further includes an attachment feature 573 located on the bottom of basin 570, and best seen in FIGS. 5-10 and 5-11. Locating feature 573 in one embodiment includes a pair of spaced apart members that receive between them a support arm 525. The members further include an attachment hole that aligns with an attachment hole in the arm 525. Referring to FIG. 5-11, a person installing a basin 570 makes the appropriate plumbing connection from drain 572 to drain 528 and then to the draining feature of stand 526. Arm 525 is pinned to basin 570 at one end, and further pinned or otherwise fastened to stand 526. Preferably, support arm 525 is provided in at least one embodiment at a length suitable for spacing basin 570 away from stand 526 such that person in a wheelchair can approach the basin, get their legs under the basin, and use the eyewash. Arm 525 is preferably a tight fit within a machine slot of stand 526.

Some embodiments of the present invention use a basin 570 that is adapted and configured to provide a tactile indication to the user of their location relative to the eyewash outlets 564. It has been observed that some existing emergency eyewash basins have a circular shape, or other shape, that does not give a tactile indication to a person without vision of their relative location, such as for existing eyewash basins that are circular. In such a case, the person with impaired vision would have difficultly aligning their eyes with the spaced apart eyewash outlets.

Figures 1, 2, 3, 4, 5, 6, 7:
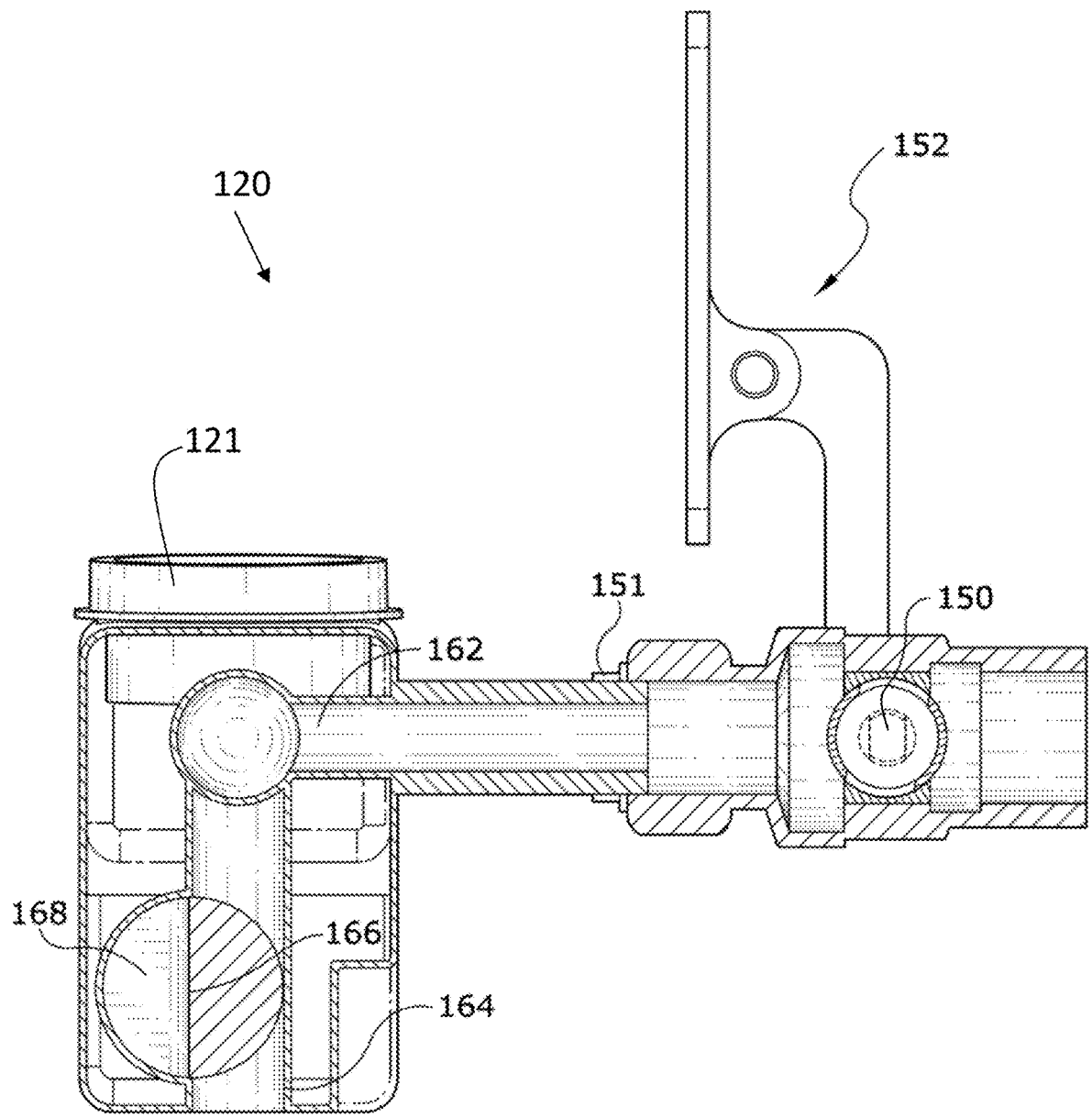
Figures 1, 2, 3, 4, 5, 6, 7, 8:
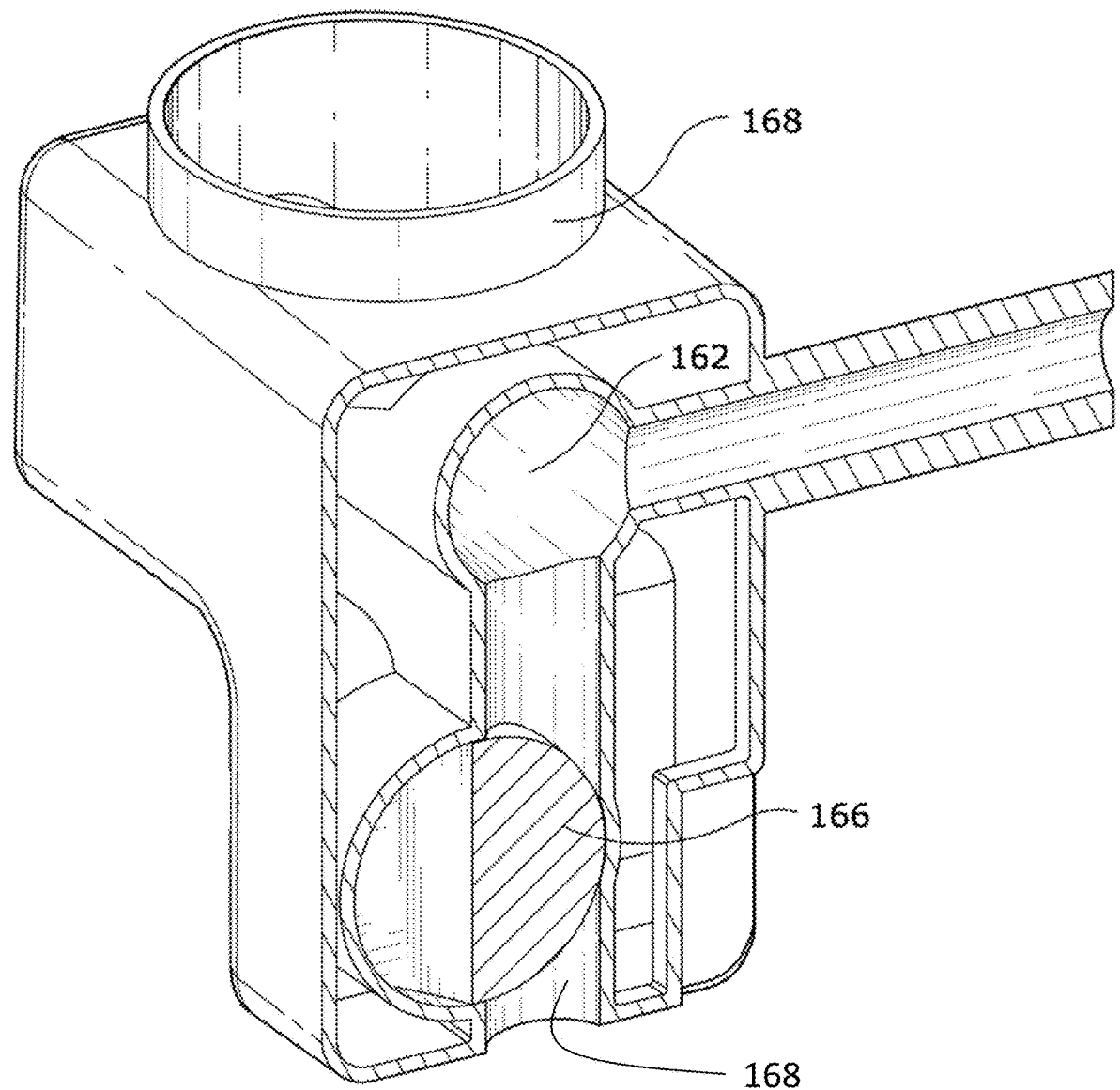
Figures 1, 2, 3, 4, 5, 6, 7, 8, 9:
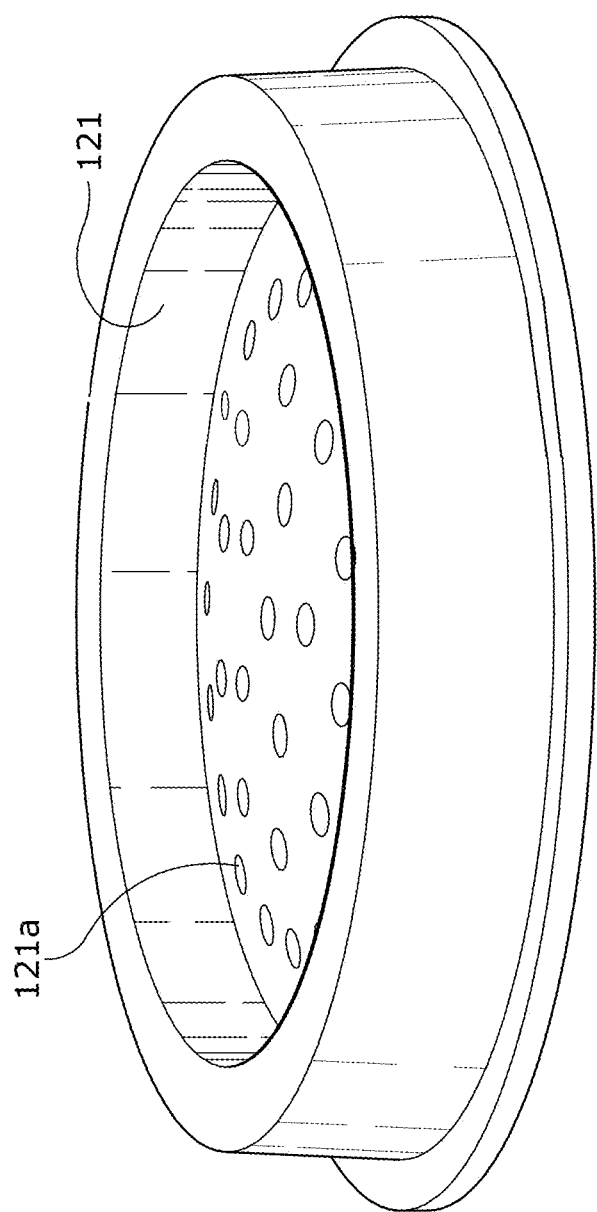
Figures 1, 2:
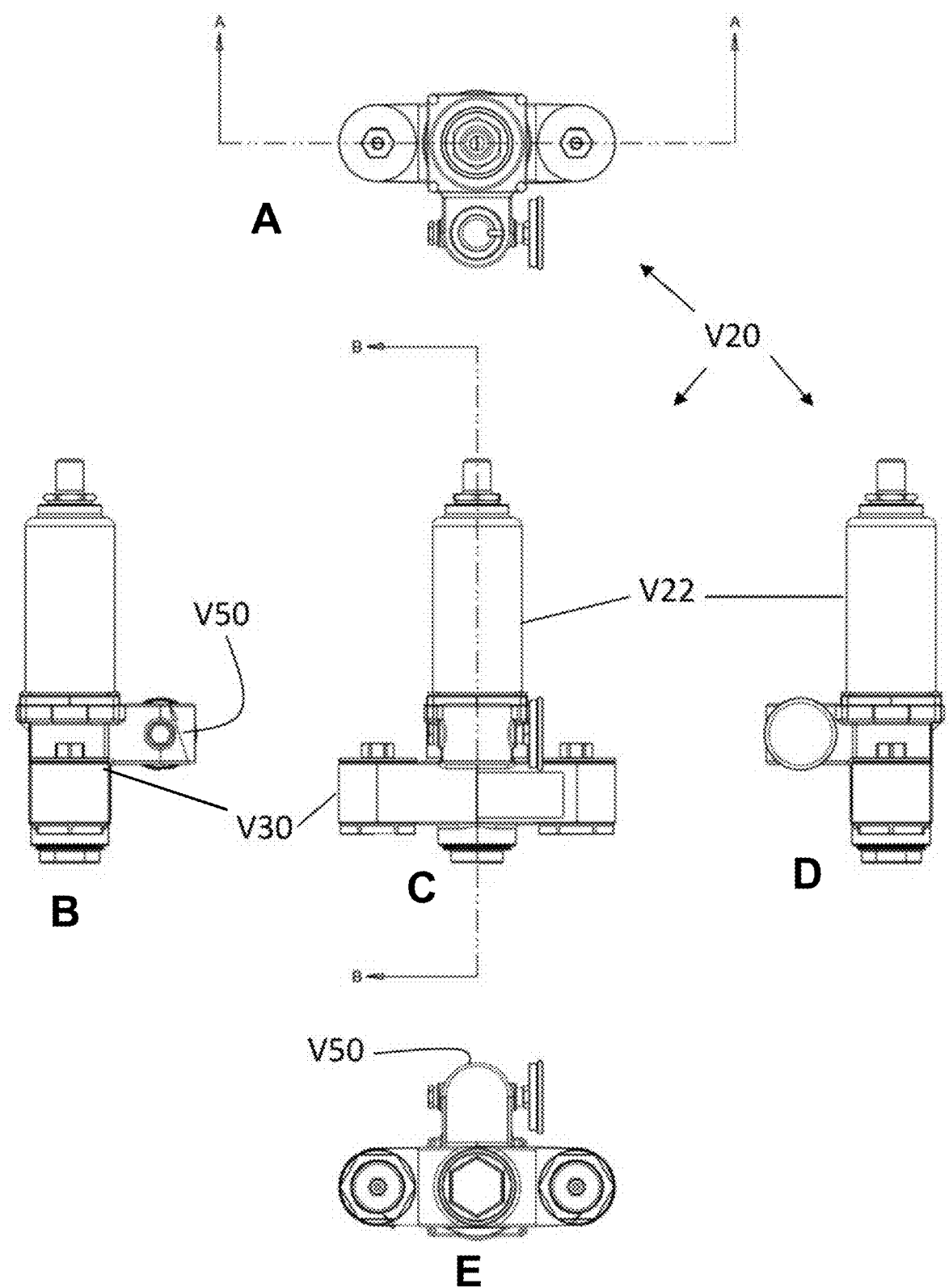
Figure 2:
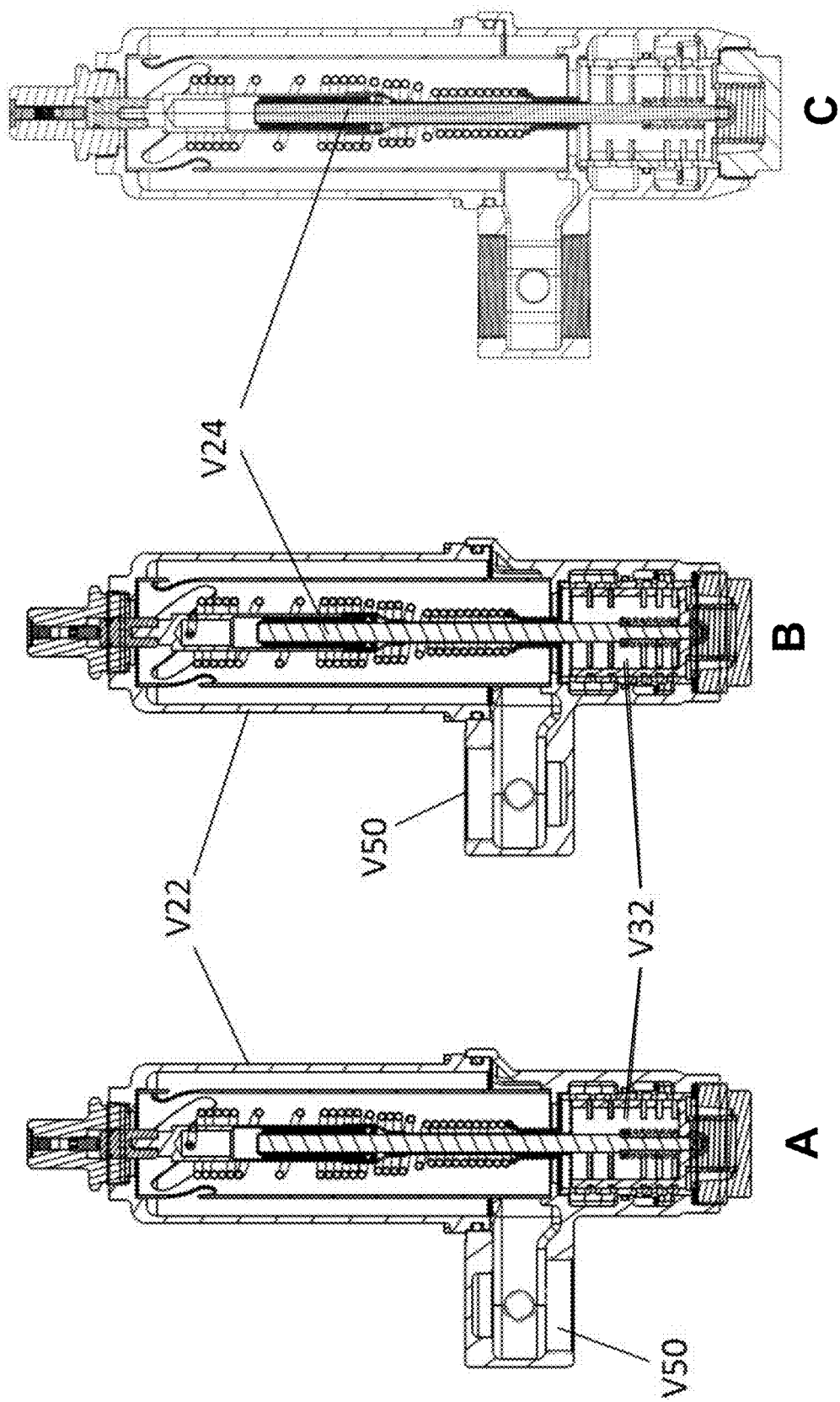
Figures 2, 3:
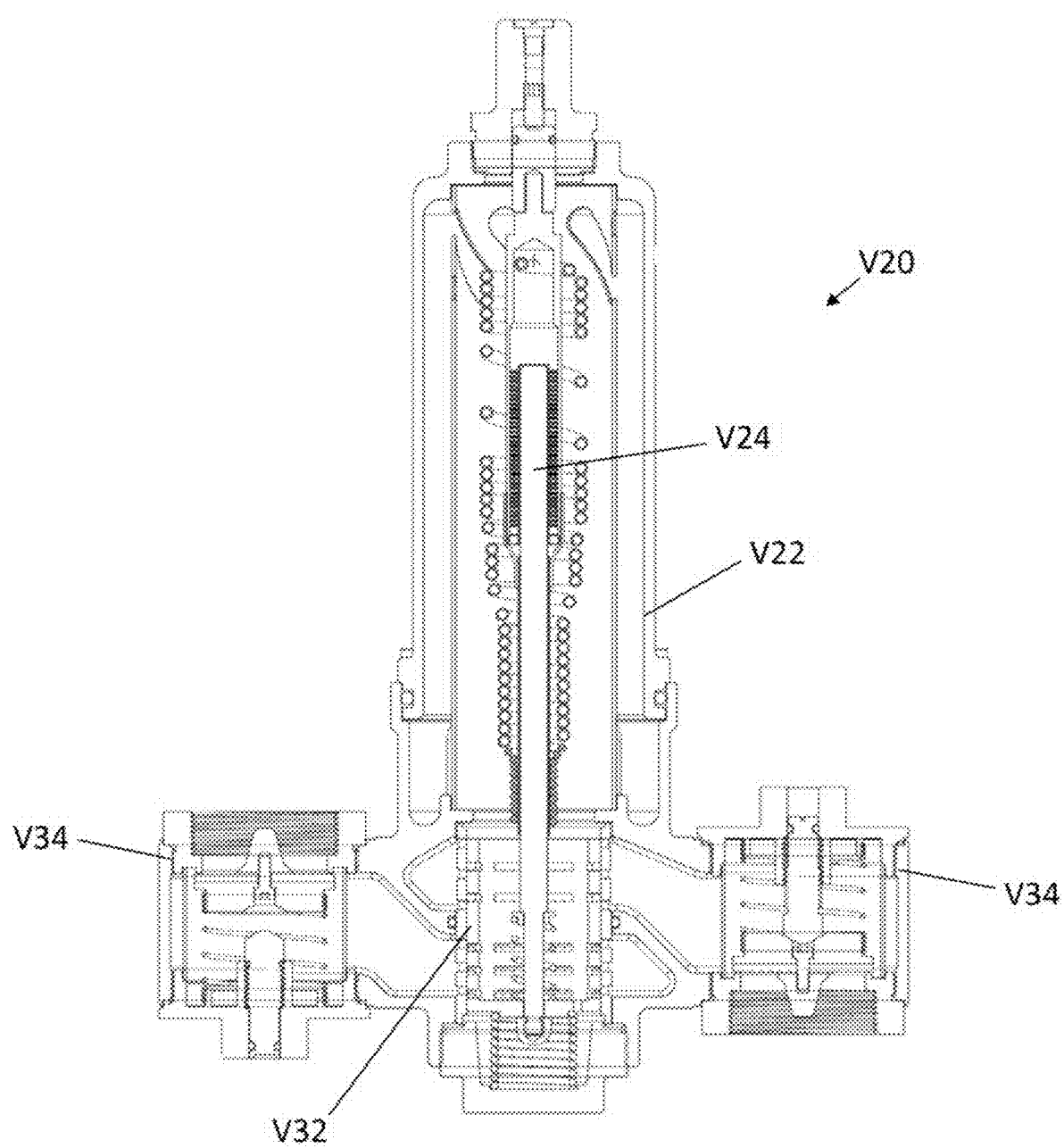
Figures 2, 3, 4:
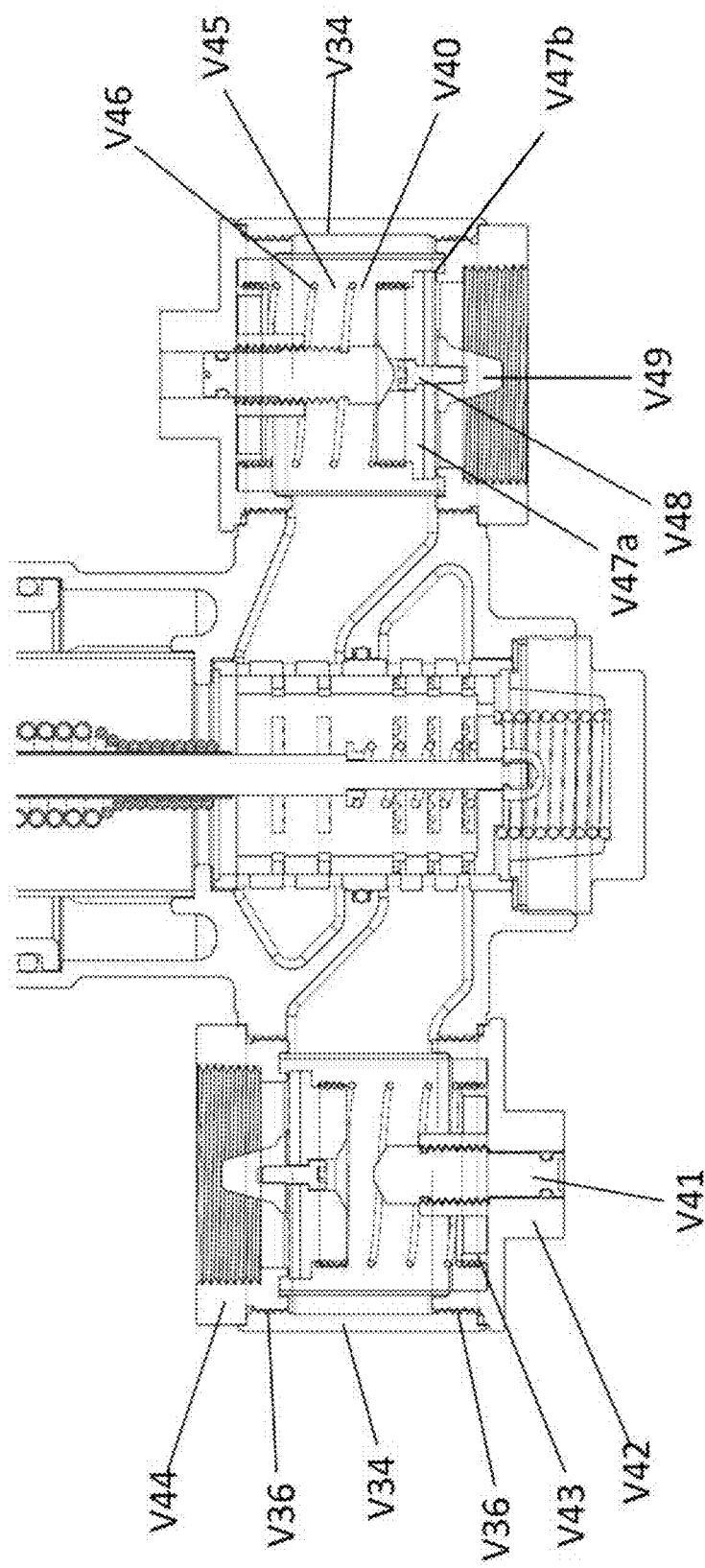

Referring to FIG. 5-7, it can be seen that basin 570 includes rounded corners at opposing lateral extremes along centerline LCL, and these comprise tactile features 574 that can be gripped or touched by the person using the eyewash basin. The person would be able to feel the rounded corners of the diamond shape in the lateral directions, and therefore intuitively know where to place their head and eyes. In some embodiments, the tactile features are corners (whether rounded or not) of the basin, but further can be handles, finger or thumb grooves located in the lip 575, inwardly-extending pockets adapted to receive the person's fingers in the lip, or similar features. It is preferred that the tactile features 574 be located the greatest lateral distance from the centerline between the eyewash outlets.

Flow schematic 5-14 depicts yet another embodiment of the present invention. Various embodiments contemplate one, two, or there flow regulators 566 within valve assembly 560. As has been previously discussed, a first flow regulator 566-1 is selected to provide a total eyewash flow to both eyewash outlets 564. However, in yet other embodiments this first, central flow regulator is not needed, and the valve assembly can otherwise include a pair of flow regulators 566-2 each selected for regulation of flow to a single eyewash outlet 564.

FIGS. 6-1 to 6-5 depict various embodiments of a transportable eyewash according to one embodiment of the present invention. An eyewash system 620 is located on a cart 611 and combines to create a transportable eyewash system 610. Cart 610 preferably includes a deck 612 that supports within it a basin 670 for capturing was that flows out of outlet valve assembly 660, and draining out of a drain 672 into a catch basin 629. Catch basin 629 is adapted and configured to contact not just the flowing out of the valve assembly 660, but also any contaminant that was washed off of the person using transportable system 610. Therefore, this contaminant, which may still be dangerous even if diluted, is not released to the ambient, but rather is stored at the bottom cart 611.

Cart 611 further supports eyewash system 620 from a plurality of legs 613 that contact the ground or floor by corresponding wheels 614. When not in use, a lid 615 can be closed around deck 612, since actuating on-off paddle 652 and valve assembly 560 are sized to fit within the recessed deck portion of cart 611. Cart 611 further includes underneath it an electrical water heater 690 that is shock mounted to the structure of cart 610.

Shock mounts 692 are selected such that they are relatively loose, and permit a static deflection of heater 690 of more than about one-fourth of an inch. The spring constant of the resilient member 692 are selected to reduce the transmission of vibration above a predetermined frequency. Preferably, this predetermined frequency is selected to isolate heater 692 from many of the routine shocks and vibration that occur during handling and operation of system 620.

FIG. 6-4 schematically shows a system 610 that includes a flow regulator 656 that establishes a generally constant flow of water when shut-off valve 650 is opened. FIG. 6-5 schematically depicts the catch basin 529 that is located to collect any drainage from eyewash system 620.

Various aspects of different embodiments of the present invention are expressed in paragraphs X1, X2, X3, X4, X5, X6, and X7 as follows:

X1. One aspect of the present invention pertains to an emergency eyewash system. The system preferably includes a thermostatically controlled valve having an inlet for hot water, an inlet for cold water, and an outlet providing tempered water. The system preferably includes a flow regulator having an inlet, an outlet, and a variable orifice inbetween, said regulator inlet receiving tempered water from said valve, said variable orifice becoming more restrictive to flow as the pressure of water at the regulator inlet increases and becoming less restrictive to flow as the pressure of water at the regulator inlet decreases, said regulator outlet providing an outlet flow within a predetermined range of flows. The system preferably includes an eyewash nozzle having an inlet for receiving the regulated flow of water and directing the regulated flow generally upwards.

X2. Another aspect of the present invention pertains to an emergency eyewash system. The system preferably includes a water outlet having a first quick connect fitting. The system preferably includes an eyewash nozzle assembly having an inlet and a second quick connect fitting mateable to said first quick connect fitting at the inlet, said nozzle assembly having a first indexing feature. The system preferably includes a basin for collecting water expelled from said nozzle, said basin having a drain that collects water expelled from said nozzle, said basin including a second indexing feature; wherein said second indexing feature establishes the location of said first indexing feature when said nozzle assembly is connected to said water outlet.

X3. Another aspect of the present invention pertains to an emergency eyewash system. The system preferably includes a stand vertically supported from the floor. The method preferably includes an eyewash nozzle assembly. The system preferably includes a basin attached to said stand and extending horizontally forward from the stand and below said nozzle assembly, said basin being substantially symmetric laterally, the lateral sides of said basin including mirror images of a feature that tactilely identifies the location of said nozzle assembly. The system preferably includes a water shutoff valve for manual control of flow of water to said nozzle, said valve including a lever, said level being located above said nozzle assembly.

X4. Another aspect of the present invention pertains to an emergency eyewash system. The system preferably includes a stand vertically supported from the floor. The system preferably includes an eyewash nozzle assembly adapted and configured for the upward flow of water generally symmetric about a vertical plane. The system preferably includes a basin attached to said stand and extending horizontally forward from the stand by a distance suitable for use by a person in a wheelchair and located below said nozzle assembly, said basin having opposing sides that each include a feature that tactilely identifies orients the person relative to the nozzle assembly. The system preferably includes a water shutoff valve for manual control of flow of water to said nozzle, said valve including a lever located above said nozzle assembly and generally in the vertical plane of said nozzle assembly.

X5. Another aspect of the present invention pertains to an apparatus for an emergency eyewash. The apparatus preferably includes an eyewash nozzle assembly having an inlet and a quick connect fitting at the inlet, a nozzle outlet for providing a flow of water for the eyewash, a flow regulator providing fluid communication between the inlet and nozzle outlet, the flow regulator being adapted and configured to provide a substantially constant flow of water from inlet to nozzle outlet as inlet pressure varies within a range of pressures, a filter adapted and configured to provide filtered water to said nozzle outlet, and a housing internally supporting said filter and said regulator, said housing including said inlet and said nozzle outlet.

X6. Another aspect of the present invention pertains to a transportable emergency eyewash system. The system preferably includes a cart with wheels. The system preferably includes an electrical water heater mounted to said cart by a resilient member that reduces the transmission of vibration from the cart to said heater, said heater receiving water from a source and providing heated water. The system preferably includes a shutoff valve having an inlet for receiving water from said heater, said valve having an outlet, and a movable valve member actuatable over a range of positions for directing water from the inlet to the outlet, said member having a first position to permit flow from the inlet to the outlet, and a second position to prevent flow from the outlet. The system preferably includes an eyewash nozzle having an inlet for receiving water from the outlet, said nozzle being pointed generally upwards. The system preferably includes a basin for collecting water expelled from said nozzle and providing the collected water to a drain. The system preferably includes a reservoir storing water received from the drain.

X7. Another aspect of the present invention pertains to a transportable emergency eyewash system. The system preferably includes a cart with wheels. The system preferably includes an electrical water heater mounted to said cart, said heater receiving water from a source and providing heated water. The system preferably includes a shutoff valve having an inlet for receiving water from said heater, said valve having a first outlet, a second outlet, and a movable valve member actuatable over a range of positions for directing water from the inlet to the first outlet or the second outlet, said member having a first position to permit flow from the inlet to the first outlet, a second position to permit flow from the inlet to the second outlet, and a third position to prevent flow to both the first outlet and the second outlet. The system preferably includes an eyewash nozzle having an inlet for receiving water from the first outlet, said nozzle being pointed generally upwards.

Yet other embodiments pertain to any of the previous statements X1, X2, X3, X4, X5, X6, or X7 which are combined with one or more of the following other aspects:

Which further comprises a filter receiving the regulated flow of water from said regulator and providing filtered and regulated flow of water to said nozzle.

Wherein said filter includes porous sintered metal.

Wherein said variable orifice includes a resilient blocking member and a fixed member, said member changing in at least one of shape or location relative to said fixed member to provide at least one of a smaller flow area or an increased flow resistance as water pressure at the regulator inlet increases.

Wherein the resilient member is an oring.

Wherein the variable orifice includes an elastomeric oring.

Wherein said flow regulator is a first regulator and said nozzle is a first nozzle, and which further comprises a second flow regulator having an inlet, an outlet, and a second variable orifice inbetween, said second regulator inlet receiving tempered water from said valve, said second variable orifice becoming more restrictive to flow as the pressure of water at the second regulator inlet increases and becoming less restrictive to flow as the pressure of water at the second regulator inlet decreases, said second regulator outlet providing a second outlet flow within a predetermined range of flows, said second outlet flow being substantially the same as the outlet flow of said first flow regulator; a second eyewash nozzle having an inlet for receiving the regulated flow of water from said second regulator and directing the regulated flow generally upwards.

Which further comprises a shower nozzle having an inlet receiving tempered water, said shower nozzle being located higher than said eyewash nozzle for directing a flow of water generally downward.

Wherein said shower nozzle includes a flow deflector oriented centrally in the inlet of the shower nozzle, said deflector changing the direction of substantially all the flow entering said shower nozzle.

Wherein said flow regulator regulates a flow of less than about two gallons per minute.

Which further comprises an accumulator receiving a flow of tempered water and having an outlet providing the water to the inlet of said flow regulator.

Wherein said thermostatically controlled valve includes means for creating turbulence.

Wherein the first indexing feature has a first shape, and the second indexing feature has a second shape that is complementary to the first shape.

Wherein said first quick connect fitting and said second quick connect fitting align said nozzle assembly and said basin in a first direction, and the first indexing feature and the second indexing feature align said nozzle assembly and said basin in a second direction orthogonal to the first direction.

Wherein the second indexing feature is located proximate to the drain.

Wherein said first quick connect fitting and said second quick connect fitting can be connected to each other without the use of a tool.

Wherein said first quick connect fitting and said second quick connect fitting can be connected in a substantially leak-tight connection.

Wherein said first quick connect fitting and said second quick connect fitting can be connected to each other by pressing the first fitting and second fitting toward each other.

Wherein the inlet of the eyewash nozzle assembly has a first area, the total area of the eyewash outlets has a second area, and the ratio of the second area to the first area is greater than about 8 and less than about 11, or wherein the ratio is greater than about 9.

Wherein said nozzle assembly is not attached to said basin.

Wherein said nozzle assembly includes a pair of spaced apart flow nozzles each pointed generally upward.

Wherein each of said flow nozzles includes a plurality of flow apertures.

Wherein said lever is generally vertical in the shutoff position, and said lever is pushed backward to actuate the flow of water.

Wherein the lever includes a flat panel.

Wherein said nozzle assembly has a centerline, and the lever is located along the centerline.

Wherein the level is attached by a separate bracket pinned.

Wherein the feature is a rounded corner.

Wherein said basin is diamond shaped.

Wherein the lateral feature is a handle.

Wherein said nozzle assembly includes a pair of upwardly directed, laterally-displaced spray nozzles.

Wherein said lever is generally vertical in the shutoff position, and said level is pushed backward to actuate the flow of water.

Wherein the lever includes a flat panel.

Wherein the feature is a rounded corner.

Wherein said basin is diamond shaped.

Wherein the lateral feature is a handle.

Wherein said nozzle assembly includes a pair of upwardly directed, laterally-displaced spray nozzles.

Wherein the nozzle assembly inlet includes a central passage having a second outlet, said second outlet being adapted and configured to be received within the inlet of a second eyewash nozzle assembly.

Which further comprise a repeatedly removal cap having a plurality of apertures, said cap being received by said nozzle outlet.

Which further comprises a pair of nozzle outlets laterally spaced apart a distance within the range of spacing of adult human eyes.

Wherein said filter is located downstream of said regulator.

Wherein the quick connect fitting has one of a male or a female fitting.

Wherein said flow regulator is a press fit into said housing.

Which further comprises drainage valve supported internally by said housing, said drainage valve including a movable valve member biased to normally open a drainage passage when water pressure within said assembly inlet is below a predetermined value.

Which further comprises a plurality of resilient members mounting said heater to said cart, each of said resilient members being spaced apart from each other resilient member.

Wherein said resilient member is a spring having a spring constant selected to reduce the transmission of vibration above a predetermined frequency.

Wherein said resilient member is an elastomeric coupling.

Wherein said resilient member is adapted and configured to deflect from a free state to a compressed state under the weight of said heater.

Wherein the deflection is more than about one fourth of an inch.

Wherein the reservoir has an internal volume of more than about ten gallons.

Wherein said nozzle directs water to a contaminated person using said system, and the basin collects contaminant washed off of the person by the water.

Wherein said nozzle is a first nozzle oriented to wash water from one eye of a person, and which further comprises a second nozzle oriented to wash water from the other eye of the person.

Wherein the second outlet drains generally downward for purging of air from said heater.

Wherein said member is externally actuatable by hand.

Wherein in the third position said movable member maintains water in said heater.

Wherein said heater is mounted to said cart by a plurality of shock mounts.

Wherein said heater heats said water by electrical resistance.

While the inventions have been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. An apparatus for an emergency eyewash, comprising:
   a thermostatically controlled valve having a valve body with a hot water inlet, a cold water inlet, and an outlet providing tempered water;
   an eyewash nozzle assembly having an inlet to receive the tempered water, a nozzle outlet for providing a flow of water for the eyewash nozzle assembly, and a housing including a first indexing feature located underneath said housing and located along a first centerline of said housing; and
   a drainage basin located underneath said eyewash nozzle assembly, said basin having a second indexing feature adapted and configured to mate with the first indexing feature, said drainage basin having a second centerline, the lateral sides of said basin each including a corner centered about the second centerline;
   wherein the mating of the first indexing feature and the second indexing feature align the first and second centerlines to be perpendicular to one another.

2. The apparatus of claim 1 which further comprises a drainage valve supported internally by said housing, said housing including a drainage passage, said drainage valve including a movable valve member biased to normally open a drainage passage when water pressure within said assembly inlet is below a predetermined value.

3. The apparatus of claim 1 wherein the corner is a rounded corner adapted and configure to tactilely identify the location of said nozzle assembly to a user.

4. The apparatus of claim 1 wherein said basin is diamond shaped.

5. The apparatus of claim 1 wherein one of said first indexing feature or said second indexing feature includes a pair of extending arms defining a gap therebetween, and the other of said first indexing feature or said second indexing feature is adapted and configured to fit within the gap.

6. The apparatus of claim 1 wherein said drainage basin is supported by an arm having two ends, and one of the ends is adapted and configured to be coupled by a pin to said drainage basin.

7. The apparatus of claim 1 which further comprises a flow regulator adapted and configured to provide a substantially constant flow of tempered for said eyewash nozzle assembly.

8. The apparatus of claim 1 which further comprises a shut-off valve having an inlet and an outlet, said shut off valve inlet receiving tempered water from the outlet of said thermostatically controlled valve, said shut off valve outlet providing tempered water to the inlet of said eyewash nozzle.

9. The apparatus of claim 8 wherein said shut off valve outlet and said eyewash nozzle inlet are adapted and configured to readily connect with each other by a quick connect fitting, and said quick connect fitting is adapted and configured to be connected substantially leak-tight without the use of a tool.

10. The apparatus of claim 1 wherein said basin does not support said eyewash assembly.

11. The apparatus of claim 10 wherein said drainage basin is supported by an arm spaced downward and apart from the first centerline, said arm being parallel to the first centerline.

12. The apparatus of claim 1 wherein the first indexing feature has a shape, and the second indexing feature has a shape complementary to the shape of the first indexing feature.

13. The apparatus of claim 12 wherein said drainage basin includes a drain and is supported by an arm located below the inlet of said eyewash nozzle assembly and proximate to the drain of said drainage basin.

14. The apparatus of claim 1 wherein said drainage basin is supported by an arm located beneath said eyewash nozzle assembly.

15. The apparatus of claim 14 wherein the outlet of said valve body and the inlet of said eyewash nozzle are adapted and configured to readily connect with each other by a quick connect fitting.

16. The apparatus of claim 1 wherein said drainage basin is supported by a separable arm having two free ends.

17. The apparatus of claim 16 wherein one of said first indexing feature or said second indexing feature includes a pair of extending arms defining a gap therebetween, and the other of said first indexing feature or said second indexing feature is adapted and configured to fit within the gap.

18. The apparatus of claim 16 wherein the outlet of said valve body and the inlet of said eyewash nozzle are adapted and configured to readily connect with each other by a quick connect fitting.

19. The apparatus of claim 16 wherein one of the ends of said separable arm is adapted and configured to be coupled by a pin to said drainage basin.

20. The apparatus of claim 19 wherein said basin is diamond shaped.

21. The apparatus of claim 19 wherein said basin has an underside including an attachment feature, and the one end of said arm is adapted and configured to be pinned to the attachment feature.

22. The apparatus of claim 19 wherein the first indexing feature has a shape, and the second indexing feature has a shape complementary to the shape of the first indexing feature.

* * * * *